United States Patent
Shimizu et al.

(10) Patent No.: US 6,405,761 B1
(45) Date of Patent: Jun. 18, 2002

(54) EXPANDABLE METAL-PIPE BONDED BODY AND MANUFACTURING METHOD THEREOF

(75) Inventors: Takao Shimizu; Hirotsugu Horio; Kazushige Kito; Shigeyuki Inagaki, all of Aichi (JP)

(73) Assignee: Daido Tokushuko Kabushiki Kaisha, Aichi (JP)

( * ) Notice: Subject to any disclaimer, the term of this patent is extended or adjusted under 35 U.S.C. 154(b) by 0 days.

(21) Appl. No.: 09/414,534

(22) Filed: Oct. 8, 1999

(30) Foreign Application Priority Data

| Oct. 8, 1998 | (JP) | ................................ | 10-286403 |
| Oct. 9, 1998 | (JP) | ................................ | 10-287477 |
| Oct. 27, 1998 | (JP) | ................................ | 10-305416 |
| Jun. 18, 1999 | (JP) | ................................ | 11-172553 |

(51) Int. Cl.⁷ .............................................. F16L 11/00
(52) U.S. Cl. ........................ 138/109; 138/155; 138/171; 138/DIG. 11
(58) Field of Search .................. 138/109, 142, 138/155, 171, DIG. 11

(56) References Cited

U.S. PATENT DOCUMENTS

| 1,928,910 A | * | 10/1933 | Riemenschneider | ........ 138/109 |
| 3,965,555 A | * | 6/1976 | Webster et al. | .............. 138/109 |
| 4,556,240 A | * | 12/1985 | Yoshida | ....................... 138/109 |
| 4,883,292 A | * | 11/1989 | Kuroki | ........................... 285/55 |
| 5,368,669 A | * | 11/1994 | Maine et al. | ................ 138/109 |
| 5,875,954 A | * | 3/1999 | Kishi et al. | ................... 228/194 |
| 6,016,843 A | * | 1/2000 | Wada et al. | ................. 138/109 |
| 6,059,175 A | * | 5/2000 | Hamada et al. | ............. 228/194 |
| 6,129,999 A | * | 10/2000 | Ueda et al. | ................... 138/142 |
| 6,135,160 A | * | 10/2000 | Sugao | ......................... 138/143 |

FOREIGN PATENT DOCUMENTS

| EP | 0 769 344 | 4/1997 |
| EP | 0 899 050 | 3/1999 |
| WO | WO 88 03853 | 6/1988 |

* cited by examiner

Primary Examiner—James Hook
(74) Attorney, Agent, or Firm—Bacon & Thomas, PLLC

(57) ABSTRACT

The present invention provides a metal pipe bonded body formed from a plurality of metal pipes. Each metal-pipe is formed with an elongated, pre-formed portion at each end, and a central portion, each elongated, preformed portion having a constant inside diameter greater than an inside diameter of the central portion of each metal pipe.

3 Claims, 16 Drawing Sheets

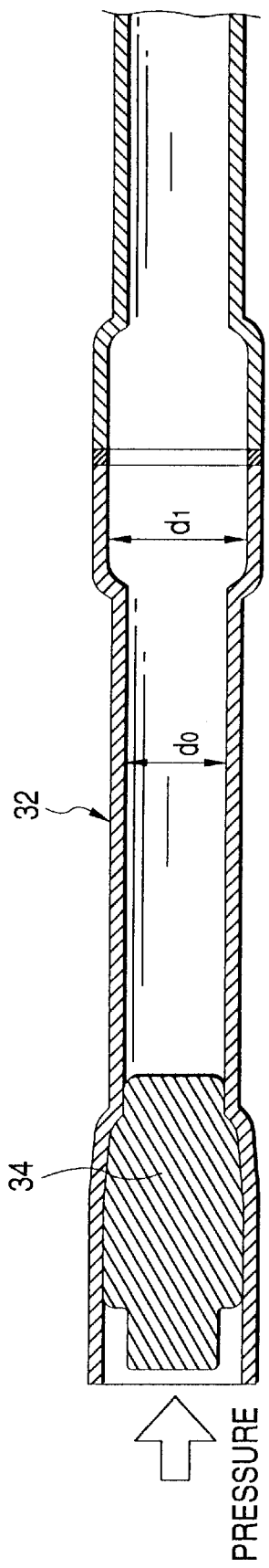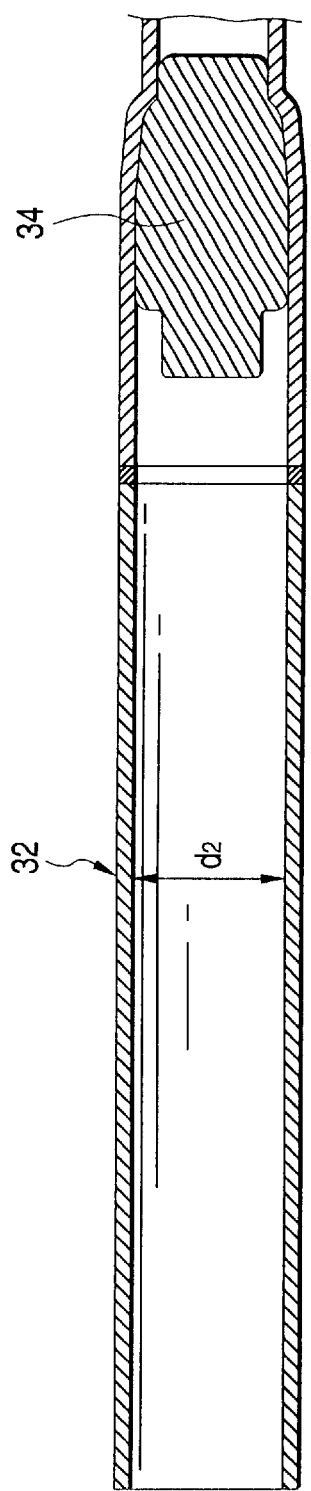
FIG. 2A
FIG. 2B

FIG. 8A
FIG. 8B
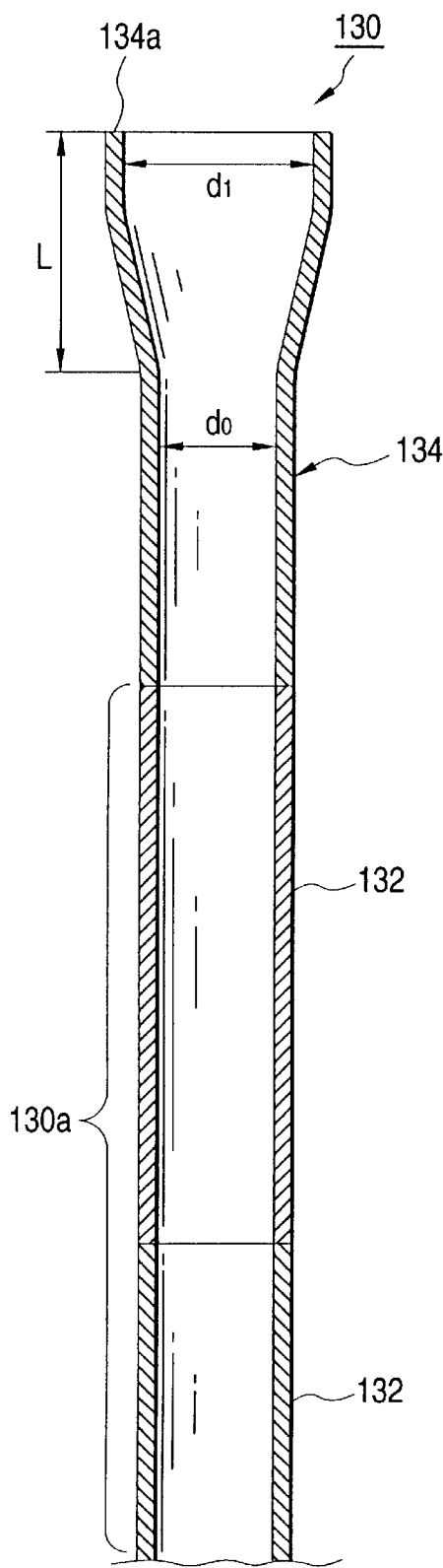
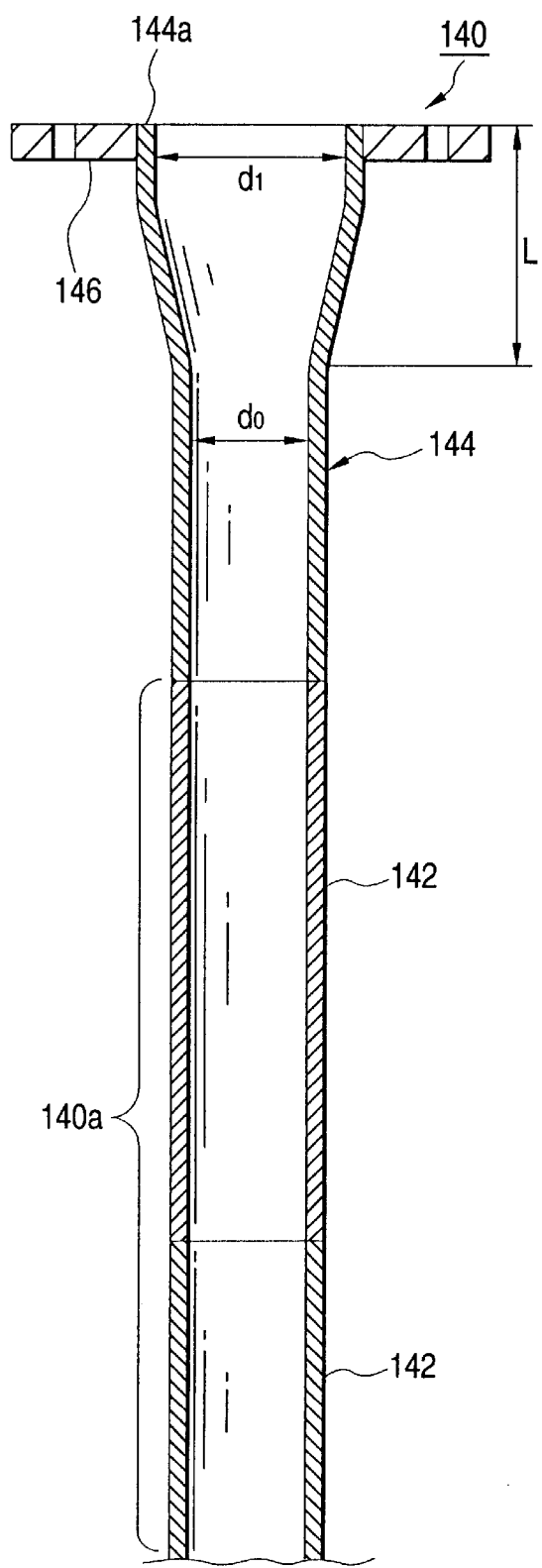

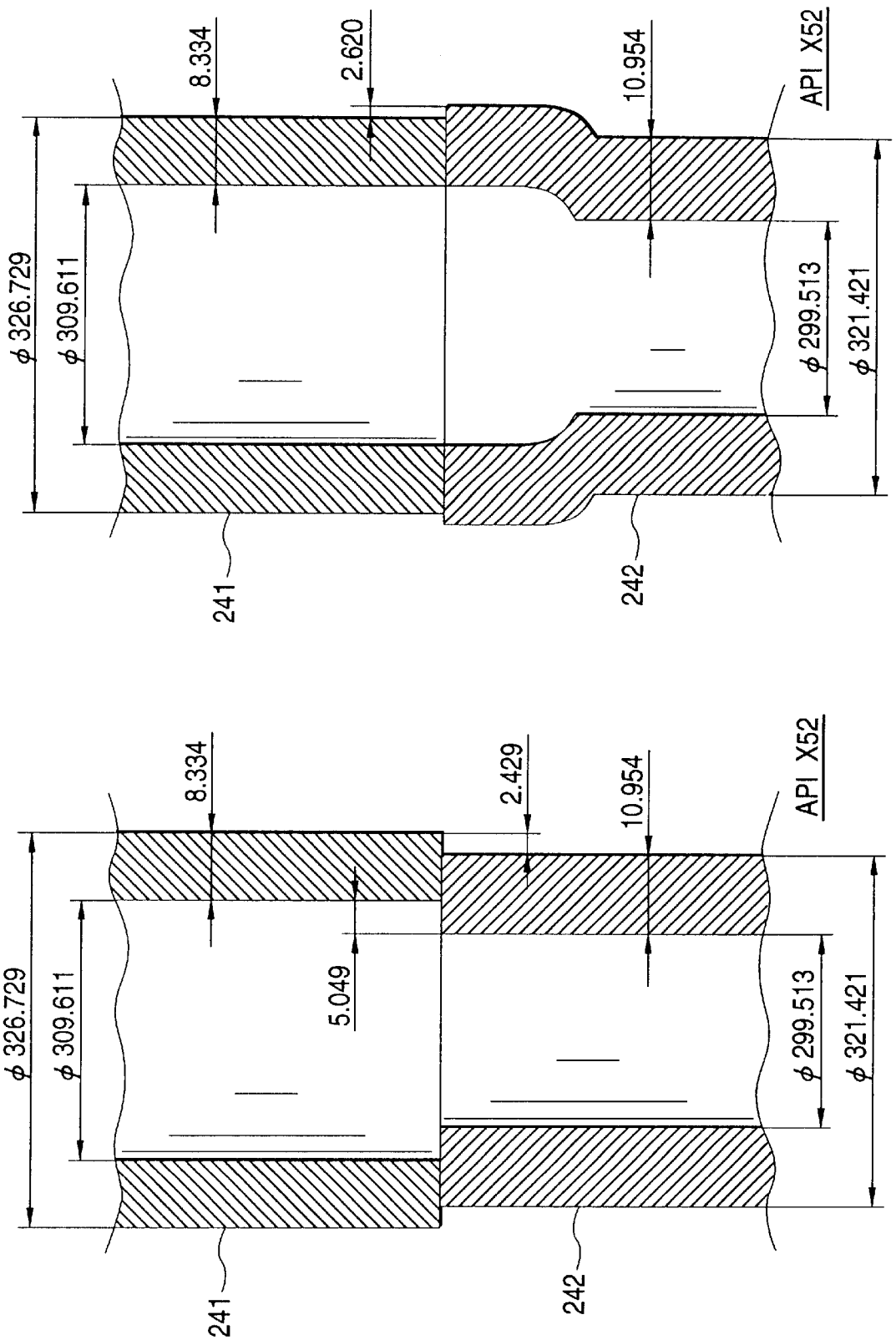

EXPANDABLE METAL-PIPE BONDED BODY AND MANUFACTURING METHOD THEREOF

BACKGROUND OF THE INVENTION

1. Field of the Invention

The present invention relates to an expandable metal-pipe bonded body and a manufacturing method thereof, and more particularly, to an expandable metal-pipe bonded body well adaptable for plant pipes and line pipes, which are used in chemical industry and petrochemical industry, and oil-well tubes, such as casing tubes, production tubes, and coiled tubes, which are used in the oil well, and a method of manufacturing such an expandable metal-pipe bonded body.

2. Description of the Related Art

Long metal pipes have been used for a long distance transportation of corrosive fluid in the fields of chemical and petrochemical industries. The pipe line is used for transporting crude oil from an oil field to a refinery, and its length ranges into several tens Km.

To drill an oil well, a steel pipe, called a casing, is inserted into a bore hole in order to protect the bore hole drilled in the ground and to prevent crude oil from leaking. The oil well is located usually several thousands meter under the ground. Therefore, it is required to use a casing of several thousands meter long.

A seamless steel pipe of good corrosion proof is generally used for the metal pipe exposed to a corrosive atmosphere. The seamless steel pipe mass-produced is 10 to 15 m long, and the longest seamless steel pipe that can be manufactured is approximately 100 m at most. For this reason, a pipe bonded body as a string of seamless steel pipes of 10 to 15 m long is used for the line pipe or the oil-well tube, such as a casing.

A screw connecting method (mechanical bonding method), a welding method (orbital welding method), and a diffusion bonding method are typically known for the bonding method of bonding those metal pipes applied to such a use.

It is a common practice that a pipe bonded body formed by bonding a plurality of metal pipes of a given length in series (referred to as a metal-pipe bonded body) is used as intact or without increasing or decreasing the inside diameter of the bonded body. A metal-pipe bonded body having a desired inside diameter is generally formed by bonding metal pipes of the desired inside diameter in a string.

The casing for the oil well is buried in the ground, while the line pipe is laid on the ground. Accordingly, if the metal-pipe bonded body of a given inside diameter, while not altered, is used for the casing, the following problem arises.

It is technically difficult to dig into the earth toward an oil well laid several thousands under the ground in a state that the bore hole dug remains naked. For this reason, the oil well drilling work is done while repeating the following three steps: a first step of drilling a bore hole in the ground by use of drill pipe with a bit attached atop it, a second step of inserting a casing into the bore hole to protect the dug bore when the bore reaches a certain depth, and a third step to fix the casing by pouring cement into the gap between the inserted casing and the stratum. As a result, a plurality of casings are telescopically bonded in the oil bore.

A typical structure of the oil well is illustrated in FIG. 6. An oil well 10 exemplarily shown in FIG. 6 is constructed with four casings; a conductor pipe 12, a surface casing 14, an intermediate casing 16, and a production casing 18. The conductor pipe 12 has the largest outside diameter and functions to protect the bore wall located in the vicinity of the land surface. The surface casing 14 is telescopically inserted into the conductor pipe 12. The production casing 18, which is the longest of those casings, ranges to an oil stratum.

When the second casing (referred to as an "inside casing") is inserted into the oil bore through the first inserted casing (referred to as an "outside casing") (the first casing=first inserted casing, the second casing=subsequently inserted casing), the inserting of the second casing into the first casing is difficult when those casings are not aligned with each other axially or either of those casings is irregular in shape. To avoid this disadvantage, it is necessary to select the outside diameter of the inside casing to be smaller than the inside diameter of the outside casing by 10 to 30%.

A production efficiency of the oil well depends on the inside diameter of the production casing ranging to the oil stratum. To secure a given production efficiency, it is necessary not only to set the inside diameter of the production casing at a predetermined value, but also to set the inside diameter of the previously inserted casing at a large value. For this reason, the inside diameter of the oil bore dug near the land surface needs to be large, resulting in increase of oil-well drilling cost.

A solution to the problem is disclosed in TOKU HYOU HEI. 7-507610. In the solution, a casing made of malleable material is inserted into a bore hole dug in the earth, and the casing is radially expanded and pressed against the bore hole wall by expanding a hydraulic expansion tool placed within the casing.

Another solution is disclosed in WO 98/0062. In the solution, a steel pipe, which is made of malleable steel of the type which exhibits strain hardening without yielding necking and ductile fracture, is inserted into a bore hole or a casing previously inserted, and the casing is radially expanded by use of a mandrel with a tapered face, made of nonmetallic material.

Those solutions of TOKU HYOU HEI. 7-507610 and WO98/0062 allow the insertion of the inside casing of which the outside diameter is smaller than the inside diameter of the bore hole or the outside casing. Therefore, a smooth insertion work of the inside casing is secured.

In those techniques, the inside casing, which is inserted into the bore hole or the outside casing, is radially expanded by use of a hydraulic expansion tool or a mandrel. Therefore, almost the entire cross sectional area of the bore hole may be utilized for transporting crude oil. Further, the effective cross sectional area of the bore hole is increased in those techniques. With this feature, the inside diameter of the bore hole to be dug may be reduced, leading to reduction of digging cost.

Furthermore, as disclosed in TOKU HYO HEI. 7-507610, when the casing is radially expanded and pressed against the bore hole wall, the casing is firmly held by compression stress induced by the bore hole wall. Therefore, there is no need of cement work.

As described above, the casing used for the oil well is considerably long, reaching to several thousands meter, and indispensably includes the bonding portions, However, those are no taken into consideration in TOKU HYO HEI. 7-507610 and WO 90/0062.

When the metal pipes are bonded into a metal-pipe bonded body by the welding bonding method or the metallurgical bonding method, such as the diffusion bonding method, the heating during the bonding process causes a heat affected portion to occur. In this state, a deformability of the bonding portion possibly reduces, and therefore the bonding portions may be cracked when the resultant metal-pipe bonded body is radially expanded by use of a mandrel.

When the metal pipes are bonded into a metal-pipe bonded body by the screw connecting method, and the resultant metal-pipe bonded body is radially expanded by a mandrel, a plastic deformation caused at the time of the expanding of the bonded body loosens the screw-bonded portion, resulting in the air-tightness at the bonding portion.

Illustration useful in explaining the screw connecting method is given in FIG. 7. As shown, outside threads $1a$ and $2b$ are formed the outer surfaces of the end portions of metal pipes 1 and 2. Those metal pipes are bonded together by means of a joint 7 having an inside thread $7a$. The bonding portion of the metal-pipe bonded body is thicker than the non-bonding portion. When the metal-pipe bonded body thus configured is radially expanded by use of a mandrel, a deformation resistance at the bonding portion is increased, impeding the pipe expanding work.

When a metal-pipe bonded body of several thousands meter long, which is uniform in inside diameter over its entire length, is radially expanded at a dash, a reaction force constantly acts in the mandrel during the course of its moving within the bonded body. Under this condition, a large force is required for moving the mandrel.

A technique to solve the problem is disclosed in WO98/0062. In the technique, the tapered surface of the mandrel is made of nonmetallic material, such as ziruconia. With this, a frictional force between the mandrel and the casing is reduced. If the technique is used, the reaction force constantly acts in the mandrel during the course of its moving, and hence the technique still presents an unsatisfactory solution to the power saving problem.

The technique of TOKU HYO HEI. 7-507610 repeats a sequence of the following steps: a hydraulic expansion tool is set at a given position within the casing; it is operated to expand only the casing located at that position; it is stopped in its expanding operation; it is moved downstream within the casing; and it is operated again. This technique solves the power saving problem when comparing with the case where the casing is radially expanded at a dash by use of the mandrel. Thus, the technique stepwise expands the casing, and hence the working efficiency is poor.

When the metal pipes are bonded into a metal-pipe bonded body by the diffusion bonding method, it is a common practice that only the end faces of the metal pipes are machined to be flat, and those metal pipes are bonded together without altering the outer circumferential surfaces and the thickness of the metal pipes. The metal pipes industrially manufactured are indispensably attendant with given dimensional tolerances. In other words, the outside diameter and the thickness of the metal pipes are varied in value-within the tolerances.

When the metal pipes mass-produced are bonded as intact by the diffusion bonding method, steps or stepped portions will be formed on the bonding portions of the resultant metal-pipe bonded body. Stress tends to concentrate at the steps. Therefore, such a bonded body is radially expanded, the bonding portions will be cracked from the steps. If the steps are left there after the pipe expansion. Concentration of stress at the steps continues and corrosive material is likely to stay there. The result is to lessen a strength of the bonded body, and to deteriorate the fatigue characteristic and the corrosion resistance of the bonded body. Any specific technical means to solve such problems is not found in the background art described above.

To achieve both the oil well drilling cost and the productivity, there is proposed a pipe expanding method in which a metal-pipe bonded body of which the outside diameter is smaller than the inside diameter of a bore hole dug in the ground is inserted into a bore hole, and it is radially expanded uniformly over its length by use of a mandrel (for example, WO No. 98/0062).

This pipe expanding method include the steps as shown in FIG. 13A. A metal-pipe bonded body 122 is inserted into a bore hole 124 dug in the ground. The inside diameter of the metal-pipe bonded body is uniform over its length and smaller than the inside diameter of the bore hole 124.

A tapered mandrel 126 is inserted into the metal-pipe bonded body 122 from the upper end $122a$ thereof (FIG. 138). A shaft 128 is bonded to the bottom surface of the mandrel 126 in the case of FIG. 13B. The shaft 128 is used for inserting the mandrel 126 into the metal-pipe bonded body 122. With the metal-pipe bonded body 122, the mandrel 126 is moved toward the other end of the metal-pipe bonded body by use of the shaft 128 (FIG. 13C. In this way, the metal-pipe bonded body 122 is increased in its inside diameter uniformly over its length.

In addition to the pipe expanding method in which the mandrel 126 is moved by use of the shaft 126 attached to the bottom surface thereof, another pipe expanding method is known. In this method, a mandrel not having the shaft is inserted into the metal-pipe bonded body 122, and is hydraulically moved therewithin (not shown).

The pipe expanding method of FIGS. 7A to 7C allows the insertion of an inside casing smaller in inside diameter than the inside diameter of the bore hole or the outside casing, and hence has an advantage of a smooth insertion of the inside casing.

The inside casing smaller in inside diameter than the inside diameter of the bore hole or the outside casing is radially expanded by use of the mandrel. Therefore, the method is advantageous in that the most part of the cross sectional area of the bore hole can be utilized for transporting crude oil. The advantage accrues to the reduction of the inside diameter of the bore hole actually dug and hence to bore-hole digging cost.

The pipe expanding method suffers from the following disadvantages. Insertion of the mandrel 126 into the metal-pipe bonded body 122 having a uniform inside diameter, from its upper end $122a$ is accompanied with large deformation resistance. Therefore, when the mandrel 126 is performed inserted into the metal-pipe bonded body 122 being buried in the ground, excessive force exerts on the metal-pipe bonded body 122, to deform or break the metal-pipe bonded body 122 per se. Great care is used for the insertion work of the mandrel 126, resulting in poor working efficiency.

In the pipe expanding method in which the mandrel is moved by hydraulic pressure, a tightly closed space must be formed in the upper end $122a$ of the metal-pipe bonded body 122. To this end, a flange, for example, must be welded to the upper end $122a$ of the metal-pipe bonded body 122.

The welding work for the flange fixing is dangerous in an environment where flammable gas is present since arc generated in the welding operation will ignite the flammable gas. Particularly the oil well field requires a minimum welding work on job site.

In the mechanical bonding method, metal pipes the threaded end portions are bonded end to end by a screw bonding manner. This bonding method takes 5 to 10 minutes for bonding one joint, and is advantageous in that the metal-pipe bonding work efficiency is high, but is disadvantageous in that leakage of oil or gas from the bonding portion is easy to occur. For this reason, the metal pipe needs to be machined with high precision and the bonding work needs high skill. Further, much care is used for transportation of the high precision metal pipes to avoid damage of the metal pipe. Furthermore, the screw-bonded portions are resistive to tensile stress. However, those portions are likely to radially expand when compression stress exerts thereon, to promote leakage of oil or gas therethrough.

In the orbital welding method, to bond the metal pipes, the end-faces of the metal pipes are beveled; and the metal pipes with the beveled ends are bonded together at their ends; and the bonded and beveled ends of those metal pipes are padded with molten metal. The metal-pipe bonded body produced by the welding method is free from oil or gas leakage unless the welding portions suffer from poor welding or pin holes, and further is resistive to tensile stress and compression stress. Disadvantages of the welding method follows. There is a limit in increasing the welding efficiency. Particularly in the case of welding thick metal pipes, the multi-layer welding is required, and takes 1 to 2 hours for welding one joint. Additionally, the welding work on the job site is influenced by weather, wind and other environmental conditions, and further requires highly skilled welding technique.

A frictional bonding method is also known. In this bonding method, butted metal pipes are rotated relative one to the other. Frictional heat generated during the metal-pipe rotation softens the ends of the metal pipes, and the softened ends are bonded together by press. Advantages of the frictional bonding method are that a less skill is required when comparing with other bonding methods; short time is taken for the bonding, and the bonding work is little affected by environmental conditions. A decisive disadvantage of this bonding method is that the inside and outside surfaces of the press-bonded portions is inevitably burred, and much time is taken for removing the burrs. An unsatisfactory solution to the burr problem was proposed. In the solution, a ring wedge-shaped in cross section is inserted between the end faces of paired metal pipes. The ring is pushed toward the center of the paired metal pipes (when viewed in cross section) while rotating the ring in a state that the paired metal pipes are fixed, whereby those metal pipes are press bonded together. The characteristics of the press-bonded joint are not satisfactory.

The diffusion bonding method follows. In this method, two metal pipes are butted; the abutting ends of the metal pipes are heated at a temperature below their melting point while being pressed together; in this state elements of the metal pipes are diffused at the bonding interface, whereby the metal pipes are bonded together. The diffusion bonding method is classified into a "solid-phase diffusion bonding method" and a "liquid-phase bonding method". Either of those methods may be used for the diffusion bonding method. In the former bonding method, the ends of metal pipes are bonded together, and elements of the material of the metal pipe are diffused in a solid-phase state of the material. In the latter bonding method, an insert member is inserted between the bonding surfaces of the metal pipes, and the insert member is molten to diffuse elements from the molten insert member into the metal pipes.

The diffusion bonding method is advantageous in that no leakage of oil or gas from the bonding portions occurs if the bonding is performed under proper bonding conditions, and the bonding portions are resistive to compression stress as in the welding method, and further that the bonding time for one joint (bonding portion) is short, ⅓ to ½ as long as of the welding method. In this respect, the diffusion bonding method is excellent when it is applied to the bonding of oil well tubes and line pipes.

When the metal pipes are bonded into a metal-pipe bonded body by the diffusion bonding method, it is a common practice that only the end faces of the metal pipes are machined to be flat, and those metal pipes are bonded together without altering the outer circumferential surfaces and the thickness of the metal pipes.

The metal pipes industrially manufactured are indispensably attendant with given dimensional tolerances. In other words, the outside diameters and the thickness values of the metal pipes are varied in value within the tolerances. When the metal pipes mass-produced are bonded as intact by the diffusion bonding method, steps will be formed on the outer surfaces and/or the inner surfaces of the bonding portions of the resultant metal-pipe bonded body.

When the bonded body of which the bonding portions have steps is used as intact, stress tends to concentrate at the steps or stepped portions, the bonding portions will be cracked from those steps or the steps are likely to be start point of fatigue crack. Further, corrosive materials strays at the steps on the inner surfaces of the bonding portions, and will adversely affect the mechanical characteristic and corrosion resistance.

The steps formed on the outer surfaces of the bonding portions can be removed after the bonding process ends, but removal of the steps on the inner surfaces of the bonding portions is difficult.

SUMMARY OF THE INVENTION

It is an object of the present invention is to provide an expandable metal-pipe bonded body which is free from cracks of the bonding portions of the bonded body and reduction of the air-tightness of the bonding portions caused by loosening of the screw bonding, and a manufacturing method thereof, when the bonded body is radially expanded.

It is an object of the present invention to provide an expandable metal-pipe bonded body which is low in deformation resistance when the bonded body is radially expanded, and requires less power in the expanding process of the bonded body, and a manufacturing method thereof.

It is an object of the present invention is to provide an expandable metal-pipe bonded body which reduces the steps at the bonding portions thereof, and is excellent in strength, fatigue characteristic and corrosion resistance, and a manufacturing method thereof.

It is an object of the present invention to provide an expandable metal-pipe bonded body in which in radially expanding the bonded body, the pipe expanding tool is smoothly inserted into the bonded body without breaking and deforming the bonded body, and danger of igniting the flammable gas is minimized in the pipe expanding work at the oil well.

It is an object of the present invention to provide a method of bonding metal pipes bonded end to end by a diffusion bonding method which reduces steps at the bonding portions, and is excellent in strength, fatigue characteristic and corrosion resistance.

The present invention provides an expandable metal-pipe bonded body formed by bonding a plurality of metal pipes in a series, in which the inside diameter of each bonding portion of each of the metal pipe is larger than the inside diameter of the non-bonding portion of each of the metal pipe.

Such an expandable metal-pipe bonded body may readily be manufactured by increasing the inside diameter of the end portion of each of metal pipes, and bonding together the metal pipes in a string fashion. In this case, it is preferable that the inside diameter of each end portion of each of the metal pipe is increased so as to have an pipe-end expansion rate of 5% or greater. If the pipe-end expansion rate is less than 5%, there is a danger that the jointing or bonding portions will be cracked when the bonded body is radially expanded. The bonding method is preferably a diffusion bonding method or a welding method.

An expandable metal-pipe bonded body may be produced by increasing the inside diameter of the end portion of each of metal pipes, threading the end portion of each of the metal pipe, and mechanically bonding the metal pipes with the aid of the threaded end portions. In this case, it is preferable that the inside diameter of each end portion of each of the metal pipe is increased so as to have an pipe-end expansion rate of 10% or greater. If the pipe-end expansion rate is less than 10%, the screw bonding portions are plastically deformed when the bonded body is radially expanded, leading to impairing the air-tightness at the bonding portions.

An expandable metal-pipe bonded body may be manufactured by butting metal pipes, the end portions of the metal pipes being not increased in their inside diameter, and bonding together the butted end portions of the metal pipes by a diffusion bonding method under such a bonding condition that the end or bonding portions are laterally expanded. In this case, it is preferable that the bonding portions of the metal pipes are diffusion bonded so as to have a lateral expansion rate of 1.04 or greater. If the lateral expansion rate is less than 1.04, when the bonding or bonded body is radially expanded, the bonding portions will be cracked possibly.

In the thus constructed expandable metal-pipe bonded body, the inside diameter of each bonding portion of each of the metal pipe is larger than the inside diameter of the non-bonding portion of each of the metal pipe. When the metal-pipe bonded body is radially expanded by a mandrel, a plastic deformation of the bonding or joining portion is smaller than that of the non-bonding or non-joining portion.

When the metal pipes in which the inside diameter of each bonding portion of each of the metal pipe is larger than the inside diameter of the non-bonding portion of each of the metal pipe is butted and bonded or bonded by the diffusion bonding method or the welding method into a metal-pipe bonded body, and the resultant bonded body is radially expanded, thermally affected portions are created in the bonding portions and hence their deformability is reduced. However, the metal-pipe bonded body is substantially free from cracking of the bonding portions which will possibly occur when the bonded body is radially expanded.

When the metal pipes of which the end portions are not radially expanded are bonded end to end, and jointed by the diffusion bonding method while at the same time those jointing portions are radially expanded, at a predetermined lateral expansion rate, into a barrel shape by pressure applied in this process, to thereby form a metal-pipe bonded body, cracking in the bonding portions is hard to occur, and additionally there is eliminated a step of increasing the inside diameter of the metal pipe.

When metal pipes of which the end portions are increased in inside diameter at a predetermined pipe-end expansion rate are bonded, by the screw connecting method, into a metal-pipe bonded body, and the resultant bonded body is radially expanded at a pipe expansion rate smaller than the pipe-end expansion rate, there is no chance of plastic deformation of the screw bonded portions. Therefore, there is eliminated reduction of the air-tightness, which is caused by loosening of the screw portion.

In the metal-pipe bonded body of the invention, the inside diameter of the bonding or joining portion of the metal pipe is larger than that of the non-bonding or joining portion. Because of this, a deformation resistance in the joining portion is reduced. This ensures a smooth pipe expanding work and saves the required power.

When the end portions of the metal pipes are radially increased at a predetermined pipe-end expansion rate, those metal pipes are bonded end to end and jointed together into a metal-pipe bonded body, the radial expansion work may uniformize the inside diameter values of the metal pipes. Therefore, if the metal-pipe bonded body is produced by use of the metal pipes having variations of the outside diameter and the thickness of them, the steps formed in the bonding portions may be reduced. The resultant metal-pipe bonded body is excellent in strength, fatigue characteristic and corrosion resistance.

The present invention further provides an expandable metal-pipe bonded body formed by bonding a plurality of metal pipes in a series, in which the end of the metal-pipe bonded body is bonded to a metal pipe of which the non-bonding end is set in advance to be larger in inside-diameter than the central portion.

It is preferable that the inside diameter of the non-bonding end of each of the metal pipe to be bonded to the end of the metal-pipe bonded body is larger than the outside diameter of a pipe expanding tool for expanding the inside diameter of the metal-pipe bonded body uniformly over its length bonded body. In the specification, the term "non-bonding end" of the metal pipe bonded to the end of the metal-pipe bonded body means the end portion of the metal pipe which is not bonded to the metal-pipe bonded body.

In the expandable metal-pipe bonded body, the end of the metal-pipe bonded body is bonded to a metal pipe of which the non-bonding end is set in advance to be larger in inside-diameter than the central portion. Therefore, smoother insertion of the tool is realized when comparing with the case where the inside diameter of the end portion of the metal-pipe bonded body is not increased.

Insertion resistance of the tool into the metal-pipe bonded body is reduced to zero when the inside diameter of the non-bonding end of each of the metal pipe to be bonded to the end of the metal-pipe bonded body is larger than the outside diameter of a pipe expanding tool for expanding the inside diameter of the metal-pipe bonded body. The result is that the smooth insertion of the tool is realized, and the bonded body is not broken and deformed.

Since a flange is applied in advance to the non-bonding end of the metal pipe to be bonded to the metal-pipe bonded body, there is eliminated the work of welding the flange to the metal-pipe bonded body. When the welding work is done for the flange fixing in an environment containing flammable gas, less danger of igniting the flammable gas is produced, securing a safety of the pipe expanding work.

The present invention provides a method of bonding metal pipes bonded end to end by a diffusion bonding method wherein the inner surface of the bonding end of at least one of metal pipes to be bonded together is machined so that an inside diameter difference between the bonding end faces of said metal pipes is smaller than 2 mm.

In the metal-pipe bonding method, the working of said inner surface is a diameter-increasing process not attendant with removal of material or a machining process attendant with removal of material. Alternately, it may be a combination of a diameter-increasing process not attendant with removal of material and a machining process attendant with removal of material.

In the metal-pipe bonding method of the invention, the inner surface of the bonding end of at least one of metal pipes to be bonded together is machined, before a diffusion bonding process commences, so that an inside diameter difference between the bonding end faces of said metal pipes is smaller than a predetermined value. Therefore, even if the outside. diameters and the thickness values of metal pipes vary in value before the bonding process starts and hence the inside diameter difference between those metal pipes is present, there is no chance that great steps are formed on the inner surfaces of the bonding portions. Accordingly, the resultant bonded body is improved in strength, fatigue characteristic and corrosion proof.

BRIEF DESCRIPTION OF THE DRAWINGS

In the accompanying drawings:

FIGS. 2A and 2B are diagrams showing a method of radially expanding the metal-pipe bonded body, which is carried out in FIG. 1D;

FIG. 8A is a sectional view showing an expandable metal-pipe bonded body which forms a fourth embodiment of the present invention, and FIG. 8B is a cross sectional view showing the expandable metal-pipe bonded body of the fifth embodiment;

FIGS. 15A and 15B are sectional views showing a relationship between dimensional accuracy of the metal pipe mass produced and a step formed on the bonding portion of the metal pipe;

PREFERRED EMBODIMENTS OF THE INVENTION

The preferred embodiments of the present invention will be described in detail with reference to the accompanying drawings. FIGS. 1A to 1D are sectional views showing a method of manufacturing an expandable metal-pipe bonded body which forms a first embodiment of the present invention. This manufacturing method will be referred to as a "method A". The method A includes a "diameter increasing process", an "end-face machining process" and a "diffusion bonding process".

Figure 1A:
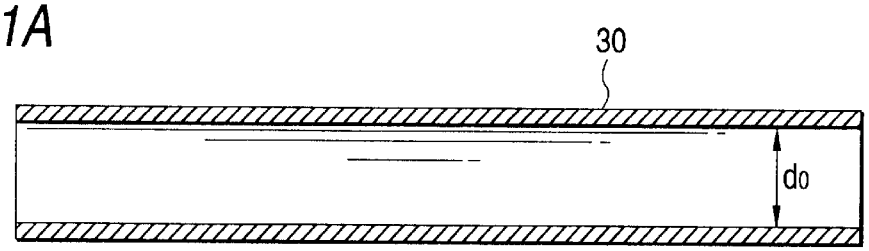
FIGS. 1A to 1D are sectional views showing a method of manufacturing an expandable metal-pipe bonded body which forms a first embodiment of the present invention.
Figure 1B:
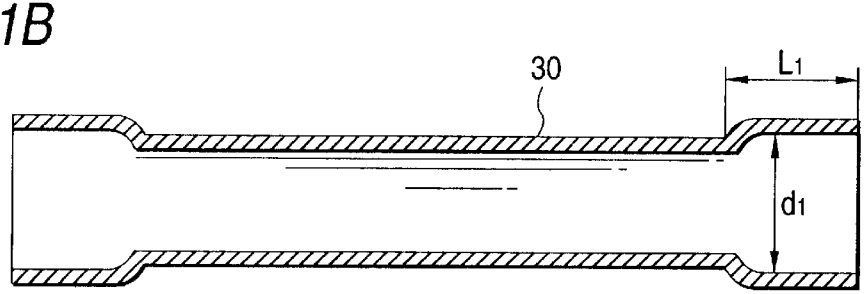

The "diameter increasing process" of the method A will first be described. This process increases only the inside diameter of both end portions of a hollowed, cylindrical body 30 made of metal (this body will be referred to as a metal pipe) as shown in FIG. 1A by means of a proper tool, to thereby form a metal pipe 30 as configured as shown in FIG. 1B: the inside diameter d1 of each end portion of the formed metal pipe is larger than the inside diameter d0 of the central portion of the metal pipe.

The metal pipe 30 handled in the present invention may be made of any material if it has a deformability high enough to endure a pipe expansion to be described later, and its material and size may be properly selected. Where only the mechanical characteristics of the pipe, carbon steel are required, carbon steel may be used for the metal pipes 30 of the metal-pipe bonded body. Where strength and corrosion proof of the pipe are both required, for example, in the case of line pipes and oil well tubes, the metal pipe 30 may be made of any of the following materials; stainless steel (e.g., martensitic stainless steel, dual-phase stainless steel, and austenitic stainless steel), and Ti alloy.

In the description of the present invention, an increment of the inside diameter of the metal pipe 30 after it is expanded (increased in its inside diameter) with respect to the minimum inside diameter of it before it is expanded will be referred to as a "pipe-end expansion rate" and mathematically defined by the following formula (1).

pipe-end expansion rate (%)=$(d1-d0\min)\times 100/d0\min$  (1)

d1: inside diameter of each end portion of the metal pipe d0min: minimum inside diameter of each end portion of the metal pipe 30

In the method A, the pipe-end expansion rate is preferably at least 5%. Where the pipe-end expansion rate<5%, the following problem arises in a pipe expansion process to be described later: a bonding or bonding portion of the metal pipe needs to greatly be plastically deformed and it will be cracked possibly. Further, where the pipe-end expansion rate<5%, a great stepped portion is formed in the bonding portion of the metal pipe to lower the fatigue strength of the pipe in some dimensional accuracy of the metal pipe 30.

The reason for this follows. Where the inside diameter of the metal pipe 30 varies in value within the dimension tolerance, when the pipe-end expansion rate<5%, the following disadvantage will occur highly possibly: only the metal pipe of which the inside diameter do of the metal pipe before it is expanded (increased in its inside diameter) is smaller than the inside diameter d1 thereof after it is expanded, while the metal pipe of which the former is larger than the latter is not expanded.

The minimum inside diameter d0min used for the calculation of the pipe-end expansion rate is preferably a minimum value of the inside diameter predicted from the specifications of the metal pipe to be bonded, allowing for a safety factor; if required, it may be an actually measured value.

To reduce the plastic deformation of the bonding portion of the metal pipe and to suppress the cracking of the bonding portion, the larger the pipe-end expansion rate is, the better. Accordingly, the pipe-end expansion rate may properly selected within a range of pipe-end expansion rates (to be described later) while allowing for ease of working the metal pipe 30 and the use of the metal-pipe bonded body.

A length of the end portion of the metal pipe of which the inside diameter is increased (the length will be referred to as a "diameter-increased length", and denoted as L1 in the FIG. 1B) may be selected in connection with ease of working the metal pipe 30 and the use of the metal pipe. To reduce deformation resistance in the pipe expansion process to be described later and to reduce labor of expanding the pipe radially, it is suggestible that the diameter-increased length is long.

The method of increasing the inside diameter of the metal pipe is also optional. Usually, the metal pipe is expanded in its inside diameter in a manner that a mandrel or a plug having the inside diameter corresponding to the inside diameter d1 (formula (1)) of each end portion of the metal pipe is inserted into the end portion of the metal pipe 30.

Figure 1C:
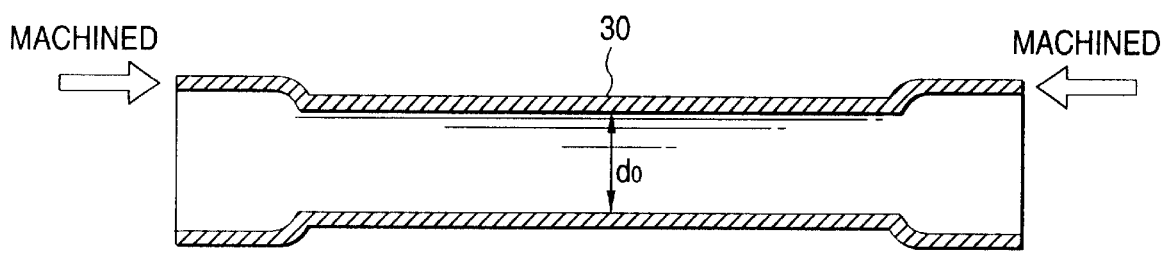

Next, the "end-face machining process" of the method A will be described. This process is provided for machining the end face of the metal pipe 30 after it undergoes the diameter increasing process so as to have a predetermined surface roughness value (FIG. 1C). When the end face of the metal pipe 30 has a high surface roughness, the following disadvantages are yielded in the diffusion bonding process following the end-face machining process: contact of the bonding surfaces of the metal pipes is poor, and hence the resultant bonding strength is unsatisfactory.

Grinding, lapping or the like may optionally be used for the end-face machining process. When the surface roughness of the end face of the metal pipe 30 is within a predetermined value of the surface roughness after the diameter increasing process, viz., the inside diameter of the end portion of the metal pipe is increased, the end-face machining process may be omitted.

The "diffusion bonding method" will be described. The inside diameter of each end portion of the metal pipe 30 is increased by the diameter increasing process, and the end face of the metal pipe is machined to have a predetermined surface roughness. In the diffusion bonding method, the metal pipes 30 thus processed are butted, and are jointed together by a diffusion bonding method.

The diffusion bonding method is classified into a "solid-phase diffusion bonding method" and a "liquid-phase bonding method". Either of those methods may be used for the diffusion bonding method. In the former bonding method, the ends of metal pipes 30 are bonded together, and elements of the material of the metal pipe are diffused in a solid-phase state of the material. In the latter bonding method, an insert member is inserted between the bonding surfaces of the metal pipes, and material elements are diffused while the insert member is temporarily molten.

Figure 1D:
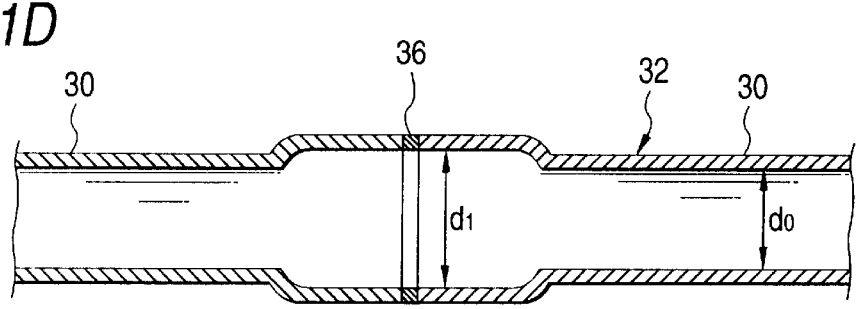

The liquid-phase diffusion bonding method can produce a strength comparable with that of the base metal for a short time when comparing with the solid-phase diffusion bonding method. Accordingly, this bonding method may preferably be used. An example of a metal-pipe bonded body 32 formed by the liquid-phase bonding method in which an insert member 36 is put between the bonding faces of the metal pipes 30, is shown in FIG. 1D.

The diffusion bonding conditions may appropriately be adopted in accordance with a material of a metal pipe 30 used. Specific diffusion bonding conditions which may preferably be used will be described hereunder.

A surface roughness Rmax of the bonding face of a metal pipe is preferably 50 μm or less. If Rmax>50 μm, a close contact of the bonding faces of the metal pipes cannot be secured and the resultant bonded body has an unsatisfactory bonding strength. To secure a high bonding strength, the smaller the surface roughness Rmax is, the better.

The insert member 36 used is preferably made of an Ni alloy or Fe alloy of which the melting point is 1200° C. or lower. If the melting point exceeds 1200° C., high bonding temperature is essential, and as a result, disadvantages of melting the base metal during the bonding process and formation of an unbonded part caused by a failure in melting the insert member 36 are inevasible.

A preferable thickness of the insert member 36 used is 100 μm or less. If its thickness>100 μm, insufficient element diffusion on the bonding interface is ensured, resulting reduction of the bonding strength of the bonding portion.

The insert member 36 may take a variety of forms. The insert member 36 to be put on the bonding interface may be a foil-like member having a thickness of 100 μm or less. In an alternative, it may be powdery. In this case, it is scattered on the bonding interface or the bonding interface is coated with it.

The bonding atmosphere is preferably nonoxidizing atmosphere. The diffusion bonding method in oxidizing atmosphere yields disadvantage of lowering of bonding strength since the bonding interface and its near portion are oxidized.

Bonding temperature is preferably between 1250° C. to 1400° C. When bonding temperature is lower than 1250° C., part of the insert member 36 remains unmelted or insufficient element diffusion is performed, and hence a bonding strength of the resulting bonded body is possibly reduced. When it exceeds 1400° C., there is a danger that the base metal is melted.

Preferable bonding temperature continuation (referred to as a temperature holding time) is between 30 seconds and 300 seconds. If it is shorter than 30 seconds, the element diffusion on the bonding interface is insufficient and the bonding strength is unsatisfactory. If it exceeds 300 seconds, the working efficiency is reduced.

Preferable pressure applied to the bonding interface is within a range from 1.5 MPa to 5 MPa. If the pressure<1.5 MPa, contact of the bonding faces of the metal pipes is not sufficient, leading to lowering of bonding strength of the resultant pipe.

The metal-pipe bonded body thus formed by bonding the metal pipes together is subjected to a pipe expansion process to be described later to radially be expanded. For this reason, no problem arises if the bonding portions of the metal-pipe bonded body are somewhat deformed. If the sum of the inside-diameter increment of the metal-pipe bonded body, which is produced by the pipe expansion process, and the inside-diameter increment caused by the pipe deformation in the bonding process exceeds a pipe expansion rate in the pipe expansion process (to be described later), the irregular surfaces are left in the bonding interfaces and their near portions after the pipe expansion process ends. The irregular surfaces lead to the lowering of the bonding strength of the resultant metal-pipe bonded body. Therefore, in the method A, it is preferable that the pressure applied to the bonding interfaces is set at 5 MPa or lower so as to prevent an excessive deformation of the bonding portions.

The heating method for the diffusion bonding process may be selected from among many heating methods, such as a high frequency induction heating method, a high frequency direct heating method, and a resistance heating method. Of those heating methods, the high frequency induction heating method and the high frequency direct heating method are preferable since those methods are capable of heating relatively large bonded members easily and at high heating efficiency, and hence heating those bonded members up to the bonding temperature for very short time.

A preferable frequency of a high-frequency current used for the high frequency induction heating and the high frequency direct heating is 100 kHz or lower. If its frequency exceeds 100 kHz, the skin-effect occurs, so that only the surface region of the bonded member is heated.

The expandable metal-pipe bonded body thus formed is then subjected to a pipe expansion process. This process will be described. The process radially expands metal-pipe bonded body 32 which is formed by the end-face machining process and the diffusion bonding process into a metal-pipe bonded body having an inside diameter uniformly increased over its length.

To be more specific, a mandrel 34 is inserted into a metal-pipe bonded body 32 of which the bonding portions are d1 in inside diameter and the non-bonding portions are do inside diameter, from one end of the bonded body (FIG. 2A). The mandrel 34 is moved toward the other end of the metal-pipe bonded body 32 to increase the inside diameter thereof up to d2 (FIG. 2B)). An increment of the inside diameter of the bonded body after it is radially expanded with respect to a minimum inside diameter of the non-bonding portions of the same before it is expanded will be referred to as a "pipe expansion rate", and is mathematically defined by formula (2).

$$\text{Pipe expansion rate } (\%) = (d2 - d0\text{min}) \times 100 / d0\text{min} \qquad (2)$$

d2: inside diameter of the non-bonding portion of the bonded body after it is expanded d0min: minimum inside diameter of the non-bonding portion of the bonded body before it is expanded In the method A, the pipe expansion rate may be selected as desired while allowing for a deformability of the metal pipe 30 and the use of the metal-pipe bonded body 32. If the bonding conditions are properly setup, the deformability of the bonding portion can be kept high. Therefore, the metal pipe can be expanded at a pipe expansion rate larger than the pipe-end expansion rate. The minimum inside diameter d0min of the non-bonding portion of the metal pipe before the pipe is expanded is preferably a minimum value of the inside diameter predicted from the specifications of the metal pipe, but it may be an actually measured value, as defined in the formula (1).

The operation of the method A will be described. The end portions of each metal pipe 30 (FIG. 1A), which has a predetermined length and a predetermined inside diameter, are expanded over a predetermined diameter-increased length L1 at a predetermined pipe-end expansion rate (FIG. 1B); the end faces of those metal pipes are machined to have a predetermined surface roughness (FIG. 1C); and the thus processed metal pipes 30 are bonded together at their ends and the bonded portions are diffusion bonded together, to thereby form a metal-pipe bonded body 32 having the inside diameter d1 of each bonded portion is larger than the inside diameter d0 of the non-bonding portion thereof (FIG. 1D).

A mandrel 34 is inserted into the thus formed metal-pipe bonded body 32 from one end thereof, and moved to the other end of the bonded body. As a result, the metal-pipe bonded body 32 is radially expanded to have an increased inside diameter d2 uniformly over its length (FIG. 2B).

The inside diameter d1 of the bonding portion is larger than the inside diameter d0 of the non-bonding portion before the metal-pipe bonded body is expanded. Therefore, a plastic deformation of the bonding portion is less than that of the non-bonding portion when the metal-pipe bonded body is expanded. For this reason, even when in the diffusion bonding method, thermally affected portions are yielded in the pipes to be bonded and the deformability of the bonding portions are lessened, the bonding portions of the metal-pipe bonded body are hard to be cracked in the pipe expansion process.

Further, since the inside diameter d1 of the bonding portion is larger than the inside diameter d0 of the non-bonding portion, deformation resistance in the bonding portion is reduced. A reduction quantity of the deformation resistance becomes large with increase of the inside diameter d1 or the diameter-increased length L1 of the bonding portion. Therefore, the total sum of frictional resistance that the mandrel 34 undergoes when it is moved through the metal-pipe bonded body in the pipe expansion process is smaller than the frictional resistance that the end metal pipe undergoes when it is moved through the metal-pipe bonded body of which the inside diameter is uniform over its entire length.

Further, even when the outside diameter and the thickness of the metal pipes are not uniform within variations of tolerance, steps that will be yielded on the inner surface of each bonding portion can be reduced in a manner that the end portions of the metal pipes 30 are radially expanded, and the inside diameter of the metal pipes 30 are made uniform in value. Therefore, when the thus formed metal-pipe bonded body 32 is expanded, there is less chance that the step causes crack in the bonding portion. Additionally, less stress concentration takes place and a less amount of corrosive material stays in the bonding portions. This little impairs strength, fatigue characteristic and corrosion resistance of the expanded metal-pipe bonded body.

While the method A uses an arc welding process in the above-mentioned embodiment, the method A is operable by an arc welding process (this method will be referred to as a method A'). In the method A', the diameter increasing process expands the end portions of each metal pipe 30 at a predetermined to pipe-end expansion rate; the end-face machining process bevels the end faces of the metal pipes 30; the metal pipes with the beveled ends are bonded together at their ends; and the bonded and beveled ends of those metal pipes are padded with molten metal.

A method of manufacturing an expandable metal-pipe bonded body which is a second embodiment of the present invention will be described. FIGS. 3A to 3D are sectional views showing a method of manufacturing an expandable metal-pipe bonded body which forms the second embodiment of the present invention. This manufacturing method will be referred to as a "method B". The method B includes a "diameter increasing process", a "threading process", and a "fastening process".

Figure 3A:
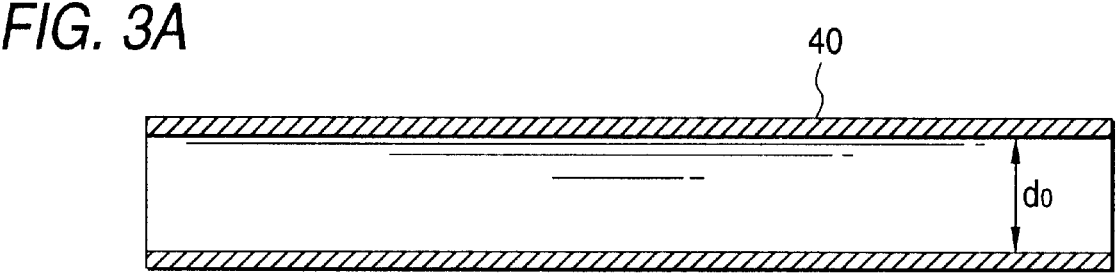
FIGS. 3A to 3D are sectional views showing a method of manufacturing an expandable metal-pipe bonded body which forms a second embodiment of the present invention.
Figure 3B:
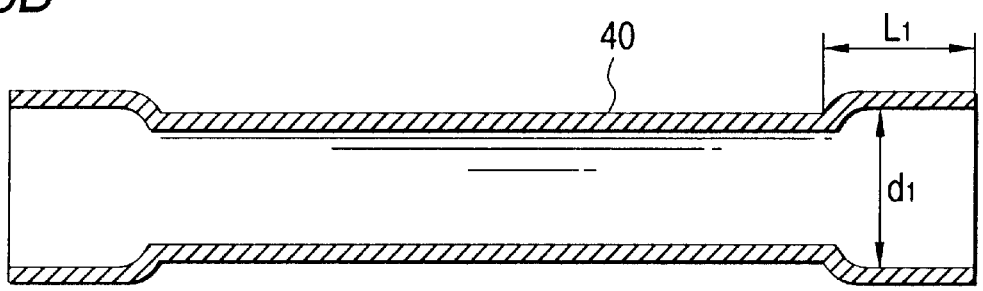

The "diameter increasing process" of the method B, like that of the method A, increases only the inside diameter of both end portions of a hollowed, cylindrical body 40 made of metal (this body will be referred to as a metal pipe) as shown in FIG. 3A at a predetermined pipe-end expansion rate by means of a proper tool, to thereby form a metal pipe 40 as configured as shown in FIG. 3B.

In the method B, the pipe-end expansion rate is preferably at least 10%. If the pipe-end expansion rate<10%, the following problem arises. In the method B, the metal pipes are jointed a their ends by a screw jointing method, and the jointing portions of the metal pipe are plastically deformed in a pipe expansion process to be described later. If the jointing portion of the metal pipes is plastically deformed, thread jointing or bonding of the jointing portions of a metal-pipe jointing or bonded body is loosened to lessen an air-tightness at the jointing portion as will be described later.

The method B resembles the method A in that 1) any material having a deformability capable of enduring a pipe expansion may be used for the metal pipe 40, 2) the diameter-increased length L1 may properly be selected while allowing for ease of working the metal pipe 40, and 3) various methods may be used for the diameter-increasing process.

Figure 3C:
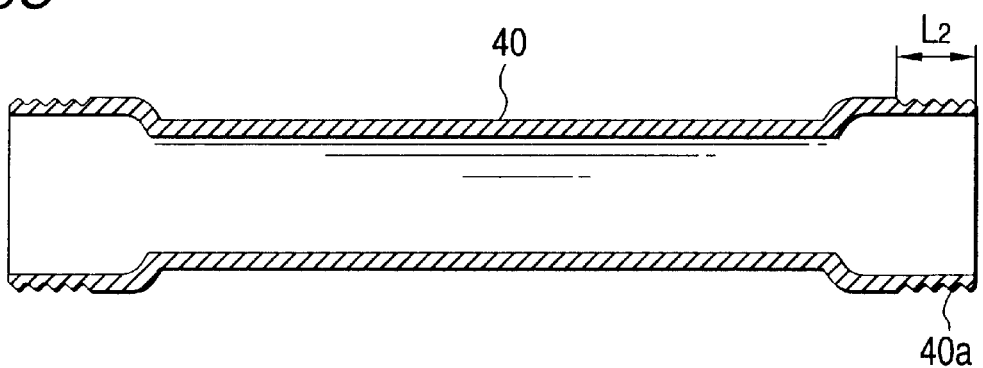

The threading process will now be described. In this process, the external surface of the inside-diameter increased portion of each end of the metal pipe is threaded as shown in FIG. 3C. In the screw jointing method, a load acceptable by the jointing portion depends on a threaded-portion length L2. The threaded-portion length L2 may be selected in accordance with the characteristic required for a metal-pipe bonded body 42.

Figure 3D:
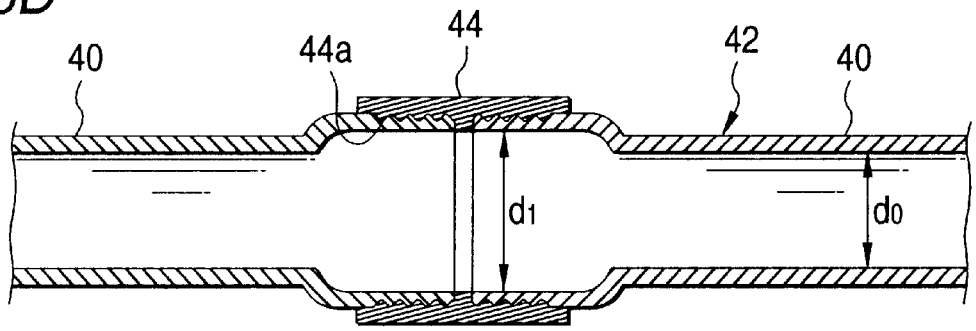

As described above, the diameter increasing process radially expands the end portions of the metal to increase the inside diameter of the end portions, and the threading process threads the outer surface of each end portion of each metal pipe to form an outer screw 40a thereon. The fastening process follows the threading process. The fastening process joints together the thus processed metal pipes 40 by means of joints 44. The inner surface of each joint 44 is threaded to form an inner thread 44a, which is to be in mesh with the outer screw 40a. A metal-pipe bonded body 42 thus produced is illustrated in FIG. 3D.

Figure 4A:
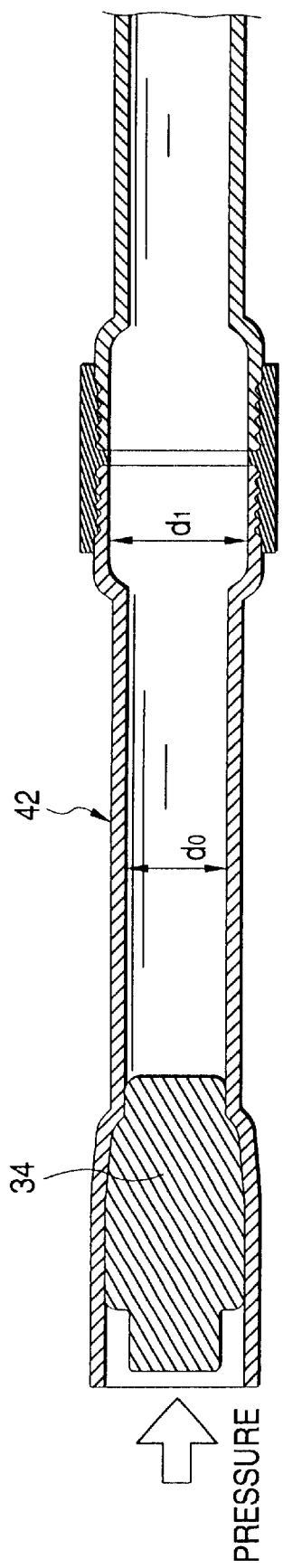
FIGS. 4A and 4B are diagrams showing a method of radially expanding the metal-pipe bonded body, which is carried out in FIG. 3D.
Figure 4B:
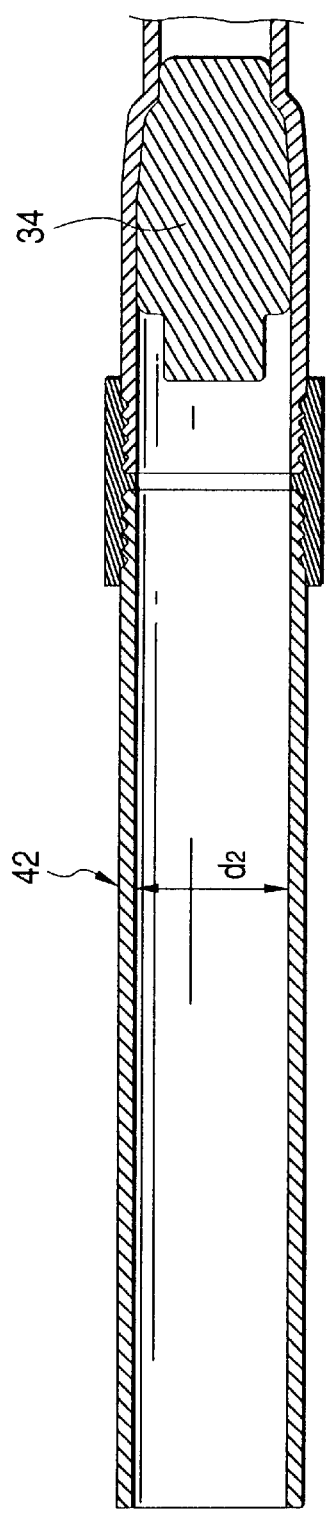

The metal-pipe bonded body 42, like the metal-pipe bonded body 32 produced by the method A, is then subjected to a pipe expansion process. The pipe expansion process radially expands the metal-pipe bonded body 42 to increase its inside diameter uniformly over its length. The increased inside diameter of the metal-pipe bonded body 42 is denoted as d2. In the pipe expansion process, a mandrel 34 is inserted into the metal-pipe bonded body 42 from one end of the bonded body (FIG. 4A), and moved to the other end, whereby the bonding jointing body is radially expanded at a predetermined pipe expansion rate (FIG. 4B). As a result, the inside diameter of the metal-pipe bonded body 42 is increased uniformly over its length.

The pipe expansion rate in the pipe expansion process is selected to preferably be smaller than the pipe-end expansion rate of the metal pipe 40. When the pipe expansion rate>the pipe-end expansion rate, the jointing portions of the metal-pipe bonded body when it is subjected to the pipe expansion process are plastically deformed. As a result, their thread jointing is loosened. The jointing portions of the metal-pipe bonded body are thick since the joints 44 are applied thereto. Therefore, the metal-pipe bonded body is expanded under the condition that the pipe expansion rate>the pipe-end expansion rate, deformation resistance of those jointing portions is increased to hinder a smooth pipe expanding work.

The operation of the method B will be described. The end portions of each metal pipe 40 is radially expanded at an pipe-end expansion rate of 10% or higher to increase the inside diameter of the metal pipe, and the expanded metal pipes 40 are jointed together by the screw jointing method to form a metal-pipe bonded body 42; the inside diameter d1 of each jointing portion 42 is larger than the inside diameter d0 of each non-jointing portion.

When the thus formed metal-pipe bonded body 42 is radially expanded by a mandrel or another suitable means, deformation resistance of the jointing portions is reduced as in the method A. Therefore, the method B saves much labor in the pipe expanding work, when comparing with the case where a metal-pipe bonded body of which the inside diameter is uniform over its entire length. Further, it is noted that the pipe expansion is carried out at a pipe expansion rate smaller than the pipe-end expansion rate. Because of this, the problem of reduction of air-tightness caused by the plastic deformation of the screw, which is inherent in the screw jointing method, is solved.

Figure 5A:
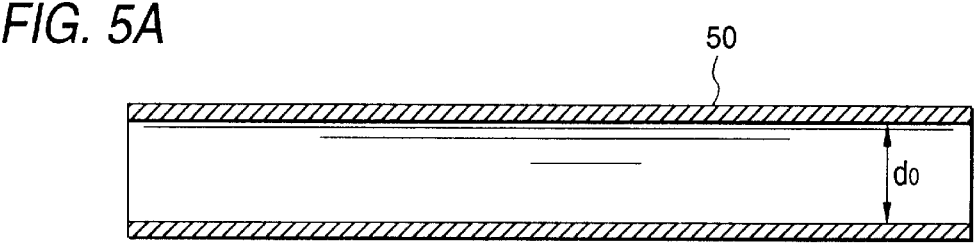
FIGS. 5A to 5C show a method of manufacturing an expandable metal-pipe bonded body which forms a third embodiment of the present invention.
Figure 5B:
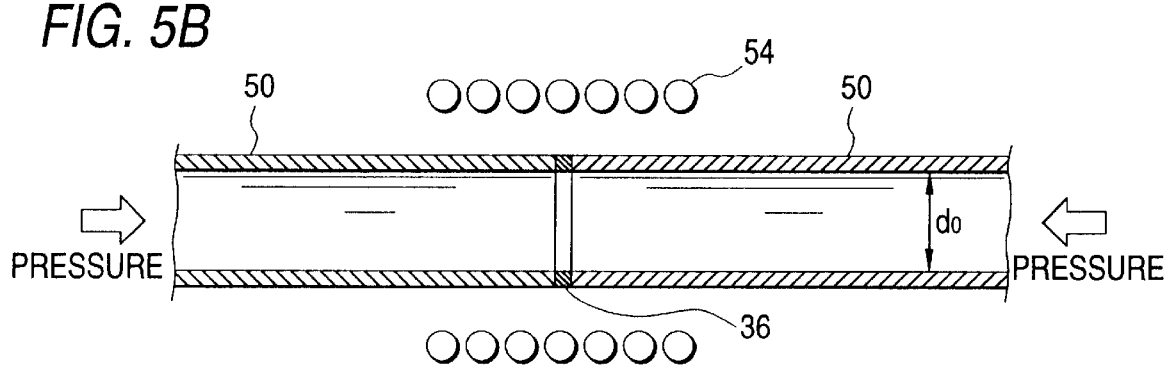
Figure 5C:
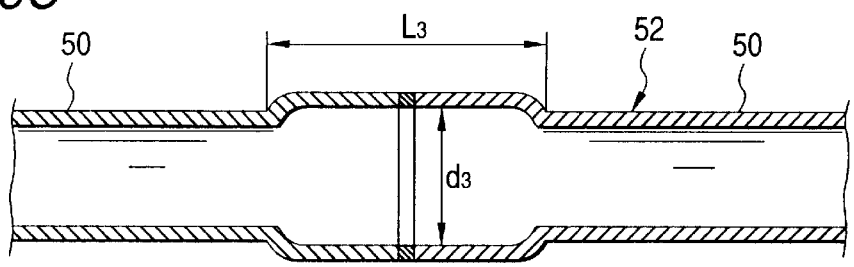

A method of manufacturing an expandable metal-pipe bonded body which is a third embodiment of the present invention will be described. FIGS. 5A to 5C show a set of sectional views showing a method of manufacturing an expandable metal-pipe bonded body which forms the third embodiment of the present invention. This manufacturing method will be referred to as a "method C".

The method C resembles the method A in that any material having a deformability capable of enduring a pipe expansion may be used for a metal pipe 50, but is different from the method A in that the end portions of the metal pipes 50, not radially expanded, are directly subjected to a diffusion bonding process, and are deformed in a barrel shape during this process.

The metal pipes 50, while not radially expanding the end portions thereof, are bonded together at their ends, and the bonded end portions thereof are compressed together (FIG. 5B); and the end portions are heated by a heat source 54. The bonding method may be a liquid-phase bonding method in which an insert member 36 is put on the bonding interface of the metal pipes as shown in FIG. 5B or a solid-phase bonding method in which the insert member 36 is not used.

In the diffusion bonding method, when the bonding conditions are properly set up, diffusion bonding phenomenon progresses at the bonding interface while at the same time a region including the bonding interface is deformed like a barrel as shown in FIG. 5C. As a result, a metal-pipe bonded body 52 is formed as shown. The inside diameter d3 of the bonding portion of the metal-pipe bonded body 52 is larger than the inside diameter do of the non-bonding portion. An increment of the inside diameter of the bonding portion of the metal pipes after the diffusion bonding process with respect to the inside diameter of them before the diffusion bonding process is referred to as a "lateral expansion rate", and mathematically defined by the following formula (3).

$$\text{Lateral expansion rate} = d3/d0\text{min} \quad (3)$$

d3: inside diameter of the bonded portion d0min: minimum inside diameter of the non-bonding portion In the method C, the lateral expansion rate is preferably 1.04 or greater. If it<1.04, the bonded portion needs to be plastically deformed greatly in a pipe expansion process to be described later. In this case, there is a danger that the bonding portion is cracked.

The minimum inside diameter d0min used for the non-bonding portion is preferably a minimum value of the inside diameter predicted from the specifications of the metal pipe to be bonded; if required, it may be an actually measured value, as in the formula (1). In order that plastic deformation of the bonded portion is reduced to obviate formation of crack therein in the pipe expansion process, the larger the lateral expansion rate is, the better. Further, a length of the portion where the inside diameter is increased by the diffusion bonding process (the length will be referred to as "expansion length" and it is denoted as L3 in FIG. 5C) is preferably selected to be as long as possible; if so selected, the deformation resistance is reduced in the pipe expansion process.

In the method C, it is necessary to plastically deform the bonding interface between the metal pipes and its near portion in the diffusion bonding process. The diffusion bonding conditions must be selected so as to satisfy the required lateral expansion rate. Specific diffusion bonding conditions will be given below.

Bonding temperature is preferably within a range from 1250° C. to 1400° C. If the bonding temperature<1250° C., part of the insert member remains unmelted or insufficient element diffusion is performed, and hence a bonding strength of the resulting bonded body is possibly reduced. When it is too low, the deformation resistance of the metal pipe 50 is large, and under this state, it is impossible to secure an intended lateral expansion rate. If the bonding temperature exceeds 1400° C., there is a danger that the base metal is melted.

A preferable temperature holding time is 60 seconds or longer. If it is shorter than 60 seconds, securing of a large lateral expansion rate is impossible. To secure a large lateral expansion rate, the longer the temperature holding time is, the better. Accordingly, a desired temperature holding time may be obtained by adjusting the temperature holding time so.

Preferable pressure applied to the bonding interface is lower than 2 MPa. If the pressure<2 MPa, it is impossible to obtain a large lateral expansion rate. In the method C, the higher the pressure is, the better, and hence, it may be 4 MPa or higher. However, if the lateral expansion rate exceeds the pipe expansion rate, the bonding interface and therearound remain irregular after the pipe expansion. As a result, a bonding strength of the resultant bonded body is lessened. For this reason, it is desirable to adjust the bonding interface so that the lateral expansion rate is equal to or less than the pipe expansion rate.

It is preferable that the bonding portion is heated over an area of 20 mm or longer wide (the width is referred to as a "heating width"). If the heating width is shorter than 20 mm, the lateral expansion rate is reduced the expansion length L3 is also reduced. To reduce the deformation resistance of the bonding portion in the pipe expansion process, it is desirable that the lateral expansion rate is large and the expansion length L3 is long, and to this end, it is desirable that the heating width is wide.

The following points are common to the method C and the method A: 1) the surface roughness Rmax of the bonding interface is preferably 50 μm or less, 2) the insert member used is preferably a member having a melting point of 1200° C. or lower, a thickness of 100 μm or less, and made of Ni or Fe alloy, and 3) there is no restriction in particular in configuring the insert member, viz., foil, powdery or scale insert member may be used.

Further common points to the method C and the method A are 4) the bonding atmosphere is preferably nonoxidizing atmosphere, and 5) the high frequency induction heating method and the high frequency direct heating method, which are based on high frequency of 100 kHz or lower, are preferable for the heating in the diffusion bonding process.

Figure 5D:
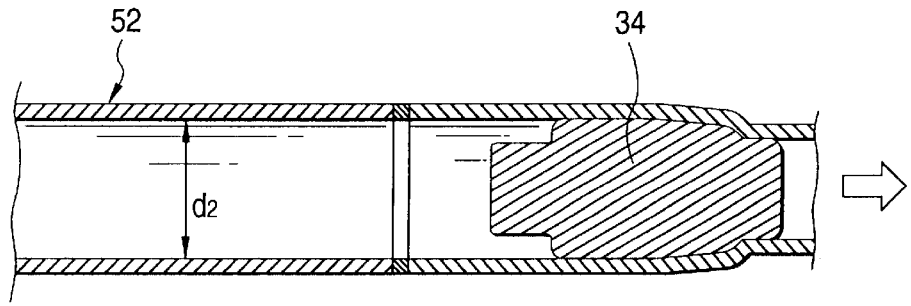
FIG. 5D shows a method of radially expanding the metal-pipe bonded body, which is carried out in FIG. 5C.
Figure 6:
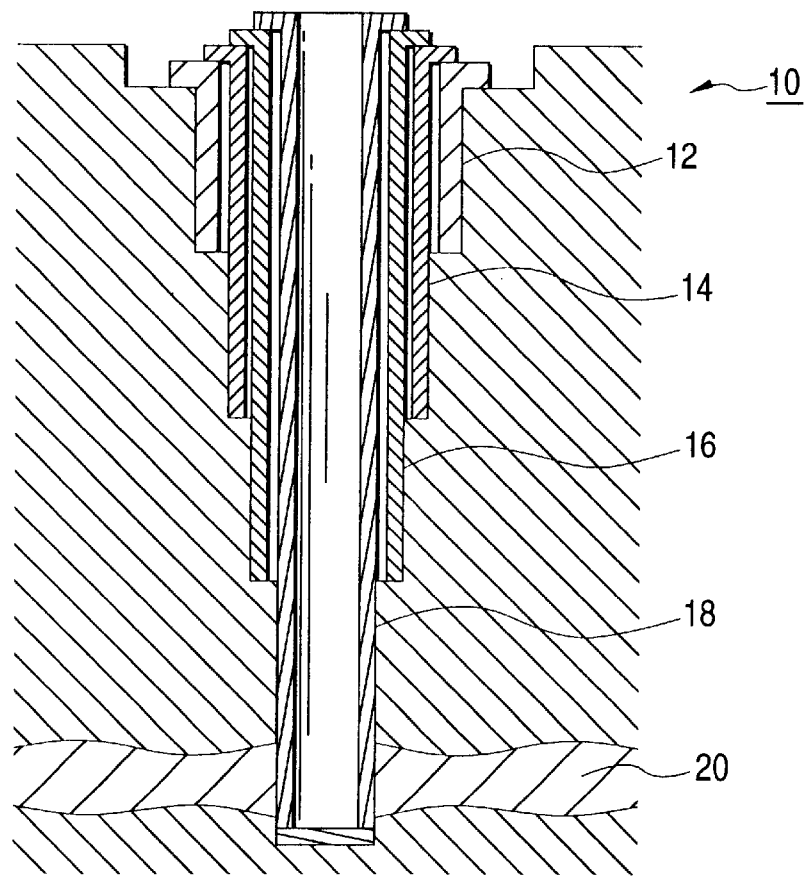
FIG. 6 is a cross sectional view showing a general structure of an oil well.
Figure 7:
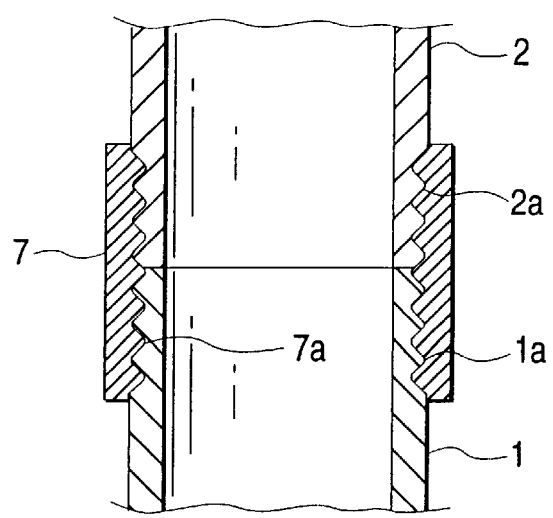
FIG. 7 is a cross sectional view showing a screw bonding (mechanical bonding) method.

Subsequently, the thus formed metal-pipe bonded body 52 having the predetermined lateral expansion rate is subjected to a pipe expansion process. specifically, a mandrel 34 is inserted into the metal-pipe bonded body 52 from one end thereof, and moved to the other end within the metal-pipe bonded body 52, as shown in FIG. 5D.

Additional common points to the method C and the method. A are 6) the pipe expansion rate in the pipe expansion process may be selected allowing for a deformability of the metal pipe 50 and the use of the metal-pipe bonded body 52, and 7) the metal-pipe bonded body can be expanded at a pipe expansion rate larger than the pipe-end expansion rate since a deformability of the bonding portion and its near portion is improved if the bonding conditions are properly set up.

An operation of the method C will be described. The metal pipes 50, not radially expanded, are placed together at their ends; the bonded portions or the bonding portions are subjected to a diffusion bonding process; and at the same time the bonding portions are plastically deformed actively. As a result, a metal-pipe bonded body 52 is produced; the inside diameter d3 of the bonding portion of the metal-pipe bonded body is larger than the inside diameter do of the non-bonding potion.

The thus formed metal-pipe bonded body 52 is radially expanded by use of a metal-pipe bonded body 52. The deformation resistance of the bonding portion and its near portion of the resultant metal-pipe bonded body 52 are reduced in deformation resistance. The pipe expanding work is smoother with less labor when comparing with the case where the metal-pipe bonded body having the inside diameter uniform over its length is radially expanded.

The increased inside diameter of the bonding portion leads to reduction of the plastic deformation of the bonding portion in the pipe expansion process. For this reason, even when in the diffusion bonding process, thermally affected portions are yielded in the pipes to be bonded and the deformability of the bonding portions are lessened, the bonding portions of the metal-pipe bonded body are hard to be cracked in the pipe expansion process. Therefore, the resultant metal-pipe bonded body is improved in strength and air-tightness.

EXAMPLE 1

A metal-pipe bonded body that is manufactured by the method A was radially expanded. Metal pipes used were carbon steel pipes of which the outside diameters were 7 inches (≈178 mm), the thickness was 0.231 inches (≈6 mm) (the pipes are those of grade H0 by American Petroleum Institute (abbreviated as API H40). The end portions of those steel pipes were radially expanded so as to have a pipe-end expansion rate of 5%.

The end faces of the resultant steel pipes were machined to have a surface roughness Rmax of 30 µm or less. An Ni alloy foil having a thickness of 50 µm and a melting point of 1050° C., which corresponds in constitution to JIS BNi-3., was put on the bonding surface of each steel pipe. In this state, liquid-phase diffusion bonding was performed. The resultant metal-pipe bonded body was radially expanded by use of a in mandrel.

A high-frequency induction heating method in which a high-frequency current has a frequency of 3 kHz was used for heating the bonding portions of the steel pipes. The bonding conditions were: bonding temperature was 1300° C., a bonding temperature continuation or temperature holding time was 180 seconds, pressure applied was 4 MPa, and the bonding atmosphere was an Ar atmosphere.

EXAMPLES 2 AND 3

Comparisons 1 and 2

Metal-pipe bonding bodies were manufactured in substantially the same manner as of the example 1 except that the pipe-end expansion rates of the metal pipes 30 were 0% (comparison 1), 3% (comparison 2), 20% (example 2) and 25% (example 3).

For the metal-pipe bonding bodies of the examples 1 to 3 and the comparisons 1 and 2, the maximum values of steps formed (referred to as maximum steps) on the inner surfaces of the bonding portions were measured after the steel-pipe bonding. The surfaces of the bonding portions after the pipe expansion were subjected to a flaw detection test to check if cracks are present. Steps formed on the outer surfaces of the metal-pipe bonded body expanded were reduced to 0.5 mm or less by grinding. Test pieces of API No. 1104 were fractured at the metal-pipe bonding bodies, and were subjected to a tension test. The test results are tabulated in Table 1.

TABLE 1

| Test No. | Comparison 1 | Comparison 2 | Example 1 | Example 2 | Example 3 |
| --- | --- | --- | --- | --- | --- |
| Material of steel pipe | API H40 | API H40 | API H40 | API H40 | API H40 |
| Outer diameter of steel pipe (inch) | 7.00 | 7.00 | 7.00 | 7.00 | 7.00 |
| Thickness of steel pipe (inch) | 0.231 | 0.231 | 0.231 | 0.231 | 0.231 |
| Pipe end expansion rate (%) | 0 | 3 | 5 | 20 | 25 |
| Bonding surface roughness (Rmax: µm) | 30 | 30 | 30 | 30 | 30 |
| Material of insert member | BNi-3 | BNi-3 | BNi-3 | BNi-3 | BNi-3 |
| Melting point (° C.) of insert member | 1050 | 1050 | 1050 | 1050 | 1050 |
| Thickness (µm) of insert member | 50 | 50 | 50 | 50 | 50 |
| Form of insert member | foil | foil | foil | foil | foil |
| Bonding temperature (° C.) | 1300 | 1300 | 1300 | 1300 | 1300 |
| Temperature holding time(s) | 180 | 180 | 180 | 180 | 180 |
| Pressure (MPa) | 4.0 | 4.0 | 4.0 | 4.0 | 4.0 |
| Bonding atmosphere | Ar | Ar | Ar | Ar | Ar |
| Heating method for bonding portions | high frequency induction heating method (3 KHz) | | | | |
| Max. step of bonding portions | 4.0 | 1.0 | 0.5 | 0.5 | 0.5 |
| Pipe expansion rate (%) | 25 | 25 | 25 | 25 | 25 |
| Flaw detection test result of bonding surface | cracks | cracks | no cracks | no cracks | no cracks |
| Tensile strength (MPa) in tension test | 283 | 467 | 716 | 718 | 717 |
| Fractured position in tension test | bonding interface | bonding interface | base metal | base metal | base metal |
| Evaluation | C | B | A | A | A |

In the comparison 1 in which the pipe-end expansion rate=0%, the maximum step was 4 mm. In the flaw detection test after the pipe expansion, may flaws were detected on and in the bonding portions. A tensile strength was low, 283 MPa. Test piece was fractured at the bonding interface.

In the example 2 where the pipe-end expansion rate is 3%, the maximum step is reduced to 1 mm. In the flaw detection test performed after the pipe expansion, relatively large cracks were found in the bonding portions, but the number of cracks was smaller than in the example 1. In connection with this, a tensile strength was improved up to 467 MPa. A test piece was fractured at the bonding interface.

In the examples 1, 2 and 3 in which the pipe-end expansion rates were set at 5%, 20% and 25%, the maximum steps were reduced to 0.5 mm. In the flaw detection test performed after the pipe expansion, no crack was found in each bonding interface. The bonding strength was 700 MPa, comparable with that of the base metal. The test piece was fractured in the base metal.

The measurement results show the following facts. The maximum step may be reduced by increasing the inside diameter of the end portion of the metal pipe at a pipe-end expansion rate in excess of a predetermined one. As the pipe-end expansion rate becomes larger, the bonding portion becomes hard to be cracked at the time of pipe expansion. Therefore, a metal-pipe bonded body having high bonding strength is produced.

EXAMPLE 4

A metal-pipe bonded body was manufactured by the method A and radially expanded. Metal pipes used were carbon steel pipes of which the outside diameter was 7 inches (≈178 mm), the thickness was 0.231 inches (≈6 mm), manufactured by grade H04 by American Petroleum Institute (abbreviated as API H40). The end portions of those steel pipes were radially expanded at 5% (pipe-end expansion rate).

The end faces of the resultant (expanded) steel pipes are machined to have a surface roughness Rmax of 30 μm or less. An Fe-3B-3Si-1C alloy foil of 40 μm thick and having a melting point of 1200° C. was put into the bonding surface of each steel pipe. In this state, liquid-phase diffusion bonding was performed. The resultant metal-pipe bonded body was radially expanded by use of a mandrel to as to have a pipe expansion rate of 25%.

The bonding portions were heated by the high frequency induction heating method in which the high-frequency current frequency was 3 kHz. The bonding conditions were: bonding temperature was 1250° C., temperature holding time was 60 seconds, pressure was 4 MPa, and bonding atmosphere was an Ar atmosphere.

EXAMPLE 5

Metal-pipe bonding body was manufactured in the same procedure as of the example 4 except that the insert member was an Ni alloy foil having a melting point of 1140° C. and a thickness of 40 μm, which corresponds in constitution to JIS BNI-5, and the bonding temperature of 1300° C. was held for 120 seconds.

EXAMPLE 6

Metal-pipe bonding body was manufactured in the same procedure as of the example 4 except that the insert member was an Ni alloy foil having a melting point of 1140° C. and a thickness of 40 μm, which corresponds in constitution to JIS BNI-5, and the bonding temperature of 1400° C. was held for 300 seconds.

Comparison 3

Metal-pipe bonding body was manufactured in the substantially same manner as of the example 4 except that the insert member was an Fe-2B-1Si alloy foil having a melting point of 1290° C. and a thickness of 40 μm, which corresponds in constitution to JIS BNI-5, the bonding temperature of 1400° C. was held for 300 seconds, and pressure applied was 5 MPa.

The metal-pipe bonding bodies of the examples 4 to 6 and the comparison 3 were measured for checking the maximum steps of the bonding potions, and subjected to a flaw detection test and a tension test in substantially the same procedure as of the example 1. The results are shown in Table 2.

TABLE 2

| Test No. | Comparison 3 | Example 4 | Example 5 | Example 6 |
| --- | --- | --- | --- | --- |
| Material of steel pipe | API H40 | API H40 | API H40 | API H40 |
| Outer diameter of steel pipe (inch) | 7.00 | 7.00 | 7.00 | 7.00 |
| Thickness of steel pipe (inch) | 0.231 | 0.231 | 0.231 | 0.231 |
| Pipe end expansion rate (%) | 15 | 15 | 15 | 15 |
| Bonding surface roughness (Rmax: μm) | 30 | 30 | 30 | 30 |
| Material of insert member | Fe-2B-1Si | Fe-3B-3Si-1C | Bni-5 | Bni-5 |
| Melting point (° C.) of insert member | 1290 | 1200 | 1140 | 1140 |
| Thickness (μm) of insert member | 40 | 40 | 40 | 40 |
| Form of insert member | foil | foil | foil | foil |
| Bonding temperature (° C.) | 1400 | 1250 | 1300 | 1400 |
| Temperature holding time(s) | 300 | 60 | 120 | 300 |
| Pressure (MPa) | 5.0 | 4.0 | 4.0 | 5.0 |
| Bonding atmosphere | Ar | Ar | Ar | Ar |
| Heating method for bonding portions | high frequency induction heating method (3 KHz) | | | |
| Max. step of bonding portions | 0.5 | 0.5 | 0.5 | 0.5 |
| Pipe expansion rate (%) | 25 | 25 | 25 | 25 |
| Flaw detection test result of bonding surface | cracks | no cracks | no cracks | no cracks |
| Tensile strength (MPa) in tension test | 417 | 719 | 720 | 722 |
| Fractured position in tension test | bonding interface | base metal | base metal | base metal |
| Evaluation | C | A | A | A |

In the example 3 using the insert member of which the melting point is 1290° C., formation of cracks in the bonding portions was confirmed although the temperature holding time was set at 300 seconds. The tensile strength was 417 MPa. The test piece was fractured at the bonding interface. The reason why the cracks were formed may be estimated as follows: since the melting point of the inset member is high, insufficient element diffusion was performed in the bonding portion, and hence the deformability in the bonding interface or its near region is reduced.

In the example 4 using the insert member having a melting point of 1200° C., and the examples 5 and 6 each using the insert member having a melting point of 1140° C., the flaw detection test conducted after the pipe expansion showed formation of no cracks in the bonding interfaces. A bonding strength of each of those examples was 700 MPa, comparable with that of the base metal. The test pieces were fractured in the base metals.

In the examples 3 to 6, and the comparison 3, the pipe-end expansion rate of each metal pipe was 15%, and hence the maximum step of each of them was 0.5 mm.

From the results of the above measurement and tests, it is seen that when the insert member having a melting point of 1200° C. is used for the bonding of the metal pipes by the liquid-phase bonding method, no cracks is formed in the bonding portion and the resultant metal-pipe bonded body has a high bonding strength.

EXAMPLE 7

A metal-pipe bonded body was manufactured by the method A and radially expanded. The metal pipes used were carbon steel pipes of API H40, which has the outside diameter of 7 inches (≈178 mm) and a thickness of 0.231 inch (≈6 mm). The inside diameter of the end portion of each metal pipe was increased so as to have the pipe-end expansion rate of 15%.

The end face of each expanded metal pipe was machined to have a surface roughness Rmax of 30 μm. Ni alloy scale having a melting point of 1140° C., which corresponds in constitution to JIS BNi-5, was sued for an insert member. A thickness of the insert member was 100 μm. The insert member was put on the bonding interface and the metal pipes were bonded by the liquid-phase diffusion bonding method. The resultant metal-pipe bonded body was radially expanded, by use of a nmandrel, to have a pipe expansion rate of 25%.

A high frequency induction heating method in which the frequency of a high-frequency current is 3 kHz, was used for heating the bonding portions. The bonding conditions were: bonding temperature was 1300° C., temperature holding time was 180 seconds, pressure applied was 4 MPa, and bonding atmosphere was Ar atmosphere.

EXAMPLE 8

Metal pipes were bonded into a metal-pipe bonded body and the resultant bonded body was radially expanded in the same manner as in the example 7, except that Ni alloy powder which corresponds in constitution to JIS BNi-5 was used for the insert member, and was put on the bonding interface, and bonding temperature was kept for 60 seconds. A thickness of the insert member was 30 μm.

of 200 μm thick, which corresponds in constitution to JIS BNi-5, was used for the insert member, bonding temperature was 1400° C., and temperature holding time was set at 60 seconds.

Comparison 5

Metal pipes were bonded into a metal-pipe bonded body and the resultant bonded body was radially expanded in the same manner as in the example 7, except that an Ni alloy foil of 40 μm thick, which corresponds in constitution to JIS BNi-5, was used for the insert member, bonding temperature was 1450° C., and temperature holding time was set at 60 seconds.

The metal-pipe bonding bodies of the examples 7 to 9, and the comparisons 4 and 5 were subjected to measurement of the maximum steps formed on the bonding portions, and a flaw detection test and a tension test. The measurement and test results are shown in Table 3.

TABLE 3

| Test No. | Comparison 4 | Example 7 | Example 8 | Example 9 | Comparison 5 |
|---|---|---|---|---|---|
| Material of steel pipe | API H40 | API H40 | API H40 | API H40 | API H40 |
| Outer diameter of steel pipe (inch) | 7.00 | 7.00 | 7.00 | 7.00 | 7.00 |
| Thickness of steel pipe (inch) | 0.231 | 0.231 | 0.231 | 0.231 | 0.231 |
| Pipe end expansion rate (%) | 15 | 15 | 15 | 15 | 15 |
| Bonding surface roughness (Rmax: μm) | 30 | 30 | 30 | 30 | 30 |
| Material of insert member | BNi-5 | BNi-5 | BNi-5 | BNi-5 | BNi-5 |
| Melting point (° C.) of insert member | 1140 | 1146 | 1140 | 1140 | 1140 |
| Thickness (μm) of insert member | 200 | 100 | 30 | 40 | 40 |
| Form of insert member | foil | scale | powder | foil | foil |
| Bonding temperature (° C.) | 1400 | 1300 | 1300 | 1250 | 1450 |
| Temperature holding time(s) | 300 | 180 | 60 | 60 | 60 |
| Pressure (MPa) | 5.0 | 4.0 | 4.0 | 4.0 | 2.0 |
| Bonding atmosphere | Ar | Ar | Ar | Ar | Ar |
| Heating method for bonding portions | high frequency induction heating method (3 KHz) | | | | |
| Max. step of bonding portions | 0.5 | 0.5 | 0.5 | 0.5 | 0.5 |
| Pipe expansion rate (%) | 25 | 25 | 25 | 25 | 25 |
| Flaw detection test result of bonding surface | cracks | no cracks | no cracks | no cracks | cracks |
| Tensile strength (MPa) in tension test | 588 | 718 | 721 | 718 | 657 |
| Fractured position in tension test | bonding interface | base metal | base metal | base metal | bonding interface |
| Evaluation | B | A | A | A | B |

EXAMPLE 9

Metal pipes were bonded into a metal-pipe bonded body and the resultant bonded body was radially expanded in the same manner as in the example 7, except that an Ni alloy foil of 40 μm thick, which corresponds in constitution to JIS BNi-5, was used for the insert member, bonding temperature was 1250° C., and temperature holding time was set at 60 seconds.

Comparison 4

Metal pipes were bonded into a metal-pipe bonded body and the resultant bonded body was radially expanded in the same manner as in the example 7, except that an Ni alloy foil In the comparison 4 using the insert member of 40 μm thick, cracks of the bonding portions were detected by the flaw detection test after the pipe expansion, although the temperature holding time was set at 300 seconds. The tensile strength was 588 MPa, and a test piece was fractured the bonding interface. The reason for this may be estimated such that since the insert member was thick, elements contained in the insert member were insufficiently diffused, and hence a deformability of each bonding portion is reduced.

In the comparison 5 in which the bonding temperature was 1450° C., melting of the base metal-was found in the bonding portion. In the flaw detection test after the pipe expansion, cracks in the bonding portions were detected. A tensile strength was 657 MPa, and a test piece was fractured at the bonding interface.

In the examples 7 to 9 in which a thickness of the insert member was 100 μm or less and the bonding temperature was 1400° C. or lower, no melting of the base metal was not found in the bonding portions, and in the flaw detection test after the pipe expansion, no crack of the bonding portions was detected. Their tensile strength were 718 MPa to 721 MPa, and all of the test pieces were fractured in the base metals.

In the examples 7 to 9 and the comparisons 4 and 5, the pipe-end expansion rate of the metal pipe was set at 15%, and then the maximum steps were 0.5 mm.

As seen from the results mentioned above, when the metal pipes are bonded by the liquid-phase diffusion bonding method, if the thickness of the insert member is 100 μm or less, no cracks is formed in the bonding portions after the pipe expansion process, and the resultant metal-pipe bonded body of high bonding strength can be produced. Further, the results teaches that to reduce the melting of the base metal in the bonding portion, it is necessary to set the bonding temperature set at 1400° C. or lower.

EXAMPLE 10

Metal pipes were bonded into a metal-pipe bonded body and the resultant bonded body was radially expanded by the method A. Each of the metal pipes used was a carbon steel pipe of API H40, which has the outside diameter of 7 inches (≈178 mm) and a thickness of 0.231 inches (≈6 mm). The inside diameter of each end portion of each steel pipe was increased so as to have pipe-end expansion rate of 15%.

The end faces of the steel pipes of which the end portions are increased in inside diameter were machined to have a surface roughness Rmax of 30 μm or less. An Ni alloy foil which corresponds in constitution to JIS BNi-5, and has a melting point of 1140° C. and a thickness of 40 μm, was put in the bonding interface, and in this state the bonding portions of the metal pipes were subjected to a liquid-phase diffusion bonding process. A metal-pipe bonded body thus formed was radially expanded by use of a mandrel to have an expansion rate of 25%.

The method of heating the bonding portions of the metal-pipe bonded body was the high frequency induction heating method in which the frequency of a high-frequency current was 3 kHz. The bonding conditions were: 1400° C. for bonding temperature, 30 seconds for temperature holding time, 5 MPa for applied pressure, and Ar atmosphere for bonding atmosphere.

EXAMPLE 11

A metal-pipe bonded body was manufactured and radially expanded in substantially the same manner as of the example 10, except that temperature holding time was 300 seconds, and applied pressure was 1.5 MPa.

Comparison 6

A metal-pipe bonded body was manufactured and radially expanded in the same manner as of the example 10, except that temperature holding time was 15 seconds.

Comparison 7

Metal pipes were bonded into a metal-pipe bonded body and the resultant bonded body was radially expanded in the same manner as in the example 10, except that an Ni alloy foil of 30 μm thick, which corresponds in constitution to JIS BNi-5, was used for the insert member, temperature holding time was 300 seconds and applied pressure was 1 MPa.

Comparison 8

A metal-pipe bonded body was manufactured and radially expanded in the same manner as of the example 10, except that bonding temperature was 1250° C., temperature holding time was 300 seconds, and applied pressure was 7 MPa.

The metal-pipe bonding bodies of the examples 10 to 11, and the comparisons 6 to 8 were subjected to measurement of the maximum steps of the bonding portions, and a flaw detection test and a tension test. The measurement and test results are shown in Table 4.

TABLE 4

| Test No. | Comparison 6 | Example 10 | Comparison 7 | Example 11 | Comparison 8 |
|---|---|---|---|---|---|
| Material of steel pipe | API H40 | API H40 | API H40 | API H40 | API H40 |
| Outer diameter of steel pipe (inch) | 7.00 | 7.00 | 7.00 | 7.00 | 7.00 |
| Thickness of steel pipe (inch) | 0.231 | 0.231 | 0.231 | 0.231 | 0.231 |
| Pipe end expansion rate (%) | 15 | 15 | 15 | 15 | 15 |
| Bonding surface roughness (Rmax: μm) | 30 | 30 | 30 | 30 | 30 |
| Material of insert member | BNi-5 | BNi-5 | BNi-5 | BNi-5 | BNi-5 |
| Melting point (° C.) of insert member | 1140 | 1140 | 1140 | 1140 | 1140 |
| Thickness (μm) of insert member | 40 | 40 | 30 | 40 | 40 |
| Form of insert member | foil | foil | foil | foil | foil |
| Bonding temperature (° C.) | 1400 | 1400 | 1400 | 1400 | 1250 |
| Temperature holding time(s) | 15 | 30 | 300 | 300 | 300 |
| Pressure (MPa) | 5.0 | 5.0 | 1.0 | 1.5 | 7.0 |
| Bonding atmosphere | Ar | Ar | Ar | Ar | Ar |
| Heating method for bonding portions | high frequency induction heating method (3 KHz) | | | | |
| Max. step of bonding portions | 0.5 | 0.5 | 0.5 | 0.5 | 0.5 |
| Pipe expansion rate (%) | 25 | 25 | 25 | 25 | 25 |
| Flaw detection test result of bonding surface | cracks | no cracks | cracks | no cracks | cracks |
| Tensile strength (MPa) in tension test | 563 | 709 | 628 | 714 | 687 |
| Fractured position in tension test | bonding interface | base metal | bonding interface | base metal | bonding interface |
| Evaluation | B | A | B | A | B |

In the comparison 6 in which the temperature holding time 15 seconds, cracks of the bonding portions were detected in the flaw detection test after the pipe expansion process. A tensile strength was 563 MPa, and a test piece was fractured at the bonding interface. The reason why the bonding portions are cracked may be estimated such that since the temperature holding time is short, insufficient element diffusion in the bonding interface was performed, and hence a deformability of each bonding portion is reduced.

In the comparison 7 in which the pressure was set at 1 MPa, cracks of the bonding portions were detected in the flaw detection test after the pipe expansion process although the temperature holding time was 300 seconds. A tensile strength was 628 MPa, and a test piece was fractured at the bonding interface. The reason why the bonding portions are cracked may be estimated such that since the pressure applied was low, contact of the bonding surfaces was poor, part of the bonding surfaces remained unbonded, a deformability of the entire bonding interface was reduced.

In the comparison 8 where the pressure applied to between the bonding portions was set at 7 MPa, the bonding portions were excessively deformed although the bonding temperature was reduced to 1250° C. Cracks of the bonding portions were detected in the flaw detection test after the pipe expansion process. A tensile strength was 687 MPa, and a test piece was fractured at the bonding interface.

In the example 10 where the applied pressure was 5 MPa and the temperature holding time was 30 seconds, and the example 11 where the applied pressure was 1.5 MPa and the temperature holding time was 300 seconds, no cracks of the bonding interfaces were detected in the flaw detection test after the pipe expansion process. A tensile strength of each bonding portion was 709 MPa, comparable with that of the base metal. The test piece was fractured in the base metal.

In the examples 10 and 11 and the comparisons 6 to 8, the pipe-end expansion rate of the metal pipe was set at 15%, and then the maximum steps were 0.5 mm.

As seen from the results mentioned above, when the metal pipes are bonded by the liquid-phase diffusion bonding method, if the applied pressure is between 1.5 MPa to 5 MPa, no crack is formed in the bonding portions after the pipe expansion process, and the resultant metal-pipe bonded body of high bonding strength can be produced.

EXAMPLE 12

Metal pipes were bonded into a metal-pipe bonded body and the resultant bonded body was radially expanded by the method A. Each of the metal pipes used was a steel pipe of API grade LC52-1200 (referred to as "LC52-1200") as one of the martensite steel. The steel pipe has an outside diameter of 10.75 inches (≈269 mm), and a thickness of 0.5 inch (≈13 mm). The inside diameter of each end portion of each steel pipe was increased so as to have an pipe-end expansion rate of 15%.

The end face of each expanded metal pipe was machined to have a surface roughness Rmax of 30 μm. An insert member used was an Ni alloy foil of 100 μm thick and 1140° C. in melting point, which corresponds in constitution to JIS BNi-5. The insert member was placed on the bonding interface and bonded by the liquid-phase diffusion bonding method. The resultant metal-pipe bonded body was radially expanded, by use of a mandrel, to have a pipe expansion rate of 25%.

A high frequency induction heating method in which the frequency of a high-frequency current was 3 kHz, was used for heating the bonding portions. The bonding conditions were: bonding temperature was 1300° C., temperature holding time was 120 seconds, pressure applied was 4 MPa, and bonding atmosphere was Ar atmosphere.

EXAMPLE 13

A metal-pipe bonded body was manufactured and radially expanded in the same manner as of the example 12, except that bonding temperature was 1350° C., temperature holding time was 210 seconds, applied pressure was 3.5 MPa, and a frequency of a high-frequency current fed to an induction coil was 100 kHz.

A metal-pipe bonded body was manufactured and radially expanded in the same manner as of the example 12, except that bonding temperature was 1350° C., temperature holding time was 210 seconds, applied pressure was 3.5 MPa, and a frequency of a high-frequency current fed to an induction coil was 25 kHz.

Comparison 9

A metal-pipe bonded body was manufactured and radially expanded in the same manner as of the example 12, except that a surface roughness Rmax of each bonding surface was 100 μm, bonding temperature was 1400° C., and temperature holding time was 300 seconds.

Comparison 10

A metal-pipe bonded body was manufactured and radially expanded in the same manner as of the example 12, except that temperature holding time was 300 seconds, applied pressure was 5 MPa, and a frequency of a high-frequency current fed to an induction coil was 400 kHz.

The metal-pipe bonding bodies of the examples 12 to 14, and the comparisons 9 and 10 were subjected to measurement of the maximum steps of the bonding portions, and a flaw detection test and a tension test. The measurement and test results are shown in Table 5.

TABLE 5

| Test No. | Comparison 9 | Example 12 | Comparison 10 | Example 13 | Example 14 |
|---|---|---|---|---|---|
| Material of steel pipe | LC52-1200 | LCS2-1200 | LC52-1200 | LC52-1200 | LC52-1200 |
| Outer diameter of steel pipe (inch) | 10.75 | 10.75 | 10.75 | 10.75 | 10.75 |
| Thickness of steel pipe (inch) | 0.500 | 0.500 | 0.500 | 0.500 | 0.500 |
| Pipe end expansion rate (%) | 15 | 15 | 15 | 15 | 15 |
| Bonding surface roughness (Rmax: μm) | 100 | 50 | 30 | 30 | 30 |
| Material of insert member | BNi-5 | BNi-5 | BNi-5 | BNi-5 | BNi-5 |
| Melting point (° C.) of insert member | 1140 | 1140 | 1140 | 1140 | 1140 |
| Thickness (μm) of insert member | 40 | 40 | 40 | 40 | 40 |
| Form of insert member | foil | foil | foil | foil | foil |
| Bonding temperature (° C.) | 1400 | 1300 | 1400 | 1350 | 1350 |
| Temperature holding time(s) | 300 | 120 | 300 | 210 | 210 |
| Pressure (MPa) | 5.0 | 4.0 | 5.0 | 3.5 | 3.5 |
| Bonding atmosphere | Ar | Ar | Ar | Ar | Ar |
| Heating method for bonding portions | high frequency induction heating method (3 KHz) | | | | |

TABLE 5-continued

| Test No. | Comparison 9 | Example 12 | Comparison 10 | Example 13 | Example 14 |
|---|---|---|---|---|---|
| Max. step of bonding portions | 0.5 | 0.5 | 0.5 | 0.5 | 0.5 |
| Pipe expansion rate (%) | 25 | 25 | 25 | 25 | 25 |
| Flaw detection test result of bonding surface | cracks | no cracks | cracks | no cracks | no cracks |
| Tensile strength (MPa) in tension test | 477 | 655 | 431 | 658 | 653 |
| Fractured position in tension test | bonding interface | base metal | bonding interface | base metal | base metal |
| Evaluation | C | A | C | A | A |

In the example 9 where the surface roughness Rmax=100 μm, cracks of the bonding portion were detected in the flaw detection test after the pipe expanding process although the diffusion bonding was performed under the conditions of relatively high temperature, high pressure and long time. A tensile strength was 477 MPa, and a test piece was fractured at the bonding interface. The reason why the bonding portions are cracked may be estimated such that since the surface roughness is high, the irregularity on the bonding interface is insufficiently filled with molten Ni alloy, and hence a deformability of each bonding portion is reduced.

In the comparison 11 where the bonding portions are heated by the high-frequency current of 400 kHz, cracks of the bonding portion were detected in the flaw detection test after the pipe expanding process although the diffusion bonding was performed under the conditions of relatively high temperature, high pressure and long time. A tensile strength was 431 MPa, and a test piece was fractured at the bonding interface. The reason why the bonding portions are cracked may be estimated such that since the bonding interface is not uniformly heated, part of the inner surfaces of the metal pipes are unbonded, and hence a deformability of each bonding portion is reduced.

In the examples 12 to 14 where the surface roughness Rmax of the bonding interface is 50 μm and a frequency of the high frequency current is 100 kHz or lower, no cracks of the bonding portion was detected in the flaw detection test after the pipe expanding process. A tensile strength of each bonding portion was about 655 MPa, comparable with that of the base metal. The test pieces were fractured at the bonding interfaces.

In the examples 12 to 14 and the comparisons 9 and 10, the pipe-end expansion rate of the metal pipe was set at 15%, and then the maximum steps were 0.5 mm.

As seen from the test results mentioned above, when the metal pipes are bonded by the liquid-phase diffusion bonding method, if the surface roughness Rmax of the bonding interface is set at 50 μm or less, no crack is formed in the bonding portions after the pipe expansion process, and the resultant metal-pipe bonded body of high bonding strength can be produced. Further, reduction of the deformability of the bonding portion, which is due to the unbonded part of the bonding portion, can be suppressed if the frequency of the high frequency current is selected to be 100 kHz or lower in the high frequency induction heating method or the high frequency direct heating method.

EXAMPLE 15

Metal pipes were bonded into a metal-pipe bonded body and the resultant bonded body was radially expanded by the method B. Each of the metal pipes used was a carbon steel pipe of API 40H, of which the inside diameter was 7 inches (≈178 mm) and a thickness was 0.23 inch (≈6 mm). The resultant metal-pipe bonded body was radially expanded to have a pipe-end expansion of 10%.

The outer surface of each end portion of each metal pipe was threaded. The metal pipes thus threaded were connected together by means of a joint of which the inner surface is threaded to form a metal-pipe bonded body. The resultant metal-pipe bonded body was radially expanded by use of a mandrel so as to have the pipe expansion rate of 10%.

EXAMPLE 16

A metal-pipe bonded body was manufactured and radially expanded in the same manner as in the example 15, except that the pipe-end expansion rate of each metal pipe was set at 25% and the pipe expansion rate of the metal-pipe bonded body was set at 25%.

EXAMPLE 17

A metal-pipe bonded body was manufactured and radially expanded in the same manner as in the example 15, except that the metal pipe used was a steel pipe of LC52-1200, which is 10.75 inches (≈273 mm) in outside diameter and 0.5 inch (≈12.7 mm) in thickness, and the pipe-end expansion rate of each metal pipe was set at 25% and the pipe expansion rate of the metal-pipe bonded body was set at 25%.

Comparison 1

A metal-pipe bonded body was manufactured and radially expanded in the same manner as in the example 15, except that the pipe-end expansion rate of each metal pipe was set at 0%.

Comparison 12

A metal-pipe bonded body was manufactured and radially expanded in the same manner as in the example 15, except that the metal pipe used was a steel pipe of LC52-1200, which is 10.75 inches (≈273 mm) in outside diameter and 0.5 inch (≈127 mm) in thickness, and the pipe-end expansion rate of each metal pipe was set at 15% and the pipe expansion rate of the metal-pipe bonded body was set at 25%.

The example 15 to 17 and the comparisons 11 to 12 were subjected to a hydraulic test. The test results are shown in Table 6.

TABLE 6

| Test No. | Comparison 11 | Example 15 | Example 16 | Example 17 | Comparison 12 |
|---|---|---|---|---|---|
| Material of steel pipe | API H40 | API H40 | API H40 | LC52-1200 | LC52-1200 |
| Outer diameter of steel pipe (inch) | 7.00 | 7.00 | 7.00 | 10.75 | 10.75 |
| Thickness of steel pipe (inch) | 0.231 | 0.231 | 0.231 | 0.500 | 0.500 |
| Pipe end expansion rate (%) | 0 | 10 | 25 | 25 | 15 |
| Pipe expansion rate (%) | 10 | 10 | 25 | 25 | 20 |
| Hydraulic test pressure (psi) | 2100 | 2100 | 2100 | 2100 | 2100 |
| Hydraulic test results | leakage | good | good | good | leakage |
| Evaluation | C | A | A | A | C |

The comparison 11 in which the pipe-end expansion rate of the metal pipe was 0% and the expansion rate of the metal-pipe bonded body was 10%, was subjected to a hydraulic test under pressure of 2100 psi. The result was that water leaked from the bonding portions.

The example 15 in which the pipe-end expansion rate and the expansion rate were 10%, and the example 16 in which the pipe-end rate and the expansion rate were 25%, were also subjected to a hydraulic test under pressure of 2100 psi. The result was that no water leaked from the bonding portions.

The comparison 12 in which the pipe-end expansion rate of the metal pipe was 15% and the expansion rate of the metal-pipe bonded body was 20%, was subjected to a hydraulic test under pressure of 3000 psi. The result was that water leaked from the bonding portions.

The example 17 in which the pipe-end expansion rate and the expansion rate were 15% was subjected to a hydraulic test under pressure of 3000 psi. The result was that no water leaked from the bonding portions.

From the tests, it is seen that to increase the air-tightness of the metal-pipe bonded body, it is necessary to set the expansion rate at a value smaller than the pipe-end expansion rate.

EXAMPLE 18

A metal-pipe bonded body was manufactured and radially expanded by the method C. Metal pipes used were steel pipes of STKM12B (JIS G3445), each having an outside diameter of 140 mm and a thickness of 7 mm. The end faces of those steel pipes were machined to have a surface roughness Rmax of 30 m. The insertion member used was an Ni alloy foil of which a melting point was 1050° C. and a thickness was 50 $\mu$m. The steel pipes were bonded into a metal-pipe bonded body by a diffusion bonding process, while the insert members were placed at the bonding interfaces. The resultant metal-pipe bonded body was radially expanded by use of a mandrel so as to have a pipe-end expansion rate of 5 to 25%.

A high frequency induction method in which the high frequency current was 3 kHz was used for heating the bonding portions. Two types of heating coils were used, one having a heating width of 20 mm and the other having a heating width of 40 mm. The bonding conditions were: bonding temperature was 1250 to 1350° C., temperature holding time was 60 to 300 seconds, pressure applied was 1 to 4 MPa, and bonding atmosphere was Ar atmosphere. The lateral expansion rate was adjusted to an appropriate value by varying the bonding conditions.

The resultant metal-pipe bonded body was tested for such following items as the lateral expansion rate, expansion length, and cracks (after pipe expansion), and the measurement results are shown in Table 7. The table also shows a tensile strength of the non-bonding portion of each metal pipe after it was radially expanded at a given expansion rate (denoted as "base metal" in the table).

TABLE 7

| Test No. | Bonding conditions | | | Lateral Expansion rate (%) | Heating width (mm) | Expansion length (mm) | Tensile strength before expansion (MPa) |
|---|---|---|---|---|---|---|---|
| | Bonding Temp. (° C.) | Holding Time(s) | Pressure (MPa) | | | | |
| 1 | 1250 | 60 | 1.0 | 1.00 | 20 | 0 | 464 |
| 2 | 1250 | 60 | 1.0 | 1.00 | 40 | 0 | 463 |
| 3 | 1250 | 60 | 4.0 | 1.02 | 20 | 40 | 480 |
| 4 | 1250 | 60 | 4.0 | 1.02 | 40 | 80 | 466 |
| 5 | 1350 | 60 | 2.0 | 1.04 | 20 | 45 | 485 |
| 6 | 1350 | 60 | 2.0 | 1.04 | 40 | 90 | 470 |
| 7 | 1300 | 60 | 4.0 | 1.06 | 20 | 43 | 483 |
| 8 | 1300 | 60 | 4.0 | 1.06 | 40 | 85 | 468 |
| 9 | 1350 | 60 | 4.0 | 1.08 | 20 | 47 | 486 |
| 10 | 1350 | 60 | 4.0 | 1.08 | 40 | 90 | 460 |
| 11 | 1350 | 300 | 4.0 | 1.14 | 20 | 50 | 483 |
| A* | — | — | — | — | — | — | 490 |

| | Bonding-portion expansion test results | | | | |
|---|---|---|---|---|---|
| | Expansion rate (5%) | Expansion rate (10%) | Expansion rate (15%) | Expansion rate (20%) | Expansion rate (25%) |
| | Tensile Strength | Tensile Strength | Tensile Strength | Tensile Strength | Tensile Strength |

TABLE 7-continued

| No. | Crack | (MPa) | Crack | (MPa) | Crack | (MPa) | Crack | (MPa) | Crack | (MPa) |
|---|---|---|---|---|---|---|---|---|---|---|
| 1 | No | 515 | Yes | — | Yes | — | Yes | — | Yes | — |
| 2 | No | 517 | Yes | — | Yes | — | Yes | — | Yes | — |
| 3 | No | 511 | No | 550 | No | 557 | Yes | — | Yes | — |
| 4 | No | 501 | No | 543 | No | 558 | No | 564 | Yes | — |
| 5 | No | 502 | No | 544 | No | 551 | No | 559 | Yes | — |
| 6 | No | 482 | No | 532 | No | 540 | No | 549 | No | 554 |
| 7 | No | 480 | No | 541 | No | 549 | No | 555 | No | 562 |
| 8 | No | 471 | No | 533 | No | 540 | No | 547 | No | 555 |
| 9 | No | 486 | No | 525 | No | 541 | No | 547 | No | 557 |
| 10 | No | 458 | No | 478 | No | 528 | No | 539 | No | 551 |
| 11 | No | 480 | No | 486 | No | 505 | No | 536 | No | 543 |
| *A | No | 555 | No | 563 | No | 575 | No | 584 | No | 591 |

*A: Base material

Table 7 shows that the expansion length increases with increase of the heating width of the heating coil. Specifically, the expansion length was 40 mm to 50 mm for the heating width of 20 mm, and the expansion length was 80 mm to 90 mm for the heating width of 40 mm.

Table 7 further teaches that when the expansion length is 40 to 50 mm, the expansion rate of the produced metal-pipe bonded body increases with increase of the lateral expansion rate.

As seen, when the lateral expansion rate was 1.00, the bonding portions were cracked when the expansion rate was 10%, and the resultant product was not good (test No. 1). When the lateral expansion rate was 1.02, the bonding portions were not cracked when the expansion rate was 15% or less, and were cracked when the expansion rate was 20% or larger (test No. 3).

When the lateral expansion rate was 1.04 or greater (test Nos. 5, 7, 9, 11), the bonding portions were not cracked even when the expansion rate was 20%, and the resultant product was good having a bonding strength comparable with that of the base metal.

When the expansion length is 80 to 90 mm, the expansion rate of the produced metal-pipe bonded body increases with increase of the lateral expansion rate (test Nos. 2, 4, 6, 8, 10).

Additionally, Table 7 indicates that when the lateral expansion rate is set at a fixed value, the produced metal-pipe bonded body is more durable against its expansion with increase of the expansion length. In a specific example, the in bonding portions were cracked when the lateral expansion rate was 1.02 and the expansion length was 40 mm, and the expansion rate was 20% (test No. 3). In another example, when the expansion length was 80 mm, no cracks were detected in the bonding portions if the resultant bonded body was expanded at the expansion rate of 20%. A bonding strength of the bonded body was comparable with that of the base metal (test No. 4).

Cracks were detected in the bonding portions when the bonded body was expanded at the expansion rate 25% under the conditions that the lateral expansion rate was 1.04 and the expansion length was 45 mm (test No. 5). No cracks were detected in the bonding portions when the expansion length was 90 mm even when the bonded body was expanded at the expansion rate 25% (test No. 5).

As seen from the test results, in case where the metal pipes of which the end portions are not expanded are butted and each bonding portion is expanded at a given pipe-end expansion rate into a barrel shape in the diffusion bonding process, the bonding portions are not cracked and the bonded body has a good bonding strength even if the resultant metal-pipe bonded body is expanded at a high expansion rate.

EXAMPLE 19

A metal-pipe bonded body was manufactured and radially expanded by the method A'. The metal pipes used were carbon steel pipes of API H40 having an outside diameter 7 inches (≈178 mm) and a thickness of 0.231 inch (≈6 mm). Each end portion of each steel pipe was radially expanded to have a pipe-end expansion rate of 5%.

The end faces of the expanded end portions of the metal pipes were beveled, and welded together by a gas shielded arc welding method. The resultant bonded body was expanded so as to have an expansion rate of 25% by use of a mandrel.

A welding wire was a JIS YGW21 ($\phi$1.2 mm), and a shielding gas was a mixture gas of Ar+20% $CO_2$, and a welding current was 280A.

EXAMPLES 20 AND 21

Comparisons 13 and 14

Metal-pipe bonding bodies were manufactured and radially expanded in the same manner as of the example 19, except that the pipe-end expansion rate of the metal pipe 30 was 0% (comparison 13), 3% (comparison 14), 10% (example 20) and 15% (example 21).

The examples 20 and 21, and the comparisons 13 and 14 were subjected to a flaw detection test and a tensile test in the same manner as in the example 1. The test results are shown in Table 8.

TABLE 8

| Test No. | Comparison 13 | Comparison 14 | Example 19 | Example 20 | Example 21 |
|---|---|---|---|---|---|
| Material of steel pipe | API H40 | API H40 | API H40 | API H40 | API H40 |
| Outer diameter of steel pipe (inch) | 7.00 | 7.00 | 7.00 | 7.00 | 7.00 |

TABLE 8-continued

| Test No. | Comparison 13 | Comparison 14 | Example 19 | Example 20 | Example 21 |
| --- | --- | --- | --- | --- | --- |
| Thickness of steel pipe (inch) | 0.231 | 0.231 | 0.231 | 0.231 | 0.231 |
| Pipe end expansion rate (%) | 0 | 3 | 5 | 10 | 15 |
| Welding method | gas shield welding method welding wire: JIS YGW21 (1.2 mm) Shielding gas: Ar + 20% $CO_2$ welding current: 280 A | | | | |
| Pipe expansion rate (%) | 25 | 25 | 25 | 25 | 25 |
| Flaw test result of bonding portion surface | Cracks | Cracks | No cracks | No cracks | No cracks |
| Tensile strength (MPa) in tension test | 317 | 495 | 721 | 719 | 720 |
| Fractured portion in tension test | Welding portion | Welding portion | Base material | Base material | Base material |
| Evaluation | C | B | A | A | A |

In the comparison 13 in which the pipe-end expansion rate was 0%, many cracks were detected in the flaw detection test after the pipe expansion. The tensile strength was low, 317 MPa, and the test piece was fractured at the welded portion.

In the comparison 14 in which the pipe-end expansion rate was 3%, many cracks were detected in the flaw detection test after the pipe expansion. The number of cracks was smaller than that in the example 13. The tensile strength was improved to 495 MPa, and the test piece was fractured at the welded portion.

Also in the examples 19 to 21 in which the pipe-end expansion rate is set at 5%, 10% and 15%, no cracks were detected in the bonding portions in the flaw detection test after the pipe expansion, but the number of cracks is smaller than that of the comparison 13. The tensile strength was about 720 MPa, comparable with that of the base metal. The test piece was fractured in the base metal.

From the test results, it is seen that if the inside diameter of each end portion of each metal pipe is increased so as to have a pipe-end expansion rate in excess of a predetermined value, a chance of cracking the bonding portions becomes less with increase of the pipe-end expansion rate. Accordingly, the produced metal-pipe bonded body has a high bonding strength.

While specific embodiments of the present invention have been described, it should be understood that the present invention is not limited to the above-mentioned embodiments, but may be modified, altered and changed within the true spirit of the invention.

The mandrel used for expanding the metal-pipe bonded body may take a proper form, such as a tapered mandrel or a mandrel of which the tapered portion is provided with a roller.

The drive means for the mandrel may also take a proper means. In an example of the drive means, a shaft is fastened on the bottom surface of the mandrel, and the shaft is used for pushing the mandrel into the metal-pipe bonded body. In another example, hydraulic pressure is applied to the bottom surface of the mandrel to move the mandrel within the mandrel from one end to the other end of the bonded body.

In the above-mentioned embodiments, the diffusion bonding method, the screw connecting method or the welding method is used for bonding the metal pipes each configured such that the inside diameter of the bonding portion is larger than that of the non-bonding portion into a metal-pipe bonded body. A frictional press-contacting method may be used for the same purpose, in place of any of the bonding methods.

An expandable metal-pipe bonded body and a method of manufacturing the same, which are the embodiments of the present invention are well adaptable for an oil well tube, such as a casing tube, which is inserted in use into the ground. It is evident that the metal-pipe bonded body of the invention may be applied to the gas well, geothermal well, hot spring well, water well and others, or line pipes laid on the ground, plant line arrangement, and the method of manufacturing such a metal-pipe bonded body may be applied to the method of manufacturing the latter ones.

In the present invention which is embodiment in the form of an expandable metal-pipe bonded body and a method of manufacturing the same, an expandable metal-pipe bonded body in which the inside diameter of each bonding portion of each of the metal pipe is larger than the inside diameter of the non-bonding portion of each of the metal pipe, is radially expanded by a mandrel. Therefore, the metal-pipe bonded body may be expanded with less deformation resistance. In other words, the pipe expanding work is smooth with less power.

The expandable metal-pipe bonded body in which the inside diameter of each bonding portion of each of the metal pipe is larger than the inside diameter of the non-bonding portion of each of the metal pipe may readily be produced in a manner that the end portions of the metal pipes are radially expanded at a predetermined pipe-end expansion rate, and the resultant metal pipes are bonded end to end, and the bonded portions are diffusion bonded or welded.

When the metal-pipe bonded body is radially expanded, a plastic deformation of the bonding portion is smaller than that of the non-bonding portion. Therefore, in such a case where a thermally affected portion is created in the bonding portion in the diffusion bonding or the welding process and a a deformability of the bonding portion is reduced, the bonding portion is hard to be cracked. Accordingly, the metal-pipe bonded body produced is excellent in strength and air-tightness.

When metal pipes of which the end portions are increased in inside diameter at a predetermined pipe-end expansion rate are bonded, by the screw connecting method, into a metal-pipe bonded body, and the resultant bonded body is radially expanded at a pipe expansion rate smaller than the pipe-end expansion rate, there is no chance of plastic deformation of the screw-connected portions. Therefore, there is eliminated reduction of the air-tightness, which is caused by loosening of the screw portion.

Even when the metal pipes of which the end portions are not radially expanded are bonded end to end, and bonded by the diffusion bonding method while at the same time those bonding portions are radially expanded into a barrel shape, the expandable metal-pipe bonded body in which the inside diameter of each bonding portion of each of the metal pipe is larger than the inside diameter of the non-bonding portion of each of the metal pipe may readily be produced.

When the end portions of the metal pipes are radially increased at a predetermined pipe-end expansion rate, those metal pipes are bonded end to end and jointed together by the diffusion bonding method, the steps formed on the inner surfaces of the bonding portions are reduced even if the metal pipes have some variations of their the dimensional values. Therefore, if the metal-pipe bonded body is radially expanded, no cracking of the bonding portion is caused by the stress concentration, and further no corrosive material stays at the bonding portions. Therefore, the produced metal-pipe bonded body is excellent in strength, fatigue characteristic and corrosion resistance.

As described above, the present invention, which is embodiment into an expandable metal-pipe bonded body and a method of manufacturing the same, can readily produce a metal-pipe bonded body advantageous in that less energy is consumed for radially expanding the bonded body, the air-tightness and strength are excellent, and the steps formed on the bonding portions are small. Therefore, if the metal-pipe bonded body is applied to the oil well tubes and line pipes, remarkable cost down is realized and high reliability is secured in the oil drilling and the pipe laying work. In this respect, it is believed that the present invention will contribute greatly to related industry.

FIG. 8A is a sectional view showing an expandable metal-pipe bonded body which forms a fourth embodiment of the present invention.

As shown in FIG. 8A, an expandable metal-pipe bonded body 130 includes a main bonded body 130a and a metal pipe 134 (referred to as an "end metal pipe") jointed to the end of the main bonded body 130a. The main bonded body 130a consists of a string of metal pipes 132 each having the inside diameter uniform over its entire length.

It is necessary that the inside diameter d1 of the non-bonding end 134a of the end metal pipe 134 is set in advance to be larger than the inside diameter do of the central portion of the end metal pipe 134 (this inside-diameter increase will be referred to as "diameter increase"). If the inside diameter of the non-bonding end 134a and its near portion is diameter-increased, a resistance to the insertion of a pipe expanding tool (to be described later) is reduced when comparing with a case where the inside diameter of those portions are not diameter increased. This is accompanied with advantages of eliminating a chance of breaking and deforming the expandable metal-pipe bonded body 130.

The inside diameter d1 of the non-bonding end 134a of the end metal pipe 134 may be larger than the outside diameter of the tool. In this case, a friction of a pipe expanding tool to be described later when it is inserted into the expandable metal-pipe bonded body 130 from its one end, rendering the tool insertion easy.

A length ranging from the non-bonding end 134a of the end metal pipe 134 to the inside-diameter increased portion (this length will be referred to as "diameter-increased length" and denoted as L in FIG. 8B) may properly be selected in consideration with the length of the pipe expanding tool used for the pipe expansion.

L The end metal pipe 134 may be bonded to one and/or both ends of the main bonded body 130a. In the case of the oil well tube, one end of it is located deep in the ground. In this case, it is preferable to bond the end metal pipe 134 to the other end of the oil well tube, which is located on the land. In the case of the pipe line, both ends of it are located on the land. In this case, the end metal pipes 134 are bonded to both ends of the main bonded body 130a.

Various pipe bonding methods may selectively be used for bonding the end metal pipe 134 to the metal pipes 132. An example of those pipe bonding methods is a mechanical bonding method, such as a screw connecting method, and another example is a metallurgical bonding or bonding method, such as a welding method or a diffusion bonding method.

The diffusion bonding method is superior to the screw connecting method since the former provides a joint having high strength and air-tightness. It is also superior to the welding method since the bonding work is short. For this reason, use of the diffusion bonding method is preferable for bonding the metal pipes. The diffusion bonding process is classified into a "solid-phase diffusion bonding process" and a "liquid-phase bonding process". Either of those processes may be used for the diffusion bonding process. In the former bonding process, the ends of metal pipes 130 are bonded together, and elements of the material of the metal pipe are diffused in a solid-phase state of the material. In the latter bonding process, an insert. member is inserted between the bonding surfaces of the metal pipes, and material elements are diffused while the insert member is temporarily molten.

The metal pipe 132 and the end metal pipe 134 which are handled in the present invention may be made of a material selected from among many materials. For the metal-pipe bonded body applied to such a use as to require only the mechanical characteristics of the pipe, carbon steel may be used for those metal pipes. Where mechanical strength and corrosion proof of the pipe are both required, stainless steel and Ti alloy pipes may be used for those metal pipes.

A case where an expandable metal-pipe bonded body 130 which is the fourth embodiment of the present invention is applied to a casing tube will be described with reference to FIGS. 9A to 10B. A bore hole 124 is dug in the ground by use of a drill pipe (not shown). Then, a main bonded body 130a is inserted into the bore hole 124. As recalled, the main bonded body 130a consists of a string of metal pipes 132 and its inside diameter is uniform over its entire length. The main bonded body 130a is lowered into the bore hole 124 while metal pipes 132 each having a uniform inside diameter are bonded one by one.

Figure 9A:
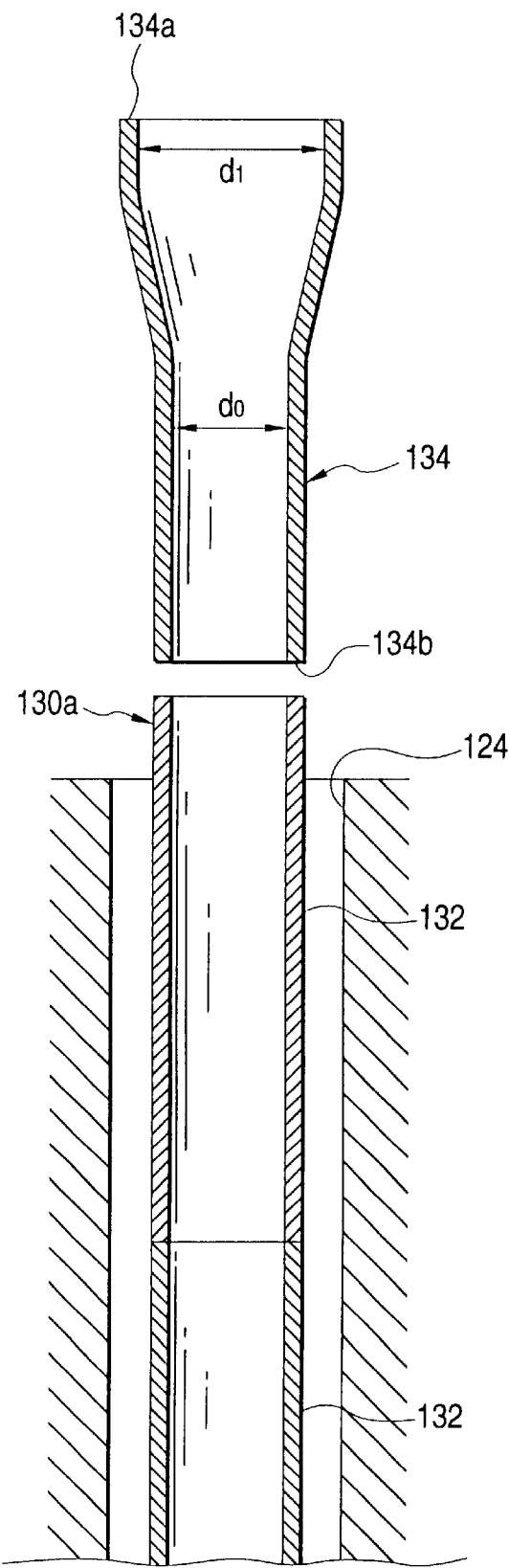
FIGS. 9A and 9B are cross sectional views showing a method of manufacturing the metal-pipe bonded body shown in FIG. 8A.

As shown in FIG. 9A, the main bonded body 130a having a proper length is clamped at the upper end of the bore hole 24 by use of a clamping mechanism (not shown). In this state, an end metal pipe 134 is moved toward the upper and the main bonded body 130a. As recalled, the inside diameter d1 of the non-bonding end 134a of the end metal pipe 134 is larger than the inside diameter d0 of the central portion thereof.

Figure 9B:
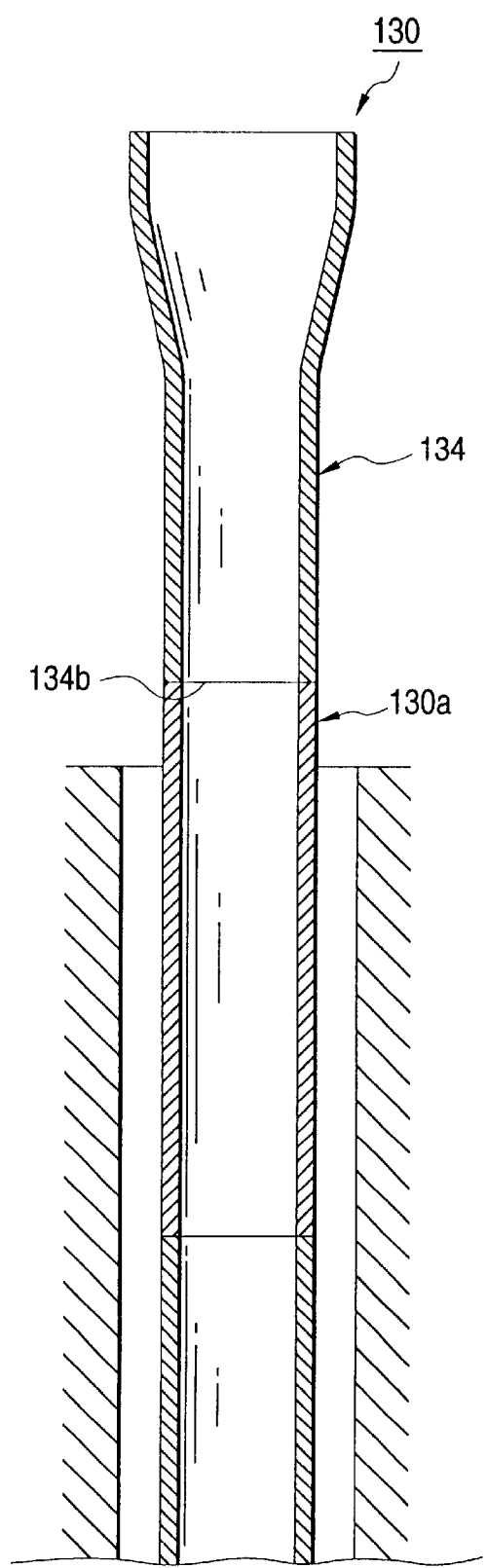

Then, as shown in FIG. 9B, the bonding end 134b of the end metal pipe 134 is made to abut against the upper end of the main bonded body 130a, to thereby bond the end metal pipe 34 to the main bonded body 130a. As a result, an expandable metal-pipe bonded body 130 having the diameter increased end portion is formed.

A method of radially expanding the thus formed expandable metal-pipe bonded body 130 will be described. An example of the bonded body expanding method is illustrated in FIG. 10. The expandable metal-pipe bonded body 130 is made to descend along the bore hole 124 till the upper end of the expandable metal-pipe bonded body 130 reaches a predetermined position, and clamped with a clamping mechanism (not shown).

Figure 10A:
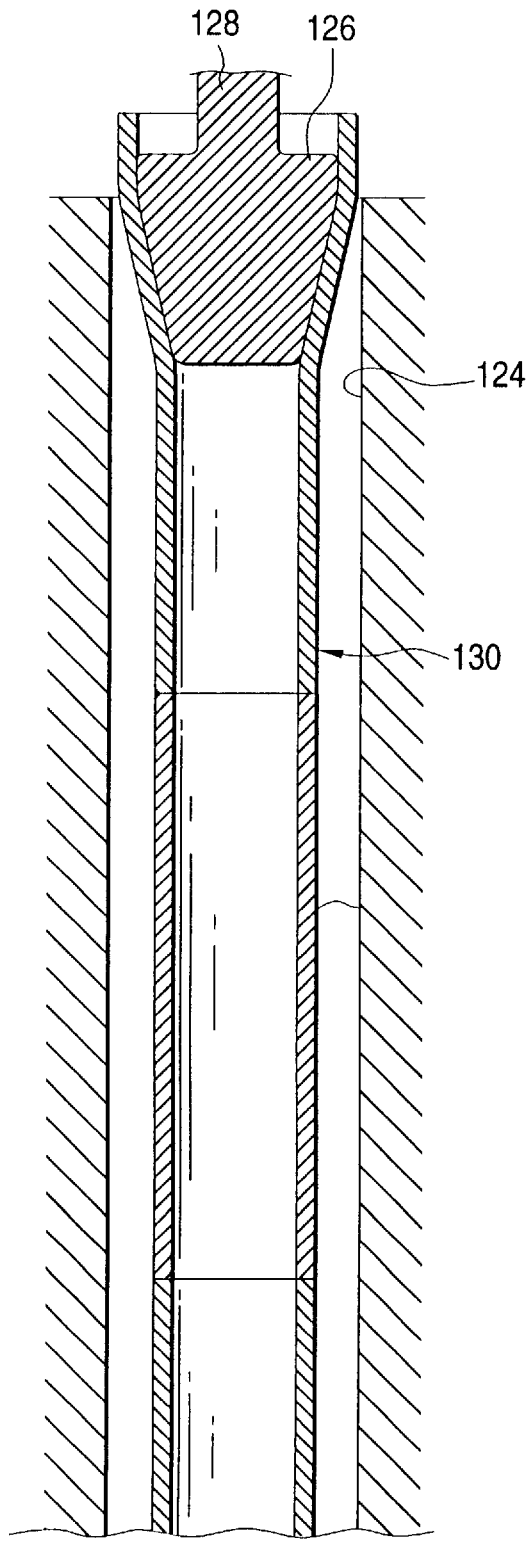
FIGS. 10A and 10B are cross sectional views showing a method of radially expanding the metal-pipe bonded body manufactured by the FIGS. 9A and 9B method.

As shown in FIG. 10A, a tapered mandrel 126 is inserted into the expandable metal-pipe bonded body 130 having the diameter-increased end portion. A shaft 128 is attached to the bottom end of the mandrel 126.

Figure 10B:
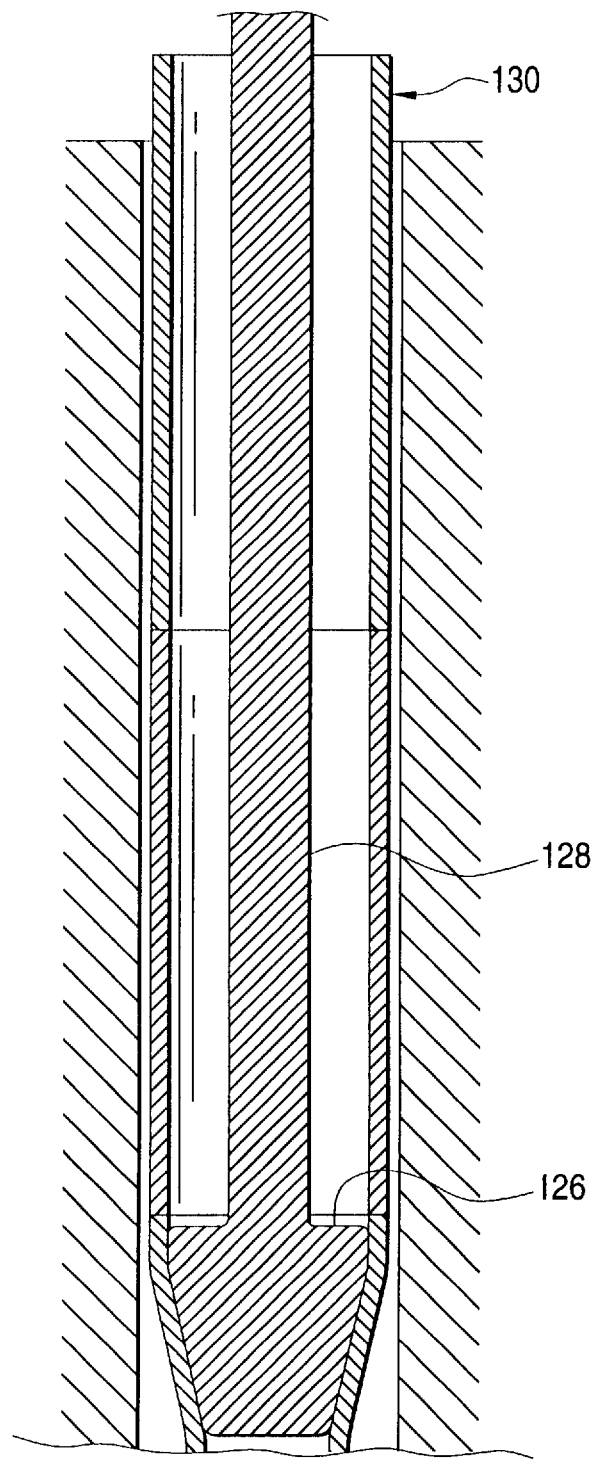

As shown in FIG. 10B, the mandrel 126 is pushed into the expandable metal-pipe bonded body 130 by use of the shaft 128. As a result, the expandable metal-pipe bonded body 130 is uniformly expanded in its inside diameter.

As described above, in the expandable metal-pipe bonded body of the fourth embodiment of the invention, a metal pipe of which the non-bonding end is diameter increased in advance is bonded to the end of the metal-pipe bonded body. Therefore, resistance of the mandrel when it is inserted is remarkably reduced, and as a result, the smooth insertion of the mandrel is realized, and the bonded body 130 is not broken and deformed.

An expandable metal-pipe bonded body which is a fifth embodiment of the present invention will be described. FIG. 8B is a cross sectional view showing the expandable metal-pipe bonded body of the fifth embodiment.

As shown in FIG. 8B, an expandable metal-pipe bonded body 40 includes a main bonded body 140a and an end metal pipe 144 bonded to the end of the main bonded body 130a. The main bonded body 140a consists of a string of metal pipes 142 each having a uniform inside diameter.

A flange 146 is welded to the non-bonding end 144a of the end metal pipe 144 in advance. As of the end metal-pipe 134 in the fourth embodiment, the inside diameter d1 of the non-bonding end 144a of the end metal pipe 144 is set in advance to be larger than the inside diameter do of the central portion of the end metal pipe 144.

It is noted that in the fifth embodiment, the inside diameter d1 of the non-bonding end 144a of the end metal pipe 144 is larger than the outside diameter of a pipe expanding tool (to be described later). Otherwise, when the pipe expanding tool is inserted into the expandable metal-pipe bonded body 140 from its upper end, the flange 146 is also deformed, possibly leading to reduction of the air-tightness.

The metal-pipe bonded body of the second embodiment is substantially the same as of the fourth embodiment in that the diameter-increased length L is properly selected in consideration with the pipe expanding tool used for the pipe expanding work, that the end metal pipe 144 may be bonded to one and/or both ends of the main bonded body 140a, and various bonding methods may selectively be used for bonding the metal pipes 142 and the end metal pipe 144, and that the metal pipes 142 and the end metal pipe 144 may be made of a proper material.

A case where an expandable metal-pipe bonded body 140 which is the fifth embodiment of the present invention is applied to a casing tube will be described with reference to FIGS. 11A and 12B. A bore hole 124 is dug in the ground by use of a drill pipe (not shown). Then, a main bonded body 40a is inserted into the bore hole 124. As recalled, the main bonded body 140a consists of a series of butted metal pipes 142 and its inside diameter is uniform over its entire length.

Figure 11A:
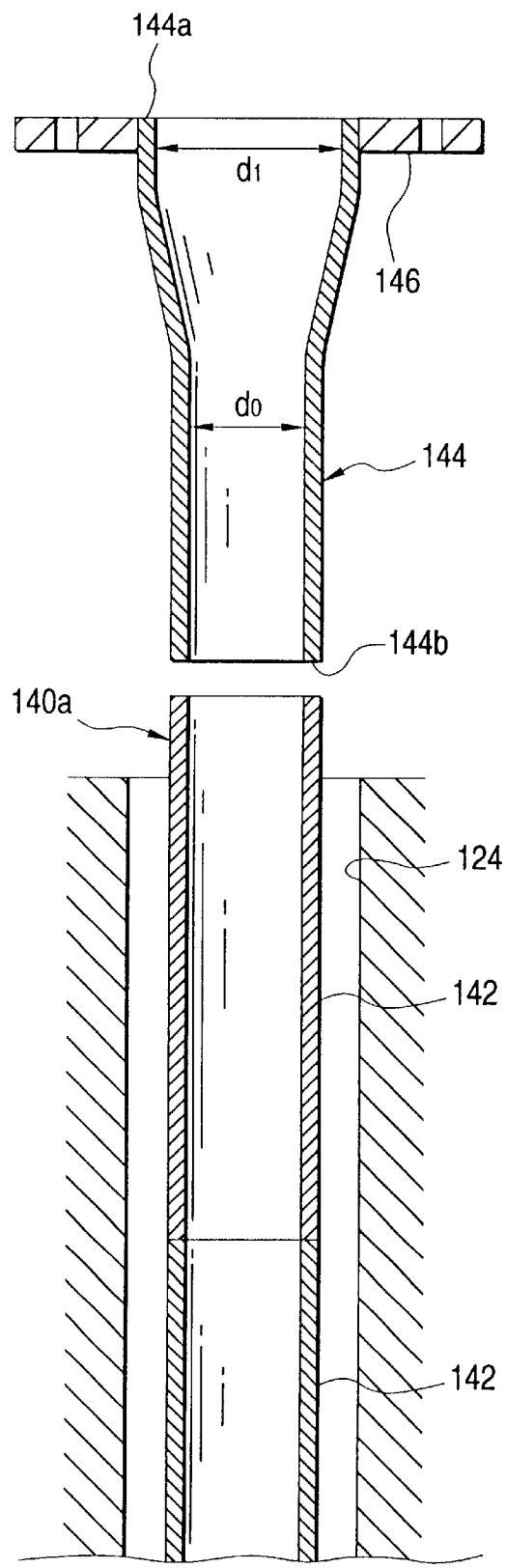
FIGS. 11A and 11B are cross sectional views showing a method of manufacturing the metal-pipe bonded body shown in FIG. 8B.

As shown in FIG. 11A, the end metal pipe 144 is moved to the upper end of the main bonded body 140a. As recalled, the inside diameter d1 of the non-bonding end 144a of the end metal pipe 144 is larger than the inside diameter d0 of the bonding end 144b, and the flange 146 is bonded to the non-bonding end 144a.

Figure 11B:
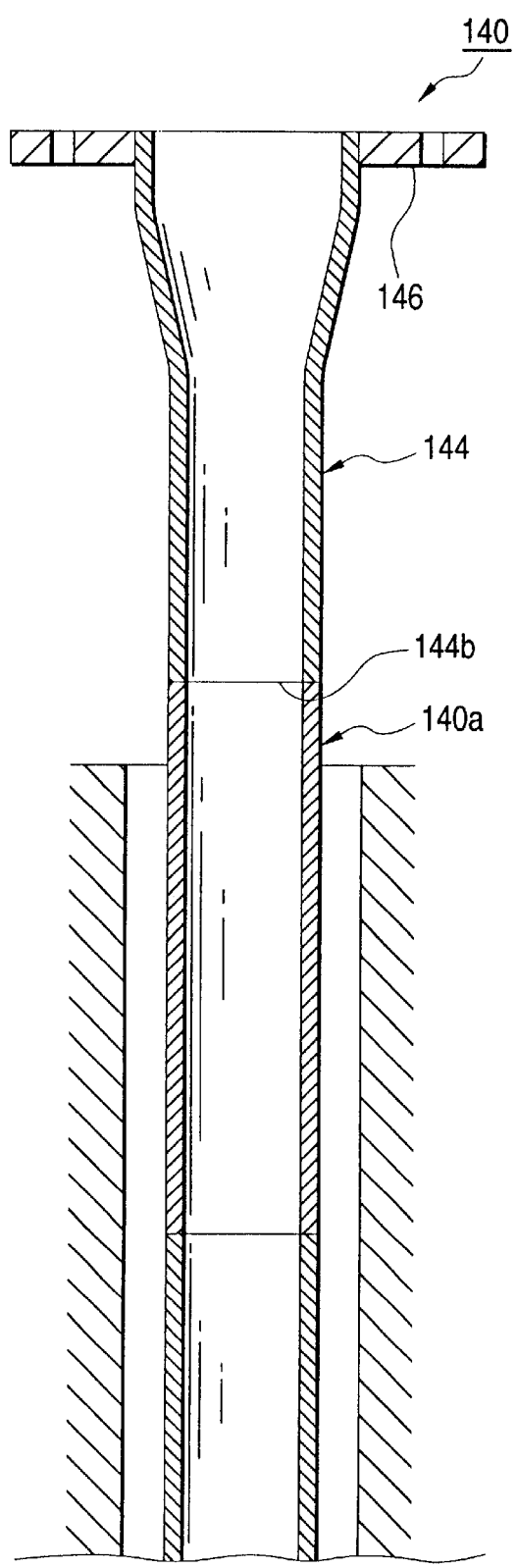

As shown in FIG. 11B, the bonding end 144b of the end metal pipe 144 is made to abut against the upper end of the main bonded body 140a, to thereby bond the end metal pipe 144 to the main bonded body 140a. As a result, a metal-pipe bonded body of which the end portion is increased in its inside diameter and the end is bonded to the flange is formed.

A method of radially expanding the thus formed expandable metal-pipe bonded body 140 will be described. An example of the bonded body expanding method is illustrated in FIG. 12. The expandable metal-pipe bonded body 40 is made to descend along the bore hole 124 till the upper end of the expandable metal-pipe bonded body 140 reaches a predetermined position, and clamped with a clamping mechanism (not shown).

Figure 12A:
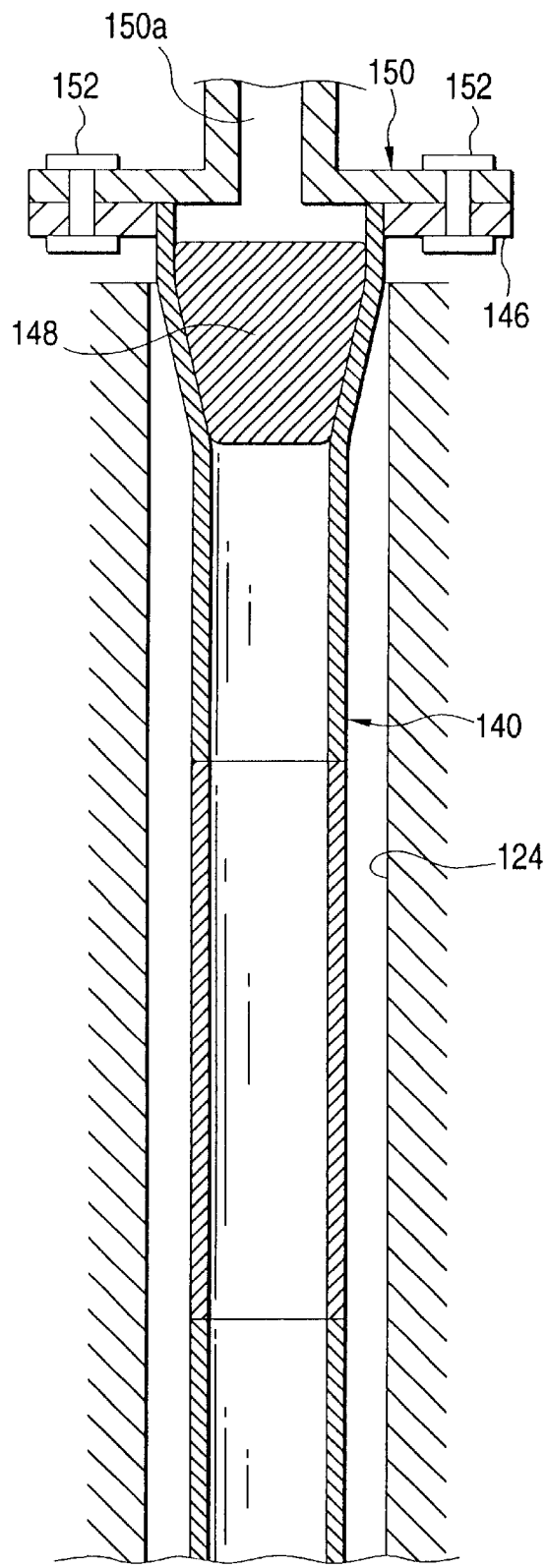
FIGS. 12A and 12B are cross sectional views showing a method of radially expanding the metal-pipe bonded body manufactured by the FIGS. 11A and 11B method.

As shown in FIG. 12A, a tapered mandrel 148 not having a shaft is inserted into the expandable metal-pipe bonded body 140 having the diameter-increased end portion. A cover 150 is put on the flange 46 and clamped with a bolt 152. As a result, a closed space is formed between the bottom of the mandrel 148 and the flange.

Figure 12B:
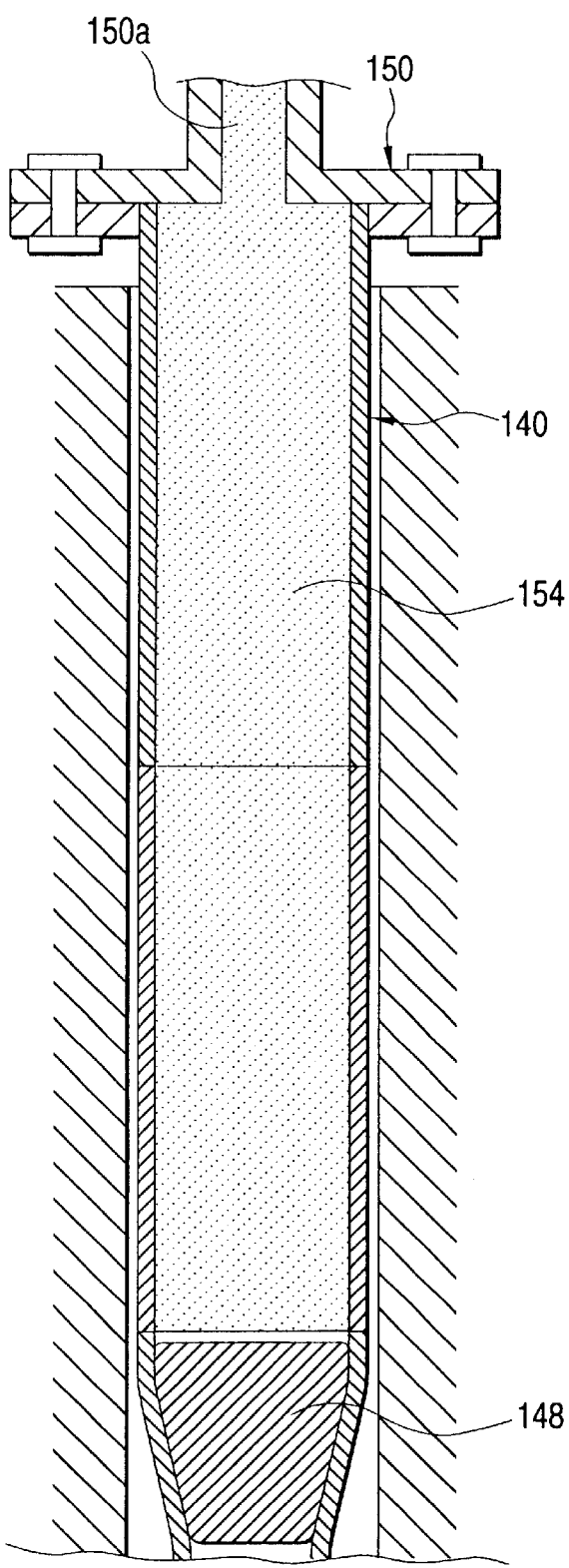
Figure 13C:
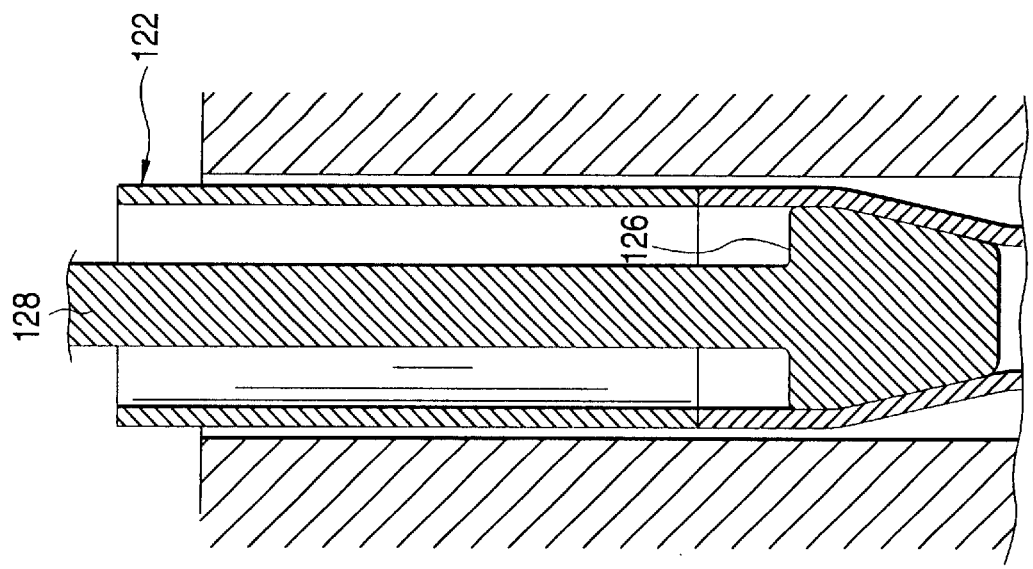
FIGS. 13A to 13C are cross sectional views showing a conventional method of radially expanding a metal-pipe bonded body.
Figure 13B:
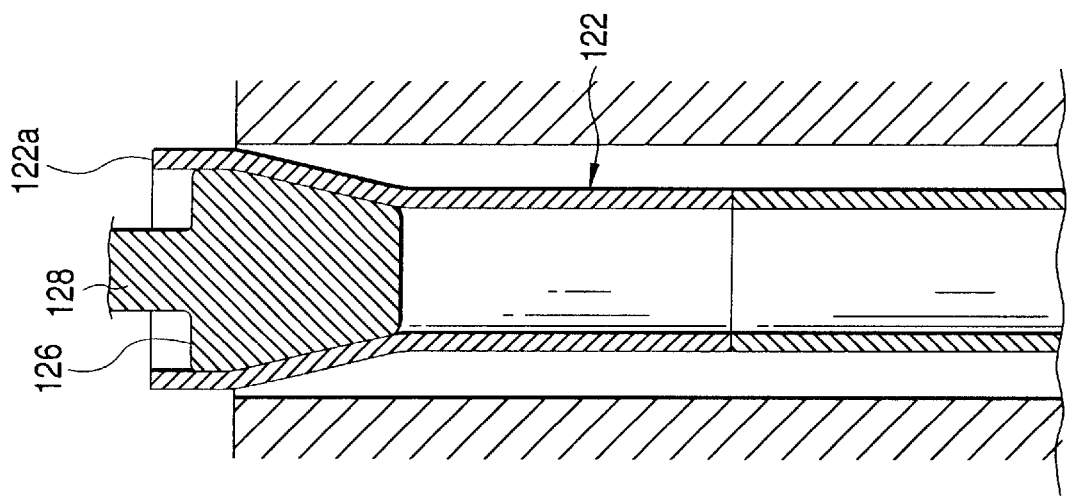
Figure 13A:
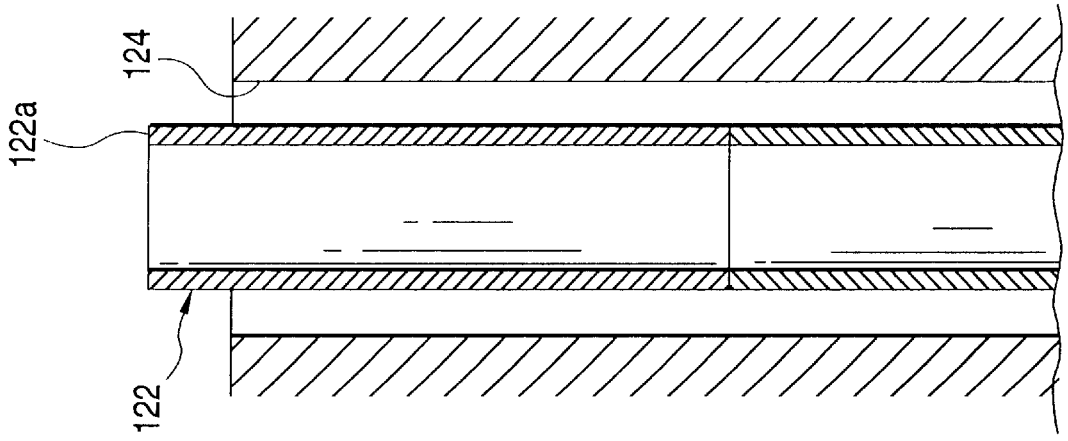

As shown in FIG. 12B, pressure medium 154, such as water, is poured into the closed space via a port 150a of the cover 150. A hydraulic pressure is applied to the bottom of the mandrel 148 by use of a pressuring mechanism (not shown). In response to this, the mandrel 148 is moved to the end of the expandable metal-pipe bonded body 140, so that the inside diameter of the expandable metal-pipe bonded body 140 is increased uniformly over its length.

As seen from the foregoing description, the metal-pipe bonded body of the fifth embodiment produces the following advantages. The fact that end metal pipe 144 having the diameter-increased non-bonding end 144a is bonded to the upper end of the expandable metal-pipe bonded body 140, make it easy to insert the mandrel into the expandable metal-pipe bonded body. Attachment of the flange 146 to the non-bonding end 144a of the end metal pipe 44 eliminates the work of welding the flange on the job site. This ensures a safe and efficient work of expanding the metal-pipe bonded body in an environment where flammable gas is present, for example, in the oil well.

While the present invention has been described using the fourth and fifth embodiments, it should be understood that the invention is not limited to those embodiments described but may variously be modified, altered and changed within the true spirits of the invention.

The mandrel used for expanding the metal-pipe bonded body may take a proper form, such as a tapered mandrel or a mandrel of which the tapered portion is provided with a roller.

An expandable metal-pipe bonded body according to the present invention are well adaptable for an oil well tube, such as a casing tube, which is buried in use into the ground. It is evident that the metal-pipe bonded body of the invention may be applied to the gas well, geothermal well, hot spring well, water well and others, or line pipes laid on the ground, plant line arrangement, and the method of manufacturing such a metal-pipe bonded body may be applied to the method of manufacturing the latter ones.

In an expandable metal-pipe bonded body of the present invention, the end of the metal-pipe bonded body is bonded to a metal pipe of which the non-bonding end is set in advance to be larger in inside-diameter than the central portion. Therefore, resistance of the pipe expanding tool when it is inserted is remarkably reduced, and as a result, the smooth insertion of the tool is realized, and the bonded body is not broken and deformed.

Also in the invention, the inside diameter of the non-bonding end of each of the metal pipe to be bonded to the end of the metal-pipe bonded body is larger than the outside diameter of a pipe expanding tool. Insertion resistance of the tool into the metal-pipe bonded body is reduced to zero. Therefore, the insertion of the tool is further easy.

When the metal pipe of which the non-bonding end is increased in its inside diameter and bonded to a flange is bonded to the end of the metal-pipe bonded body, there is no need of the work of welding the flange for its attachment on the job site. Therefore, in radially expanding the metal-pipe bonded body in an environment where flammable gas is present, there is less chance of igniting the flammable gas, and a safe pipe expanding work can be done.

Therefore, if the metal-pipe bonded body is applied to the oil well tubes and line pipes, remarkable cost down is realized and high reliability is secured in the oil drilling and the pipe laying work. In this respect, it is believed that the present invention will contribute greatly to related industry.

FIGS. 14A to 14D are sectional views showing a method of bonding metal pipes bonded end to end by a diffusion bonding method, which forms a sixth embodiment of the present invention. The metal-pipe bonding method includes a "diameter increasing process", an "end-face machining process" and a "diffusion bonding process".

Figure 14A:
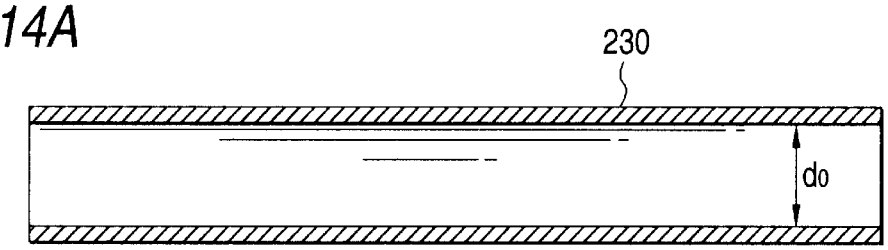
FIGS. 14A to 14D are sectional views showing a method of bonding metal pipes bonded end to end by a diffusion bonding method, which forms a sixth embodiment of the present invention.
Figure 14B:
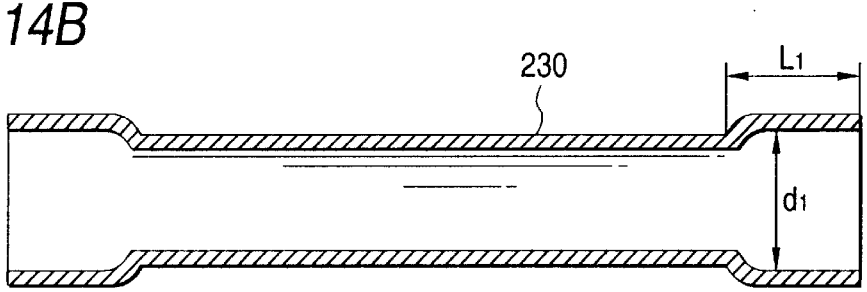

The "diameter increasing process" of the method will first be described. This process increases only the inside diameters of both end portions of a hollowed, cylindrical body 230 made of metal (this body will be referred to as a metal pipe) as shown in FIG. 14A by means of a proper tool, to thereby form a metal pipe 230 as configured as shown in FIG. 14B: this process increases an inside diameter d1 of the end of the metal pipe to an inside diameter do.

Any restrictions are not imposed on the metal pipe 230 handled in the present invention. The metal pipe 230 may be made of any of those materials, carbon steel, martensitic stainless steel, dual-phase stainless steel, austenitic stainless steel, Ti alloy and others.

In the description of the present invention, an increment of the inside diameter of the metal pipe 230 after it is radially expanded (increased in its inside diameter) with respect to the minimum inside diameter of it before it is expanded will be referred to as a "pipe-end expansion rate" and mathematically defined by the following formula (1) as similar to the first embodiment.

$$\text{pipe-end expansion rate } (\%) = (d1 - d0\text{min}) \times 100 / d0\text{min} \quad (1)$$

d1: inside diameter of each end portion of the metal pipe 230 d0min: minimum inside diameter of each end portion of the metal pipe 230

In the diameter-increasing process of the metal-pipe bonding method of the invention, it is necessary to increase the inside diameter of the end portion of each metal pipe 230 so that the inside diameter difference between the end portions co of the metal pipes 230 is 2 mm or less. If the difference exceeds 2 mm, steps are formed on the inner surface of the bonding portions, and the resultant metal-pipe bonded body is not good in strength, fatigue characteristic and corrosion proof. For this reason, it is preferable that the inside diameter difference is 1 mm or smaller.

When the pipe-end expansion rate is too small, a great stepped portion is formed on the inner surface of the bonding portion of the metal pipe 230. For this reason, it is preferable to determine the pipe-end expansion rate so as to satisfy the following formula (4).

$$d\text{max} - 2 \leq d1 \leq d0\text{max} \quad (\text{unit:mm}) \quad (4)$$

where d0max indicates a maximum inside diameter of each metal pipe 230 before its inside diameter is increased, and d1 indicates the inside diameter of the metal pipe 230 after it is increased.

In this case, those metal pipes 230 of which the inside diameter d0<(d0max−2) (mm) are increased in inside diameter to the inside diameter corresponding to the inside diameter d1, the metal pipes 230 of which the inside diameter d0>(d0max−2) (mm) are not increased in inside diameter, and will directly be used for bonding.

Alternatively, the pipe-end expansion rate is determined so that the inside diameter d1 of each metal pipe 230 after its inside diameter increased is larger than the value d0max, and the each metal pipe 230 is radially expanded at this pipe-end expansion rate. In this case, all the metal pipes 230 are increased in inside diameter to the inside diameter d1.

The minimum inside diameter d0min and the maximum inside diameter d0max, which are used for the calculation of the pipe-end expansion rate, are preferably a minimum and maximum diameters predicted from the specifications of the metal pipe to be bonded, allowing for a safety factor; if required, it may be an actually measured value.

The pipe-end expansion rate is preferably small in order to reduced the step formed on the inner surface of the bonding portion, but it may be selected in accordance with a situation where the resultant metal-pipe bonded body is sued.

A length of the end portion of the metal pipe of which the inside diameter is increased (the length will be referred to as a "diameter-increased length", and denoted as L1 in the FIG. 14B) may be selected in connection with ease of working the metal pipe 230 and the use of the metal pipe.

The method of increasing the inside diameter of the metal pipe is also optional. Usually, the metal pipe is expanded in its inside diameter in a manner that a mandrel or a plug having the inside diameter corresponding to the inside diameter d1 (formula 1) is inserted into the end portion of the metal pipe 230.

Figure 14C:
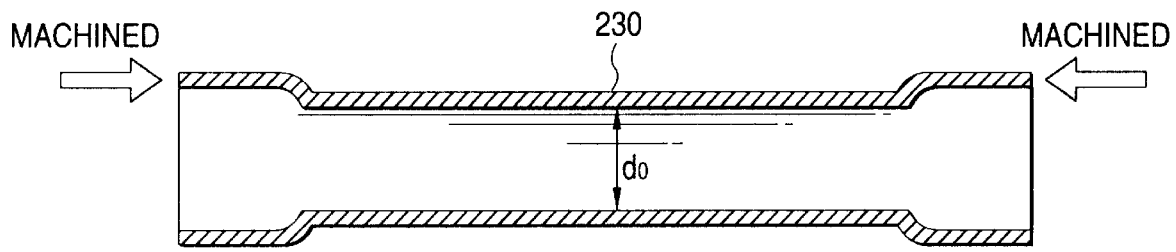

Next, the "end-face machining process" of the metal-pipe bonding method will be described. This process is provided for at machining the end face of the metal pipe 230 after it undergoes the diameter increasing process so as to have a predetermined surface roughness value (FIG. 14C). When the end face of the metal pipe 230 has a high surface roughness, the following disadvantages are yielded in the diffusion bonding process following the end-face machining process: contact of the bonding surfaces of the metal pipes 230 is poor, and hence the resultant bonding strength is unsatisfactory.

Grinding, lapping or the like may optionally be used for the end-face machining process. When the surface roughness of the end face of the metal pipe 230 is within a predetermined value of the surface roughness after the diameter increasing process, viz., the inside diameter of the end portion of the metal pipe 230 is increased, the end-face machining process may be omitted.

The "diffusion bonding method" will be described. The inside diameter of the end portion of the metal pipe 230 is increased by the diameter increasing process, and the end face of the metal pipe 230 is machined to have a predetermined surface roughness. In the diffusion bonding method, the metal pipes 230 thus processed are butted, and are bonded or jointed together by a diffusion bonding method.

The diffusion bonding method is classified into a "solid-phase diffusion bonding method" and a "liquid-phase bonding method". Either of those methods may be used for the diffusion bonding method. In the former bonding method, the ends of metal pipes 230 are bonded together, and elements of the material of the metal pipe are diffused in a solid-phase state of the material. In the latter bonding method, an insert member is inserted between the bonding surfaces of the metal pipes, and material elements are diffused while the insert member is temporarily molten.

Figure 14D:
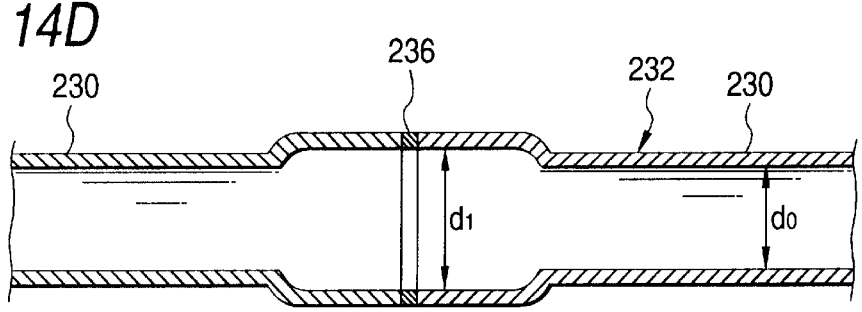

The liquid-phase diffusion bonding method can produce strength comparable with that of the base metal for a short time when comparing with the solid-phase diffusion bonding method. Accordingly, this bonding method may preferably be used. An example of a metal-pipe bonded body 232 formed by the liquid-phase bonding method in which an insert member 236 is put between the bonding faces of the metal pipes 230, is shown in FIG. 14D.

The diffusion bonding conditions may appropriately be adopted in accordance with a material of a metal pipe 230 used. Specific diffusion bonding conditions which may preferably be used will be described hereunder.

A surface roughness Rmax of the bonding face of a metal pipe is preferably 50 μm or less. If Rmax>50 μm, a close contact of the bonding faces of the metal pipes 230 cannot be secured and the resultant bonded body has an unsatisfactory bonding strength. To secure a high bonding strength, the smaller the surface roughness Rmax is, the better.

The insert member 236 used is preferably made of an Ni alloy or Fe alloy of which the melting point is 1200° C. or lower. If the melting point exceeds 1200° C., high bonding temperature is essential, and as a result, disadvantages of melting the base metal during the bonding process and formation of an unbonded part caused by a failure in melting the insert member 236 are inevasible.

A preferable thickness of the insert member 236 used is 100 μm or less. If its thickness>100 μm, insufficient element diffusion on the bonding interface is ensured, resulting reduction of the bonding strength of the bonding portion.

The insert member 236 may take a variety of forms. The insert member 236 to be put on the bonding interface may be a foil-like member having a thickness of 100 μm or less. In an alternative, it may be powdery. In this case, it is scattered on the bonding interface or the bonding interface is coated with it.

The bonding atmosphere is preferably nonoxidizing atmosphere. The diffusion bonding method in oxidizing atmosphere yields disadvantage of lowering of bonding strength since the bonding interface and its near portion are oxidized.

Bonding temperature is preferably between 1250° C. to 1400° C. when bonding temperature is lower than 1250° C., part of the insert member 236 remains unmelted or insufficient element diffusion is performed, and hence a bonding strength of the resulting bonded body is possibly-reduced. When it exceeds 1250° C., there is a danger that the base metal is melted.

Preferable bonding temperature continuation (referred to as a temperature holding time) is between 230 seconds and 300 seconds. If it is shorter than 230 seconds, the element diffusion on the bonding interface is insufficient and the bonding strength is unsatisfactory. If it exceeds 300 seconds, the working efficiency is reduced.

Preferable pressure applied to the bonding interface is within a range from 1.5 MPa to 5 MPa. If the pressure<1.5 MPa, contact of the bonding faces of the metal pipes is not sufficient, leading to lowering of bonding strength of the resultant pipe. When the pressure exceeds 5 MPa, the bonding portion is excessively deformed.

The heating method for the diffusion bonding process may be selected from among many heating methods, such as a high frequency induction heating method, a high frequency direct heating method, and a resistance heating method. Of those heating methods, the high frequency induction heating method and the high frequency direct heating method are preferable since those methods are capable of heating relatively large bonded members easily and at high heating efficiency, and hence heating those bonded members up to the bonding temperature for very short time. Use of those heating methods is preferable in particular.

A preferable frequency of a high-frequency current used for the high frequency induction heating and the high frequency direct heating is 100 kHz or lower. If its frequency exceeds 100 kHz, the skin-effect occurs, so that only the surface region of the bonded member is heated.

An operation of the metal-pipe bonding method will be described. The metal pipes industrially manufactured indispensably include given dimensional tolerances. Required dimensional accuracy depends on the use of the metal pips. High dimensional accuracy is required for the metal pipes, used for oil tubes (e.g., casing tubes, production tubes, and coiled tubes) and pipe lines, when comparing with other tubes or pipes, as known.

API 5LC (second edition, Apr. 1, 1991) (API: American petroleum Institute) is known for the standard on the dimensional tolerances of the pipelines, and API 5CT (first edition, Aug. 1, 1995) is known for the standard on dimensional tolerances of the casing and tubing.

According to API 5LC, when the outside diameter of the line pipe is 4 to 18 inches (≈101.6 to 457.2 mm), the outside diameter of the pipe body should be within ±0.75% of the specified value. For the pipe thickness, a specified value ±15% to 12.4% is permitted.

In the case of a line pipe of API grade X52, 12.5 inch (≈323.85 mm) in outside diameter and 0.375 inch (≈9.525 mm) in thickness, a maximum outside diameter is 326.279 mm and a minimum outside diameter is 321.421 mm. A maximum thickness is 10.954 mm and a minimum thickness is 8.334 mm.

For this reason, in a case where a line pipe is cut at its middle position into two pipes and those separated two pipes are bonded together again, it is necessary to bond a metal pipe 241 having the maximum outside diameters and the minimum thickness values, which are within the tolerance values with another metal pipe 242 having the minimum outside diameter and the maximum thickness. Those metal pipes are axially aligned with each other and butted, and bonded together by the diffusion bonding method. In the bonded metal pipes, a step of a maximum of 5.049 mm is formed between the inner surfaces of the bonded metal pipes 241, 242, as shown in FIG. 15A.

In this case, calculation shows that the step on the inner surface of the bonded metal pipes 241, 242 is reduced to 1 mm or less if the metal pipes 241 and 242 are radially expanded so that the inside diameter d1 after the inside-diameter increase is 307.61 mm or larger, viz., the pipe-end expansion rate is 2.70% or greater, since the minimum inside diameter value d0min is 299.513 mm.

Similarly, the step on the inner surface of the bonded metal pipes is reduced to 0.5 mm or less if the metal pipes 241 and 242 are radially expanded so that the inside diameter d1 after the inside-diameter increase is 308.611 mm or larger, viz., the pipe-end expansion rate is 3.04% or greater. Further, the step on the inner surface of the bonded metal pipes is reduced to zero if the metal pipes 241 and 242 are radially expanded so that the inside diameter d1 after the inside-diameter increase is 309.611 mm or larger, viz., the pipe-end expansion rate is 3.37% or greater, as shown in FIG. 15B.

According to API 5CT for the casing or tubing of which the outside diameter is 4×½ inch (≈114.3 mm) or larger, the outside diameter of the pipe body is a specified value+a value within a range from +1.00% to −0.50%. A thickness of the pipe is a specified value ±12.5%.

In a casing of API grade H40, 7 inches (≈177.8 mm) in outside diameter and 0.54 inch (≈13.716 mm) in thickness, a maximum outside diameter value is 179.578 mm and a minimum outside diameter value is 179.911 mm. A maximum thickness value is 15.431 mm, and a minimum thickness value is 12.002 mm.

Figure 16A:
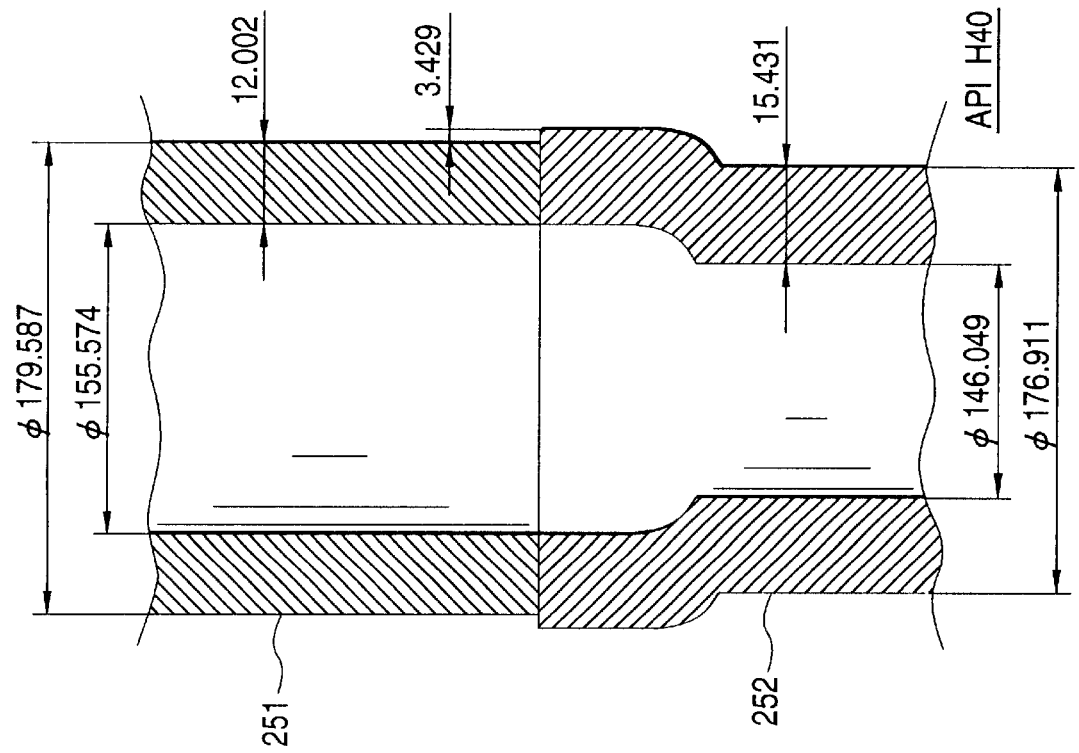
FIGS. 16A and 16B are sectional views showing a relationship between dimensional accuracy of the metal pipe mass produced and a step formed on the bonding portion of the metal pipe.

Therefore, in a case where a metal pipe 251 having the maximum outside diameter and the minimum thickness, which are within the tolerance values is bonded, by the diffusion bonding method, to another metal pipe 252 having the minimum outside diameter and the maximum thickness in a state that those metal pipes are axially aligned with each other, a step of a maximum of 4.763 mm is formed between the inner surfaces of the bonded metal pipes, as shown in FIG. 16A.

In this case, calculation shows that the step on the inner surface of the bonded metal pipes is reduced to 1 mm or less if the metal pipes 241 and 242 are radially expanded so that the inside diameter $d_1$ after the inside-diameter increase is 153.574 mm or larger, viz., the pipe-end expansion rate is 5.15% or greater.

Figure 16B:
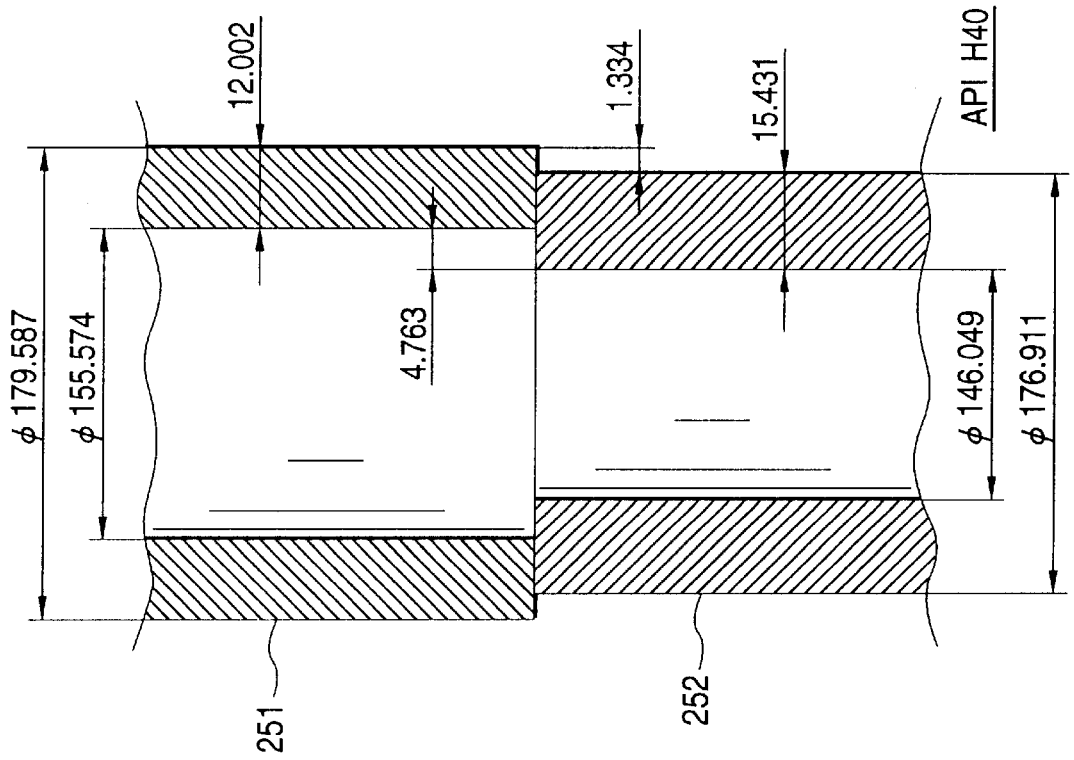

Similarly, the step on the inner surface of the bonded metal pipes is reduced to 0.5 mm or less if the metal pipes 241 and 242 are radially expanded so that the inside diameter $d_1$ after the inside-diameter increase is 154.574 mm or larger, viz., the pipe-end expansion rate is 5.84% or greater. Further, the step on the inner surface of the bonded metal pipes is reduced to zero if the metal pipes 241 and 242 are radially expanded so that the inside diameter $d_1$ after the inside-diameter increase is 155.574 mm or larger, viz., the pipe-end expansion rate is 6.52% or greater, as shown in FIG. 16B.

The above calculations were performed on the assumption that the maximum and minimum values of the inside diameters of the metal pipes to be bonded vary within the ranges of tolerance values. Accordingly, if those values of the metal pipes vary within a ranges narrow than the tolerance ranges, the step on the inner surface of the bonded metal pipes is reduced to 1 mm or less even if the pipe-end expansion rate is smaller than the calculated one.

A metal-pipe bonding method according to a seventh embodiment of the present invention will be described. The metal-pipe bonding method uses a machining work not attendant with material removal to reduce the inside diameter difference between the end portions of the bonding metal pipes to 2 mm or less, while the metal-pipe bonding method of the first embodiment uses the diameter-increasing work attendant with material removal for the same purpose.

In machining the end portions of the metal pipe, it is desirable to remove the material of the inner surface of the end portion of the metal pipe so that the inner surface is continuous and smooth in shape after the material removal. If so done, no acute cut is formed in the bonding interface when the machined metal pipes are butted. In the example of FIG. 4A, the inner surfaces of the end portions of the metal pipes 261 and 262 are tapered at large basic angle. In the example FIG. 17B, the inner surfaces are shaped elliptically. Of metal pipes to be bonded, only the metal pipe having a small inside diameter (smaller than the other metal pipe) may be subjected to the machining work (although not shown).

The machining work attendant with material removal may be grinding work, cutting work or any other suitable work. Following the machining of the inner surface of the end portion of the metal pipe, the end face of the metal pipe is machined, if necessary, and then subjected to the diffusion bonding process, as in the sixth embodiment.

A metal-pipe bonding method according to a seventh embodiment of the present invention will be described. In the method, the inner surface of the end portion of each metal pipe is subjected to a diameter increasing work not attendant with material removal. Then, it is subjected to a diameter increasing work attendant with material removal, whereby the inside diameter difference between the inner surfaces of the bonding metal pipes is reduced to 2 mm or less.

Also in the present embodiment, in the machining work attendant with material removal, which follows the inside diameter increasing work of the end portions of the metal pipe, in it is desirable to remove the material of the inner surface of the end portion of the metal pipe so that the inner surface is continuous and smooth in shape after the material removal, in order to avoid formation of acute cut in the bonding interface when the machined metal pipes are butted.

Figure 18A:
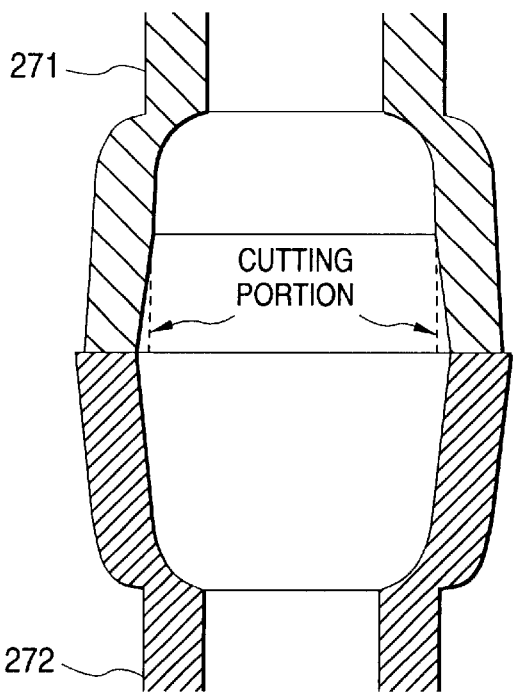
FIG. 18A is a sectional view showing a metal-pipe bonded body in which the inner surface of the bonding portion is tapered by machining after the end portions are radially expanded.

In the example of FIG. 18A, the inner surface of the end portion of one of the metal pipes 271 and 262 is tapered at large basic angle. In the example FIG. 18B, the inner surface of the end portion of the metal pipe is elliptically shaped. Alternatively, the inner surfaces of the end portions of both the metal pipes 271 and 272 are tapered at large basic angle or elliptically shaped, whereby the inside diameter difference between the inner surfaces of the end portions is reduced to 2 mm or less (not shown).

Any particular restriction is not imposed on the machining method in the seventh embodiment. After the diameter increasing work and the machining work, the end faces of the end portions of the metal pipes, if necessary, is machined, and then the resultant pipes are subjected to the diffusion bonding process, as in the sixth embodiment.

As described above, the metal-pipe bonding method of the present invention can readily uniformize the inside diameters of the metal pipes of which the outside diameters and the thickness values vary within the tolerable ranges since the end portions of the metal pipes are machined with the diameter-increasing process not attendant with removal of material and/or the machining process attendant with removal of material, before bonding process commences.

Therefore, when the metal pipes are axially aligned with each other, the step at the boundary between the inner surfaces of the bonded metal pipes is reduced to zero. If the metal pipes are inevitably somewhat mis-aligned with each other during the bonding process, a step formed on the inner surfaces is smaller than that in the case where the end portions of the metal pipes are not machined.

In particular when a mandrel is used for increasing the inside diameter of the end portion of the metal pipe, the diameter increasing work is easy when comparing with the case using the machining, such as grinding or cutting. Use of the mandrel yields many advantages: the manufacturing cost is not increased, the step on the inner surface of the bonding portion is reduced, and the resultant bonded body is excellent in strength and fatigue characteristic.

In a case where the metal pipes used have large tolerances, use of only the diameter increasing process sometimes fails to sufficiently reduce the steps on the inner surfaces of the end portions of the metal pipes. However, when the inner surface of the end portion of the metal pipe is processed by the machining work attendant with material removal, or the metal pipes after underwent the diameter increasing process are processed by the machining work, the step on the inner surface is reliably reduced.

An example of a metal-pipe bonded body manufactured by the metal-pipe bonding method of the present invention will be described. The metal-pipe bonded body may directly be used for various plant pipe arrangements. In this case, the metal-pipe if bonded body may be radially expanded over its entire length. In this case, it is preferable that the metal-pipe bonded body is radially expanded so that a pipe expansion rate E (%) of the metal-pipe bonded body satisfies the following formula (5).

$$E(\%) \leqq 30 - T(\%) \quad (5)$$

E=((inside diameter of the bonded body after expanded/ inside diameter of the bonded body before expanded)− 1)×100

T=(step on the inner surface of the bonding portion/ thickness of the metal pipe before expanded)×100

When a rate (ref erred to as a "T value") of the step formed on the inner surface of the bonded body to a thickness of the metal pipe before expanded is not 0, viz., a step is formed on the inner surface of the bonded body, if the pipe expansion rate E exceeds (30−T), stress concentrates at the step when the bonded body is radially expanded. In this state, defects are likely to occur in the bonding portion.

In the formula 3, the upper limit of the pipe expansion rate is set at30%. The reason for this is that since a thermally affected portion is created in the bonding portion, the bonding portion will have a defect irrespective of presence or absence of the step on the inner surface of the bonding portion.

The T value of the metal-pipe bonded body manufactured by the metal-pipe bonding method of the present invention is small since the inner surfaces of the bonding portion are machined before bonding so that the inside diameter difference between the bonding ends of the metal pipes is 2 mm or less. Therefore, the metal-pipe bonded body may be radially expanded at higher pipe expansion rate E than the case in which the inner surface of the bonding portion is not machined in advance. Further, there is less chance that defects occurs in the bonding portion.

EXAMPLE 22

A metal pipe was radially expanded in the following manner. The metal pipe used was a steel pipe of which the outside diameter was 12.75 inches (≈323.9 mm), the thickness was 0.375 inches (≈9.5 mm) (the pipe was a pipe of grade X52 by American Petroleum Institute (abbreviated as API X52). The end portion of the steel pipe was radially expanded so as to have a pipe-end expansion rate of 5%.

The end face of the resultant steel pipe was machined to have a surface roughness Rmax of 25 μm or less. An Ni alloy foil having a thickness of 50 μm and a melting point of 1050° C., which corresponds in constitution to JIS BNi-3, was put on the bonding surface of the steel pipe. In this state, liquid-phase diffusion bonding was performed.

A high-frequency induction heating method in which a high-frequency current has a frequency of 3 kHz was used for heating the bonding portion f the steel pipe. The bonding conditions were: bonding temperature was 1300° C., a bonding temperature continuation or temperature holding time was 180 seconds, pressure applied was 4.5 MPa, and the bonding atmosphere was an Ar atmosphere.

EXAMPLES 23 AND 24

Comparisons 15 and 16

Metal pipes were bonded by the diffusion bonding method in substantially the same manner as of the example 1 except that a the pipe-end expansion rates of the metal pipes 30 were 0% (comparison 15), 1% (comparison 16), 5% (example 23) and 10% (example 24).

For the bonding bodies of the examples 22 to 24 and the comparisons 15 and 16, maximum values of steps formed (referred to as maximum steps) on the inner surfaces of the bonding portions were measured. Only the steps formed on the surfaces of the bonding portions after the pipe expansion were ground with a grinder up to 0.5 mm or less. Then, test pieces of MIS Z3121 were cut out of the bonding portions, and subjected to a tensile test. Further, test pieces of JIS Z3103, which were available for the nonfinished butting welding joint testing method, were cut out and subjected to a fatigue test and a fatigue strength rate (a rate of a fatigue limit of the bonding portion to a fatigue limit of the base metal) of each test piece was measured. The test results are shown in Table 9.

TABLE 9

| Test No. | Comparison 15 | Comparison 16 | Example 22 | Example 23 | Example 24 |
|---|---|---|---|---|---|
| Material of steel pipe | API X52 | API X52 | API X52 | API X52 | API X52 |
| Outer diameter of steel pipe (inch) | 12.75 | 12.75 | 12.75 | 12.75 | 12.75 |
| Thickness of steel pipe (inch) | 0.375 | 0.375 | 0.375 | 0.375 | 0.375 |
| Pipe end expansion rate (%) | 0 | 1 | 3 | 5 | 10 |
| Bonding surface roughness (Rmax: μm) | 25 | 25 | 25 | 25 | 25 |
| Material of insert member | BNi-3 | BNi-3 | BNi-3 | BNi-3 | BNi-3 |
| Melting point (° C.) of insert member | 1050 | 1050 | 1050 | 1050 | 1050 |
| Thickness (μm) of insert member | 50 | 50 | 50 | 50 | 50 |
| Form of insert member | foil | foil | foil | foil | foil |
| Bonding temperature (° C.) | 1300 | 1300 | 1300 | 1300 | 1300 |
| Temperature holding time(s) | 180 | 180 | 180 | 180 | 180 |
| Pressure (MPa) | 4.5 | 4.5 | 4.5 | 4.5 | 4.5 |
| Bonding atmosphere | Ar | Ar | Ar | Ar | Ar |
| Heating method for bonding portions | high frequency induction heating method (3 KHz) | | | | |
| Max. step of bonding portions | 5.0 | 3.5 | 1.0 | 1.0 | 1.0 |
| Tensile strength (MPa) in tension test | 450 | 466 | 524 | 525 | 528 |
| Fractured position in tension test | bonding interface | bonding interface | base metal | base metal | base metal |
| fatigue strength rate in fatigue test | 0.4 | 0.5 | 0.9 | 0.9 | 0.9 |
| Evaluation | C | C | A | A | A |

In the comparison 15 in which the pipe-end expansion rate=0%, the maximum step was 5 mm. A tensile strength was 450 MPa, somewhat lower than of the base metal. Test pieces were fractured at the bonding interfaces. A fatigue strength rate was low, 0.4. The reason for this may be estimated that stress concentrates at the step on the inner surface of each bonding portion, and the step serves as a starting point of fatigue crack.

In the comparison 16 in which the pipe-end expansion rate=1%, the maximum step was 3.5 mm. A tensile strength was 466 MPa, and test pieces were fractured at the bonding interfaces. A fatigue strength rate was 0.5, comparable with the comparison 15.

In the examples 22, 23 and 24 in which the pipe-end expansion rates were set at 3%, 5% and 10%, the maximum steps were reduced to 1.0 mm. A tensile strength of each example was 500 MPa, comparable with that of the base metal. The test pieces were fractured in the base metal. A fatigue strength rate of the examples was 0.9, and a fatigue characteristic was comparable with that of the base metal.

From the above test results, it is seen that when the inside diameter of the end portion of the metal pipe is increased at an pipe-end expansion rate higher than a predetermined one, the maximum step is 1 mm or less, and that decrease of the maximum step produces a metal-pipe bonded body excellent in bonding strength and fatigue strength.

EXAMPLE 25

Metal pipes were bonded by the diffusion bonding method. Metal pipes used were steel pipes of which the outside diameter was 12.75 inches (≈323.9 mm), the thickness was 0.375 inches (≈9.5 mm), manufactured by grade H04 by American Petroleum Institute (abbreviated as API X52). The end portions of those steel pipes were radially expanded at 5% (pipe-end expansion rate).

The end faces of the resultant (expanded) steel pipes were machined to have a surface roughness Rmax of 15 $\mu$m or less. An Fe-3B-3Si-1C alloy foil of 50 $\mu$m thick and having a melting point of 1200° C. was put into the bonding surface of each steel pipe. In this state, liquid-phase diffusion bonding was performed.

The bonding portions were heated by the high frequency induction heating method in which the high-frequency current frequency was 3 kHz. The bonding conditions were: bonding temperature was 1250° C., temperature holding time was 60 seconds, pressure was 4.5 MPa, and bonding atmosphere was an Ar atmosphere.

EXAMPLE 26

Metal pipes were bonded by the diffusion bonding method in the same procedure as of the example 25 except that the insert member was an Ni alloy foil having a melting point of 1140° C. and a thickness of 50 $\mu$m, which corresponds in constitution to JIS BNI-5, and the bonding temperature of 1300° C. was held for 180 seconds.

EXAMPLE 27

Metal pipes were bonded by the diffusion bonding method in the same procedure as of the example 25 except that the insert member was an Ni alloy foil having a melting point of 1140° C. and a thickness of 50 $\mu$m, which corresponds in constitution to JIS BNI-5, and the bonding temperature of 1300° C. was held for 180 seconds.

Comparison 17

Metal pipes were bonded by the diffusion bonding method in the same procedure as of the example 25 except that the insert member was an Fe-2B-lSi alloy foil having a melting point of 1290° C. and a thickness of 50 $\mu$m, which corresponds in constitution to JIS BNI-5, the bonding temperature of 1400° C. was held for 300 seconds, and pressure applied was 5.0 MPa.

The metal-pipe bonding bodies of the examples 25 to 27 and the comparison 17 were measured for checking the maximum steps of the bonding potions, and subjected to a tensile test and a fatigue strength in substantially the same procedure as of the example 22. The results are shown in Table 10.

TABLE 10

| Test No. | Comparison 17 | Example 25 | Example 26 | Example 27 |
|---|---|---|---|---|
| Material of steel pipe | API X52 | API X52 | API X52 | API X52 |
| Outer diameter of steel pipe (inch) | 12.75 | 12.75 | 12.75 | 12.75 |
| Thickness of steel pipe (inch) | 0.375 | 0.375 | 0.375 | 0.375 |
| Pipe end expansion rate (%) | 5 | 5 | 5 | 5 |
| Bonding surface roughness (Rmax: $\mu$m) | 15 | 15 | 15 | 15 |
| Material of insert member | Fe-2B-1Si | Fe-3B-3Si-1C | BNi-5 | BNi-5 |
| Melting point (° C.) of insert member | 1290 | 1200 | 1140 | 1140 |
| Thickness ($\mu$m) of insert member | 50 | 50 | 50 | 50 |
| Form of insert member | foil | foil | foil | foil |
| Bonding temperature (° C.) | 1400 | 1250 | 1300 | 1300 |
| Temperature holding time(s) | 300 | 60 | 180 | 180 |
| Pressure (MPa) | 5.0 | 4.5 | 4.5 | 4.5 |
| Bonding atmosphere | Ar | Ar | Ar | Ar |
| Heating method for bonding portions | high frequency induction heating method (3 KHz) | | | |
| Max. step of bonding portions | 1.0 | 1.0 | 1.0 | 1.0 |
| Tensile strength (MPa) in tension test | 428 | 530 | 526 | 527 |
| Fractured position in tension test | bonding interface | base metal | base metal | base metal |
| Fatigue strength rate in fatigue test | 0.7 | 0.9 | 0.9 | 0.9 |
| Evaluation | B | A | A | A |

In the example 17 using the insert member of which the melting point is 1290° C., the tensile strength was 426 MPa, although the temperature holding time was set at 300 seconds. The test piece was fractured at the bonding interface. The fatigue strength rate was 0.17, and a fatigue limit was somewhat reduced when comparing with the base metal. The reason why the cracks were formed may be estimated that since the melting point of the inset member is high, insufficient element diffusion was performed in the bonding portion.

In the example 25 using the insert member having a melting point of 1200° C., and the examples 26 and 27 each using the insert member having a melting point of 1140° C., a tensile strength of each of them was about 528 MPa, comparable with that of the base metal. The test pieces were fractured in the base metals. A fatigue strength rate was 0.9.

In the examples 25 to 27, and the comparison 17, the pipe-end expansion rate of each metal pipe was 5%, and hence the maximum step of each of them was 1.0 mm.

From the results of the above tests, it is seen that to produce a metal-pipe bonded body high in bonding strength and fatigue strength, it is necessary to radially expand the metal pipe at a predetermined pipe-end expansion rate, and to use the insert member having a melting point of 1200° C. or lower for diffusion bonding.

EXAMPLE 28

Metal pipes were bonded by the diffusion bonding method in the following procedure. The metal pipes used were steel pipes of API X52, which has the outside diameter of 12.75 inches (≈323.9 mm) and a thickness of 0.375 inch (≈9.5 mm). The inside diameter of the end portion of each metal pipe was increased so as to have the pipe-end expansion rate of 5%.

The end face of each expanded metal pipe was machined to have a surface roughness Rmax of 15 $\mu$m. Ni alloy powder having a melting point of 1140° C., which corresponds in constitution to JIS BNi-3, was used for an insert member. A thickness of the insert member was 30 $\mu$m. The insert member was put on the bonding interface, and the metal pipes were bonded by the liquid-phase diffusion bonding method.

A high frequency induction heating method, in which the frequency of a high-frequency current is 3 kHz, was used for heating the bonding portions. The bonding conditions were: bonding temperature was 1300° C., temperature holding time was 60 seconds, pressure applied was 3.0 MPa, and bonding atmosphere was Ar atmosphere.

EXAMPLE 29

Metal pipes were bonded by the diffusion bonding method in the same manner as in the example 28, except that Ni alloy scale which corresponds in constitution to JIS BNi-5 was used for the insert member, and put on the bonding interface, and bonding temperature was kept for 30 seconds. A thickness of the insert member was 50 $\mu$m.

Comparison 18

Metal pipes were bonded into by the diffusion bonding method in the same manner as in the example 28, except that an Ni alloy foil of 200 $\mu$m thick, which corresponds in constitution to JIS BNi-5, was used for the insert member, temperature holding time was set at 300 seconds, and pressure applied was 4.5 MPa.

Comparison 19

Metal pipes were bonded by the diffusion bonding method in the same manner as in the example 28, except that an Ni alloy foil of 50 $\mu$m thick, which corresponds in constitution to JIS BNi-5, was used for the insert member, bonding temperature was 1400° C., temperature holding time was set at 10 seconds, and pressure applied was 5.0 MPa.

Comparison 20

Metal pipes were bonded by the diffusion bonding method in the same manner as in the example 28, except that an Ni alloy foil of 50 $\mu$m thick, which corresponds in constitution to JIS BNi-5, was used for the insert member, temperature holding time was set at 600 seconds.

The metal-pipe bonding bodies of the examples 28 and 29, and the comparisons 18 to 20 were subjected to measurement of the maximum steps formed on the bonding portions, and tensile strength and fatigue strength rate. The measurements are shown in Table 11.

TABLE 11

| Test No. | Comparison 18 | Example 28 | Example 29 | Comparison 19 | Comparison 20 |
|---|---|---|---|---|---|
| Material of steel pipe | API X52 | API X52 | API X52 | API X52 | API X52 |
| Outer diameter of steel pipe (inch) | 12.75 | 12.75 | 12.75 | 12.75 | 12.75 |
| Thickness of steel pipe (inch) | 0.375 | 0.375 | 0.375 | 0.375 | 0.375 |
| Pipe end expansion rate (%) | 5 | 5 | 5 | 5 | 5 |
| Bonding surface roughness (Rmax: $\mu$m) | 15 | 15 | 15 | 15 | 15 |
| Material of insert member | BNi-5 | BNi-5 | BNi-5 | BNi-5 | BNi-5 |
| Melting point (° C.) of insert member | 1140 | 1140 | 1140 | 1140 | 1140 |
| Thickness ($\mu$m) of insert member | 200 | 30 | 50 | 50 | 50 |
| Form of insert member | foil | powder | scale | foil | foil |
| Bonding temperature (° C.) | 1300 | 1300 | 1300 | 1400 | 1300 |
| Temperature holding time(s) | 300 | 60 | 30 | 10 | 600 |
| Pressure (MPa) | 4.5 | 3.0 | 3.0 | 5.0 | 3.0 |
| Bonding atmosphere | Ar | Ar | Ar | Ar | Ar |
| Heating method for bonding portions | | high frequency induction heating method (3 KHz) | | | |
| Max. step of bonding portions | 1.0 | 1.0 | 1.0 | 1.0 | 1.0 |
| Tensile strength (MPa) in tension test | 455 | 528 | 527 | 421 | 522 |
| Fractured position in tension test | bonding interface | base metal | base metal | bonding interface | base metal |
| fatigue strength rate in fatigue test | 0.7 | 0.9 | 0.9 | 0.7 | 0.8 |
| Evaluation | B | A | A | B | B |

In the comparison 18 using the insert member of 200 $\mu$m thick, the tensile strength was 455 MPa although the temperature holding time was set at 300 seconds and pressure applied was 4.5 MPa. A test piece was fractured at the bonding interface. The fatigue strength rate was 0.7, somewhat lower than that of the base metal. The reason for this may be estimated such that since the insert member was thick, elements contained in the insert member were insufficiently diffused.

In the comparison 19 in which the bonding temperature was 1400° C., a tensile strength was 421 MPa, and a test piece was fractured at the bonding interface. A fatigue strength rate was 0.7, somewhat lower than that of the base metal. The reason for this may be considered that insufficient element diffusion was performed at the bonding interface.

In the comparison 20 in which the temperature holding time was 600 seconds, the bonding strength was 522 MPa, comparable with that of the base metal. A test piece was fractured at the bonding interface. A fatigue strength rate was 0.8, slightly lower than that of the base metal. The reason for this may be considered that since the temperature holding time was long, and hence the bonding portion was excessively deformed, and a fatigue crack started at a deformed portion.

In the examples 28 and 29 in which the thickness of the insert member was 30 to 50 μm and the temperature holding time was 10 to 60 seconds, the bonding strength of each of them was about 528 MPa, comparable with that of the base metal. Test pieces were fractured in the base metal. A fatigue strength rate of each of them was 0.9.

In the examples 28 and 29, and the comparisons 18 to 20, since the pipe-end expansion rate of each metal pipe was set at 5%, the maximum step of each of them was 1.0 mm.

As seen from the results mentioned above, when the metal pipes are bonded by the liquid-phase diffusion bonding method, if the thickness of the insert member is 100 μm or less, the resultant metal-pipe bonded body is high in tensile strength and fatigue strength, that to secure sufficient element diffusion in the bonding interface and to avoid an excessive deformation of the bonding portion, the temperature holding time is preferable within 30 to 300 seconds.

EXAMPLE 30

Metal pipes were bonded into a metal-pipe bonded body by the diffusion bonding method in the following way. Each of the metal pipes used was a steel pipe of API X52, which has the outside diameter of 12.75 inches (≈323.9 mm) and a thickness of 0.375 inches (≈9.5 mm). The inside diameter of each end portion of each steel pipe was increased so as to have pipe-end expansion rate of 5%.

The end faces of the steel pipes of which the end portions were increased in inside diameter were machined to have a surface roughness Rmax of 15 μm or less. An Ni alloy foil which corresponds in constitution to JIS BNi-5, and had a melting point of 1140° C. and a thickness of 50 μm, was put in the bonding interface, and in this state the bonding portions of the metal pipes were subjected to liquid-phase diffusion bonding process.

The method of heating the bonding portions of the metal-pipe bonded body was the high frequency induction heating method in which the frequency of a high-frequency current was 3 kHz. The bonding conditions were: 1350° C. for bonding temperature, 240 seconds for temperature holding time, 1.5 MPa for applied pressure, and Ar atmosphere for bonding atmosphere.

EXAMPLE 31

Metal pipes were bonded by the diffusion bonding method in substantially the same manner as of the example 30, except that temperature holding time was 300 seconds, and applied pressure was 1.5 MPa.

Comparison 21

Metal pipes were bonded by the diffusion bonding method in substantially the same manner as of the example 30, except that bonding temperature was 1450° C., temperature holding time was 60 seconds, and pressure applied was set at 4.0 MPa.

Comparison 22

Metal pipes were bonded by the diffusion bonding method in substantially the same manner as of the example 30, except that bonding temperature was 1400° C., temperature holding time was 300 seconds, and pressure applied was set at 1.0 MPa.

Comparison 23

Metal pipes were bonded by the diffusion bonding method in substantially the same manner as of the example 30, except that bonding temperature was 1300° C., temperature holding time was 300 seconds, and pressure applied was set at 7.0 MPa.

The metal-pipe bonding bodies of the examples 30 and 31, and the comparisons 21 to 23 were measured for checking the maximum steps of the bonding potions, and subjected to a tensile test and a fatigue test in substantially the same procedure as of the example 22. The results are shown in Table 12.

TABLE 12

| Test No. | Comparison 21 | Example 30 | Example 31 | Comparison 22 | Comparison 23 |
| --- | --- | --- | --- | --- | --- |
| Material of steel pipe | API X52 | API X52 | API X52 | API X52 | API X52 |
| Outer diameter of steel pipe (inch) | 12.75 | 12.75 | 12.75 | 12.75 | 12.75 |
| Thickness of steel pipe (inch) | 0.375 | 0.375 | 0.375 | 0.375 | 0.375 |
| Pipe end expansion rate (%) | 5 | 5 | 5 | 5 | 5 |
| Bonding surface roughness (Rmax: μm) | 15 | 15 | 15 | 15 | 15 |
| Material of insert member | BNi-5 | BNi-5 | BNi-5 | BNi-5 | BNi-5 |
| Melting point (° C.) of insert member | 1140 | 1140 | 1140 | 1140 | 1140 |
| Thickness (μm) of insert member | 50 | 50 | 50 | 50 | 50 |
| Form of insert member | foil | Powder | foil | foil | foil |
| Bonding temperature (° C.) | 1450 | 1350 | 1350 | 1400 | 1300 |
| Temperature holding time(s) | 60 | 240 | 240 | 300 | 300 |
| 4.0 | 1.5 | 5.0 | 1.0 | 7.0 | 3.0 |
| Bonding atmosphere | Ar | Ar | Ar | Ar | Ar |
| Heating method for bonding portions | high frequency induction heating method (3 KHz) | | | | |
| Max. step of bonding portions | 1.0 | 1.0 | 1.0 | 1.0 | 1.0 |
| Tensile strength (MPa) in tension test | 525 | 526 | 525 | 418 | 424 |

TABLE 12-continued

| Test No. | Comparison 21 | Example 30 | Example 31 | Comparison 22 | Comparison 23 |
|---|---|---|---|---|---|
| Fractured position in tension test | base metal | base metal | base metal | bonding interface | bonding interface |
| Fatigue strength rate in fatigue test | 0.8 | 0.9 | 0.9 | 0.6 | 0.7 |
| Evaluation | B | A | A | B | B |

In the comparison 21 in which the bonding temperature was 1450° C., a tensile strength was 525 MPa, and a test piece was fractured in the base metal. A fatigue strength rate was 0.8, slightly lower than that of the base metal. The reason for this may be considered such that since the bonding temperature is high, melting of the base metal occurs in the bonding portion, and a fatigue crack starts at the melting of the base metal portion.

In the comparison 22 in which the pressure was set at 1 MPa, a tensile strength was 418 MPa although the bonding temperature was 1400° C. and the temperature holding time was 300 seconds. A test piece was fractured at the bonding interface. A fatigue strength rate was 0.6, somewhat lower than that of the base metal. The reason for this may be considered that since the pressure applied was low, contact of the bonding surfaces was poor, part of the bonding surfaces remained unbonded.

In the comparison 23 where the pressure applied to between the bonding portions was set at 7 MPa, a tensile strength was 424 MPa although the bonding temperature was reduced to 1300° C. A test piece was fractured at the bonding interface. A fatigue strength rate was 0.7, lower than that of the base metal. The reason for this may be considered such that because of high pressure, the bonding portion is excessively deformed and fatigue crack starts at the deformed portion.

In the example 30 where the bonding temperature was 1350° C. and the applied pressure was 1.5 MPa, and the example 31 where the applied pressure was 5.0 MPa, the bonding strength of each of them was about 525 MPa, comparable with that of the base metal. The test pieces were fractured in base metals. A fatigue strength rate of each of them was 0.9, comparable with that of the base metal.

In the examples 31 and 32 and the comparisons 21 to 23, the pipe-end expansion rate of the metal pipe was set at 5%, and then the maximum steps were 1.0 mm.

As seen from the results mentioned above, when the metal pipes are bonded by the liquid-phase diffusion bonding method, if the bonding temperature was 1400° C. or lower, the melting of the base metal in the bonding portion is lessened, and the resultant metal-pipe bonded body is improved in tensile strength and fatigue strength.

EXAMPLE 32

Metal pipes were bonded by the diffusion bonding method in the following manner. Each of the metal pipes used was a steel pipe of API grade H40 (referred to as "Metal pipes were bonded by the diffusion bonding method in substantially the same manner as of the H40"). The steel pipe has an outside diameter of 7.0 inches (≈177.8 mm), and a thickness of 0.54 inch (≈13.7 mm). The inside diameter of each end portion of each steel pipe was increased so as to have a pipe-end expansion rate of 5%.

The end face of each expanded metal pipe was machined to have a surface roughness Rmax of 50 μm. An insert member used was an Ni alloy foil of 30 μm thick and 1140° C. in melting point, which corresponds in constitution to JIS BNi-5. The insert member was placed on the bonding interface and bonded by the liquid-phase diffusion bonding method.

A high frequency induction heating method, in which the frequency of a high-frequency current was 3 kHz, was used for heating the bonding portions. The bonding conditions were: bonding temperature was 1300° C., temperature holding time was 150 seconds/pressure applied was 3.5 MPa, and bonding atmosphere was Ar atmosphere.

EXAMPLE 33

Metal pipes were bonded by the diffusion bonding method in substantially the same manner as of the example 32, except that bonding temperature was 1350° C., temperature holding time was 240 seconds, applied pressure was 4.0 MPa, and a frequency of a high-frequency current fed to an induction coil was 100 kHz.

EXAMPLE 34

Metal pipes were bonded by the diffusion bonding method in substantially the same manner as of the example 32, except that bonding temperature was 1350° C., temperature holding time was 240 seconds, applied pressure was 4.0 MPa, and the high frequency direct heating method in which a frequency of a high-frequency current fed to an induction coil was 50 kHz.

Comparison 24

Metal pipes were bonded by the diffusion bonding method in substantially the same manner as of the example 32, except that a surface roughness Rmax of each bonding surface was 100 μm, bonding temperature was 1400° C., temperature holding time was 300 seconds, and the applied pressure was 5.0 MPa.

Comparison 25

Metal pipes were bonded by the diffusion bonding method in substantially the same manner as of the example 32, except that the bonding temperature was 1400° C., temperature holding time was 300 seconds, applied pressure was 4.0 MPa, and a frequency of a high-frequency current fed to an induction coil was 400 kHz.

The metal-pipe bonding bodies of the examples 32 to 34, and the comparisons 24 and 25 were subjected to measurements of the maximum steps of the bonding potions, the tensile test and the fatigue test in substantially the same procedure as of the example 22. The results are shown in Table 13.

TABLE 13

| Test No. | Comparison 24 | Example 32 | Example 33 | Comparison 25 | Example 34 |
|---|---|---|---|---|---|
| Material of steel pipe | API H40 | API H40 | API H40 | API H40 | API H40 |
| Outer diameter of steel pipe (inch) | 7.00 | 7.00 | 7.00 | 7.00 | 7.00 |
| Thickness of steel pipe (inch) | 0.54 | 0.54 | 0.54 | 0.54 | 0.54 |
| Pipe end expansion rate (%) | 5 | 5 | 5 | 5 | 5 |
| Bonding surface roughness (Rmax: µm) | 100 | 50 | 20 | 20 | 20 |
| Material of insert member | BNi-5 | BNi-5 | BNi-5 | BNi-5 | BNi-5 |
| Melting point (° C.) of insert member | 1140 | 1140 | 1140 | 1140 | 1140 |
| Thickness (µm) of insert member | 30 | 30 | 40 | 40 | 40 |
| Form of insert member | foil | foil | foil | foil | foil |
| Bonding temperature (° C.) | 1400 | 1300 | 1350 | 1400 | 1350 |
| Temperature holding time(s) | 300 | 150 | 240 | 300 | 240 |
| Pressure (MPa) | 5.0 | 3.5 | 4.0 | 4.0 | 4.0 |
| Bonding atmosphere | Ar | Ar | Ar | Ar | Ar |
| Heating method for bonding portions | high frequency induction heating method | | | | |
| | 3 kHz | | 100 kHz | 400 kHz | 50 kHz |
| Max. step of bonding portions | 1.0 | 1.0 | 1.0 | 1.0 | 1.0 |
| Tensile strength (MPa) in tension test | 598 | 704 | 718 | 564 | 711 |
| Fractured position in tension test | bonding interface | base metal | base metal | bonding interface | base metal |
| Fatigue strength rate in fatigue test | 0.6 | 0.9 | 0.9 | 0.6 | 0.9 |
| Evaluation | B | A | A | B | A |

In the Comparison 24 where the surface roughness Rmax=100 µgm, a tensile strength was 598 MPa although the diffusion bonding was performed under the conditions of relatively high temperature, high pressure and long time. A test piece was fractured at the bonding interface. A fatigue strength rate was 0.6, lower than that of the base metal. The reason for this may be considered such that since the surface roughness is poor, the irregularity on bonding interface is insufficiently filled with molten Ni alloy.

Also in the comparison 25 where the bonding portion was heated by the high-frequency current of 400 kz, a tensile strength was 564 MPa although the diffusion bonding was performed under the conditions of relatively high temperature, high pressure and long time. A tensile strength was 564 MPa, and a test piece was fractured at the bonding interface. A tensile strength rate was 0.6, lower than that of the base metal. The reason for this maybe considered such that since the bonding interface is not uniformly heated, part of the inner surfaces of the metal pipes are unbonded.

In the examples 32 and 33 where the surface roughness Rmax of the bonding interface was 50 µm or lower and a frequency of the high frequency current was 100 kHz or lower, a tensile strength of each bonding portion was about 711 MPa, comparable with that of the base metal. The test pieces were fractured in the base metals. A fatigue strength rate was 0.9, comparable with that of the base metal.

In the examples 34 using the high frequency directly heating method of which the high frequency current is 50 kHz in frequency, a tensile strength of bonding portion was 711 MPa, comparable with that of the base metal. The test piece was fractured in the base metal. A fatigue strength rate was 0.9, comparable with that of the base metal.

In the examples 32 to 34 and the comparisons 24 and 25, the pipe-end expansion rate of the metal pipe was set at 5%, and then the maximum steps were 1.0 mm.

As seen from the test results mentioned above, when the metal pipes are bonded by the liquid-phase diffusion bonding method, if the end portion of each metal pipe is radially expanded at a predetermined pipe-end expansion rate and the surface roughness Rmax of the bonding interface is set at 50 µm or less, a metal-pipe bonded body excellent in tensile strength and fatigue strength is produced. Further, if the frequency of the high frequency current is selected to be 100 kHz or lower in the high frequency induction heating method or the high frequency direct heating method, the bonding surface is heated uniformly, and a metal-pipe bonded body excellent in tensile strength and fatigue strength is produced.

EXAMPLE 35

Figure 17A:
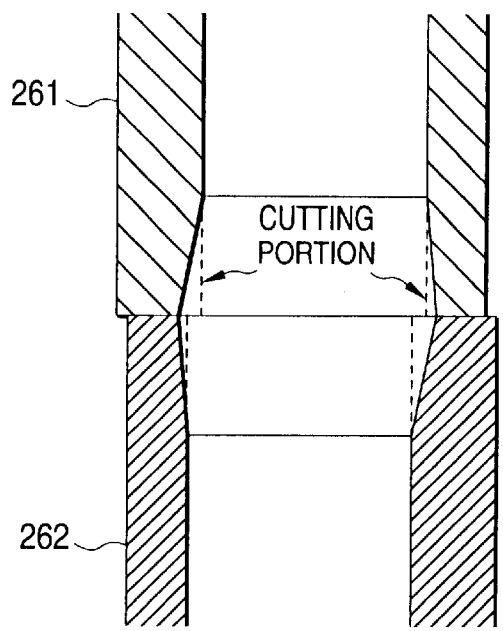
FIG. 17A is a sectional view showing a metal-pipe bonded body in which the inner surface of the bonding portion is tapered by machining.

Metal pipes were bonded into a metal-pipe bonded body by the diffusion bonding method in the following manner. Each of the metal pipes used was a carbon steel pipe for pressure pipe arrangement (JIS G3454) STPG410, 139.8 mm in outside diameter, 6.6 mm in thickness, and 1 m in length. The inner surface of the bonded body was tapered by cutting as shown in FIG. 17A (this cutting will be "type A"). The outer surface of the bonded body was left not cut.

The face of the end portion of the metal pipe of which the inner surface was machined was finished so as to have a surface roughness Rmax of 20 µm or less. An Ni alloy foil having a thickness of 40 µm and a melting point of 1050° C., which corresponds in constitution to BNi-3 (JIS Z3265), was put on the bonding surface of the steel pipe. In this state, liquid-phase diffusion bonding was performed.

The bonding portions were heated by the high frequency induction heating method of which the high frequency current was 3 kHz in frequency. The bonding conditions were: bonding temperature was 1290° C., temperature holding time was 120 seconds, pressure applied was 3.0 MPa, and the bonding atmosphere was Ar atmosphere.

EXAMPLE 36

Figure 17B:
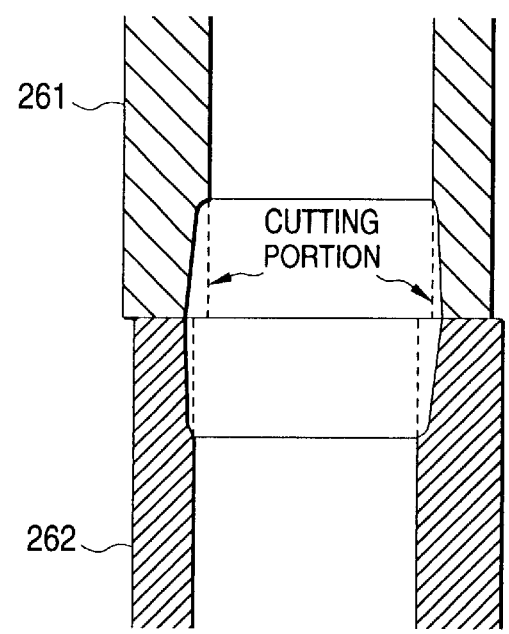
FIG. 17B is a sectional view showing a metal-pipe bonded body in which the inner surface of the bonding portion is elliptically shaped by machining.

Metal pipes were bonded into a metal-pipe bonded body by the diffusion bonding method in substantially the same manner as of the example 35, except that the inner surface of the bonded body was elliptically shaped by machining as shown in FIG. 17B (this cutting will be "type B").

EXAMPLE 37

Metal pipes were bonded into a metal-pipe bonded body by the diffusion bonding method in substantially the same manner as of the example 35, except that the outer surface of the end portion was machined into the type A, and the inner surface was machined into the type B.

Comparison 26

Metal pipes were bonded into a metal-pipe bonded body by the diffusion bonding method in substantially the same manner as of the example 35, except that the inner and outer surfaces of the end portions of the metal pipes were not machined.

Comparison 27

Metal pipes were bonded into a metal-pipe bonded body by the diffusion bonding method in substantially the same manner as of the example 35, except that only the outer surfaces of the end portions of the metal pipes were machined into the type A.

The metal-pipe bonding bodies of the examples 35 to 37, and the comparisons 26 and 27 were subjected to measurements of the maximum steps formed on the inner and outer surfaces of the bonding potions. To measure a tensile strength of each bonded body, a 200-tonf-universal tester was used. Each bonded body used was a pressure-pipe-arrangement carbon steel joint of 2 m long. To measure a fatigue limit, a fatigue test was performed: a pressure-pipe-arrangement carbon steel joint of 2 m long was sealed at both ends, and internal compression load and tension/compression cycle load were imposed on the carbon steel joint. A fatigue strength rate was evaluated using the fatigue limit of a pressure-pipe-arrangement carbon steel measured in a similar manner. The results are shown in Table 14.

From the test results, it is seen that when the material is removed, by machining, from the inner surface of the end portion of the metal pipe to reduce the maximum step on the inner surface, the fatigue characteristic of the bonding portion is improved.

EXAMPLE 38

Metal pipes were bonded into a metal-pipe bonded body by the diffusion bonding method in the following manner. Each of the metal pipes used was a carbon steel pipe for pressure pipe arrangement (JIS G3454) STPG410, 139.8 mm in outside diameter, 6.6 mm in thickness, and 1 m in length. The end portion of the bonded body was radially expanded at an pipe-end expansion rate 5% as shown in FIG. 5A, and then the inner surface of the end portion was machined into the type B. The outer surface of the bonded body was left not machined.

The end portion of each metal pipe was radially expanded and machined, and the end face thereof was finished so as to have a surface roughness Rmax of 20 $\mu$m or less. An Ni alloy foil having a thickness of 35 $\mu$m and a melting point of 1140° C., which corresponds in constitution to BNi-5 (JIS Z3265), was put on the bonding surface of the steel pipe. In this state, liquid-phase diffusion bonding was performed.

The bonding portions were heated by the high frequency induction heating method of which the high frequency current was 3 kHz in frequency. The bonding conditions were: bonding temperature was 1300° C., temperature holding time was 60 seconds, pressure applied was 3.0 MPa, and the bonding atmosphere was Ar atmosphere.

TABLE 14

| Test No. | Comparison 26 | Comparison 27 | Example 35 | Example 36 | Example 37 |
| --- | --- | --- | --- | --- | --- |
| Material of steel pipe | STPG410 | STPG410 | STPG410 | STPG410 | STPG410 |
| Outer diameter of steel pipe (inch) | 139.8 | 139.8 | 139.8 | 139.8 | 139.8 |
| Thickness of steel pipe (inch) | 6.6 | 6.6 | 6.6 | 6.6 | 6.6 |
| Inner surface machining (Type) | No | No | Yes (A) | Yes (B) | Yes (A) |
| Outer surface machining (Type) | No | Yes (A) | No | No | Yes (B) |
| Max. step of bonding portions of inner side (mm) | 1.2 | 0.5 | <0.1 | <0.1 | <0.1 |
| Max. step of bonding portions of outer side (mm) | 1.5 | <0.1 | 0.3 | 0.4 | <0.1 |
| Tensile strength (MPa) in tension test | 497 | 507 | 510 | 509 | 511 |
| Fractured position in tension test | bonding interface | heat-affected zone | heat-affected zone | heat-affected zone | heat-affected zone |
| Fatigue strength rate in fatigue test | 0.5 | 0.7 | 0.9 | 0.9 | 0.9 |
| Evaluation | C | B | A | A | A |

In the comparison 26 where the end portions were not machined, the maximum steps on the inner and outer surfaces of the bonding portions were 1.2 mm and 1.5 mm. A tensile strength was 497 MPa, somewhat lower than that of the base metal. The test piece was fractured at the bonding interface. A fatigue strength rate was low, 0.5. The reason for this may be considered such that stress concentrates at the step, and a fatigue crack starts from the step.

In the comparison 27 where only the outer surface of the end portion was machined, the maximum step on the outer surface was 0.1 mm or less, and that on the inner surface was 0.5 mm. A tensile strength was substantially equal to that of the base metal. The test piece was fractured in the heat-affect zone, and a fatigue strength rate was 0.7.

In the comparisons 35 to 37 where the inner surfaces of the end portions were machined, the maximum step on the outer surface of the bonding portion of each of them was 0.1 mm or less. A tensile strength of each of them was about 510 MPa. Each test piece was fractured in the heat-affected zone, and a fatigue strength rate was 0.9, substantially equal to that of the base metal.

EXAMPLE 39

Metal pipes were bonded into a metal-pipe bonded body by the diffusion bonding method in substantially the same manner as of the example 38, except that the end portion of each metal pipe was radially expanded at an pipe expansion rate 10% and the inner surfaces of the end portions of the metal pipes were machined into the type A.

EXAMPLE 40

Metal pipes were bonded into a metal-pipe bonded body by the diffusion bonding method in substantially the same manner as of the example 38, except that the end portion of each metal pipe was radially expanded at an pipe expansion rate 10% and the inner and outer surfaces of the end portions of the metal pipes were machined into the type B and the type A.

Comparison 28

Metal pipes were bonded into a metal-pipe bonded body by the diffusion bonding method in substantially the same manner as of the example 38, except that the inner and outer surfaces of the end portions of the metal pipes were not machined.

Comparison 29

Metal pipes were bonded into a metal-pipe bonded body by the diffusion bonding method in substantially the same manner as of the example 38, except that only the outer surfaces of the end portions of the metal pipes were machined into the type The metal-pipe bonding bodies of the examples 38 to 40 and the comparisons 28 and 29 were subjected to measurements of the maximum steps formed on the inner and outer surfaces of the bonding potions in substantially the same procedure as in the example 38. Those also were subjected to a fatigue test and a tension test. The measurement and test results are shown in Table 15.

The end portion of each metal pipe was radially expanded and machined, and the end face thereof was finished so as to have a surface roughness Rmax of 20 µm or less. An Ni alloy foil having a thickness of 35 µm and a melting point of 1140° C., which corresponds in constitution to BNi-5 (JIS Z3265), was put on the bonding surface of the steel pipe. In this state, liquid-phase diffusion bonding was performed.

The bonding portions were heated by the high frequency induction heating method of which the high frequency current is 3 kHz in frequency. The bonding conditions were: bonding temperature was 1300° C., temperature holding time was 150 seconds, pressure applied was 3.0 MPa, and the bonding atmosphere was Ar atmosphere.

TABLE 15

| Test No. | Comparison 28 | Comparison 29 | Example 38 | Example 39 | Example 40 |
| --- | --- | --- | --- | --- | --- |
| Material of steel pipe | STPG410 | STPG410 | STPG410 | STPG410 | STPG410 |
| Outer diameter of steel pipe (inch) | 139.8 | 139.8 | 139.8 | 139.8 | 139.8 |
| Thickness of steel pipe (inch) | 6.6 | 6.6 | 6.6 | 6.6 | 6.6 |
| Pipe end expansion rate (%) | 5 | 5 | 5 | 10 | 10 |
| Inner surface machining (Type) | No | No | Yes (B) | Yes (A) | Yes (B) |
| Outer surface machining (Type) | No | Yes (B) | No | No | Yes (A) |
| Max. step of bonding portions of inner side (mm) | 1.5 | 0.3 | <0.1 | <0.1 | <0.1 |
| Max. step of bonding portions of outer side (mm) | 1.6 | <0.1 | 0.5 | 0.3 | <0.1 |
| Tensile strength (MPa) in tension test | 496 | 510 | 512 | 510 | 513 |
| Fractured position in tension test | bonding interface | heat-affected zone | heat-affected zone | heat-affected zone | heat-affected zone |
| Fatigue strength rate in fatigue test | 0.4 | 0.7 | 0.9 | 0.9 | 0.9 |
| Evaluation | C | B | A | A | A |

In the comparison 28 where the end portions were not machined, the maximum steps on the inner and outer surfaces of the bonding portions were 1.5 mm and 1.6 mm. A tensile strength was 497 MPa, somewhat lower than that of the base metal. The test piece was fractured at the bonding interface. A fatigue strength rate was low, 0.4.

In the comparison 29 where only the outer surface of the end portion was machined, the maximum step on the outer surface was 0.1 mm or less, and that on the inner surface was 0.3 mm. A tensile strength was substantially equal to that of the base metal. The test piece was fractured in the heat-affected zone, and a fatigue strength rate was 0.7.

In the examples 38 to 40 where the end portions of the metal pipes are radially expanded and the inner surfaces of the end portions were machined, the maximum step on the outer surface of the bonding portion of each of them was 0.1 mm or less. A tensile strength of each of them was about 510 MPa. Each test piece was fractured in the heat-affected zone, and a fatigue strength rate was 0.9, substantially equal to that of the base metal.

From the test results, it is seen that when the material is removed, by machining, from the inner surface of the end portion of the metal pipe to reduce the maximum step on the inner surface, the fatigue characteristic of the bonding portion is improved.

EXAMPLE 41

Figure 18B:
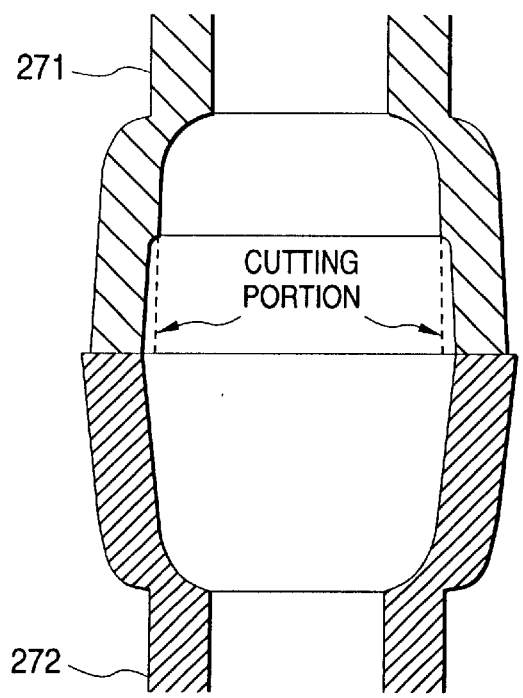
FIG. 18B is a sectional view showing a metal-pipe bonded body in which the inner surface of the bonding portion is elliptically shaped by machining after the end portions are radially expanded.

Metal pipes were bonded into a metal-pipe bonded body by the diffusion bonding method in the following manner. Each of the metal pipes used was a carbon steel pipe for pressure pipe arrangement (JIS G3454) STPG410, 139.8 mm in outside diameter, 6.6 mm in thickness, and 1 m in length. The end portion of the bonded body was radially expanded at an pipe-end expansion rate 5% as shown in FIG. 18B, and then the inner surface of the end portion was cut into the type B. The outer surface of the bonded body was left not cut.

A pipe expanding tool was inserted into the resultant metal-pipe bonded body from its one end by use of a 100-ton f-universal tester, to radially expand the bonded body. In this example, the pipe expansion rate was 20%.

EXAMPLE 42

Metal pipes were bonded into a metal-pipe bonded body by the diffusion bonding method in substantially the same manner as of the example 41, except that the end portion of each metal pipe was radially expanded at an pipe expansion rate 10% and the inner surfaces of the end portions of the metal pipes were machined into the type A. The resultant metal-pipe bonded body was radially expanded at an pipe-end expansion rate 25%.

EXAMPLE 43

Metal pipes were bonded into a metal-pipe bonded body by the diffusion bonding method in substantially the same manner as of the example 41, except that the end portion of each metal pipe was radially expanded at an pipe expansion rate 10% and the inner and outer surfaces of the end portions of the metal pipes were machined into the type B and the type A. The resultant metal-pipe bonded body was radially expanded at a pipe-end expansion rate 25%.

Comparison 30

Metal pipes were bonded into a metal-pipe bonded body by the diffusion bonding method in substantially the same manner as of the example 38, except that the inner and outer surfaces of the end portions of the metal pipes were not machined. The resultant metal-pipe bonded body was radially expanded at a pipe-end expansion rate 10%.

Comparison 31

Metal pipes were bonded into a metal-pipe bonded body by the diffusion bonding method in substantially the same manner as of the example 41, except that only the outer surfaces of the end portions of the metal pipes were machined into the type B. The resultant metal-pipe bonded body was radially expanded at a pipe-end expansion rate 20%.

The metal-pipe bonding bodies of the examples 41 to 43 and the comparisons 30 and 31 were subjected to measurements of the maximum steps formed on the inner and outer surfaces of the bonding potions and a tension of each of them in substantially the same procedure as in the example 28. The measurement results are shown in Table 16. Presence of flaw on the bonding interface was detected by an ultrasonic flaw detection test.

The metal-pipe bonding method of the invention is suitable for bonding the oil well tubes, such as casing tubes inserted into the ground, but it may be used for casing tubes used for gas well, geothermal well, hot spring well, water well, and others, or line pipes laid on the ground, or plant pipe arrangement.

In a method of bonding metal pipes bonded end to end by a diffusion bonding method, the inner surface of the bonding end of at least one of metal pipes to be bonded together is machined so that an inside diameter difference between the bonding end faces of said metal pipes is smaller than 2 mm. Even if the outside diameters and/or the thickness values of metal pipes vary in value, the step formed on the inner

TABLE 16

| Test No. | Comparison 30 | Comparison 31 | Example 41 | Example 42 | Example 43 |
|---|---|---|---|---|---|
| Material of steel pipe | STPG410 | STPG410 | STPG410 | STPG410 | STPG410 |
| Outer diameter of steel pipe (inch) | 139.8 | 139.8 | 139.8 | 139.8 | 139.8 |
| Thickness of steel pipe (inch) | 6.6 | 6.6 | 6.6 | 6.6 | 6.6 |
| Pipe end expansion rate (%) | 5 | 5 | 5 | 10 | 10 |
| Inner surface machining (Type) | No | No | Yes (B) | Yes (A) | Yes (B) |
| Outer surface machining (Type) | No | Yes (B) | No | No | Yes (A) |
| Max. step of bonding portions of inner side (mm) | 2.0 | 0.8 | <0.1 | <0.1 | <0.1 |
| Max. step of bonding portions of outer side (mm) | 0.5 | <0.1 | 0.5 | 0.3 | <0.1 |
| Pipe expansion rate (%) in pipe expansion test | 10 | 20 | 20 | 25 | 25 |
| T value (%) in pipe expansion test | 30.3 | 12.1 | <1.5 | <1.5 | <1.5 |
| 30-T (%) | 0 | 18 | >28.5 | >28.5 | >28.5 |
| Ultrasonic test after pipe expansion | defects | defects | none | none | none |
| Tensile strength | 388 | 492 | 562 | 565 | 567 |

In the comparison 30 where the end portions were not machined, the maximum steps on the inner and outer surfaces of the bonding portions were 2.0 mm and 0.5 mm. Defect was detected in the bonding interface after pipe expansion. A tensile strength was 388 MPa, much lower than that of the base metal. Accordingly, the test piece was fractured at the bonding interface.

In the comparison 31 where only the outer surface of the end portion was machined, the maximum step on the outer surface was 0.1 mm or less, and that on the inner surface was 0.8 mm. Minute defect was detected on the bonding interface after pipe expansion. A tensile strength was 388 MPa, somewhat lower than that of the base metal. Accordingly, the test piece was fractured at the bonding interface. This may be estimated that the pipe expansion was performed at a pipe expansion rate higher than the T value.

In the examples 41 to 43 where the end portions of the metal pipes were radially expanded and the inner surfaces of the end portions were machined, the maximum step on the outer surface of the bonding portion of each of them was 0.1 mm or less. No defect was detected on the bonding interface. A tensile strength of each of them was about 560 MPa or higher.

As seen from the test results, when the maximum step on the inner surface of the bonding portion is reduced, the T value is reduced and no defect is not created on the bonding portion, and the bonding pipe can be radially expanded at high pipe expansion rate.

While the present invention has been described by use of some specific embodiments, it should be understood that the invention is not limited to those embodiments but may variously be modified, altered and changed within the true spirits of the invention.

While each of the embodiments uses a liquid-phase diffusion bonding method for bonding the metal pipes, a solid-phase diffusion bonding method may be used instead.

surface of the bonding portion is reduced. Therefore, stress concentrating on the step is lessened, and the resultant metal-pipe bonded body is excellent in strength and fatigue characteristic. The reduction of the steps on the inner surface of the bonding portion lessens the amount of corrosive materials staying thereat; it does not affect adverse influence to the corrosion proof and mechanical characteristic.

When the working of said inner surface is a diameter-increasing process not attendant with removal of material, it is easier than another machining, e.g., cutting. Therefore, a metal-pipe bonded body is excellent in strength and fatigue characteristic can be produced without increase of cost to manufacture.

When the working of said inner surface is a machining process attendant with removal of material, the step on the inner surface of the bonding portion can reliably be reduced even if the tolerance values for the inside diameter and the thickness of the metal pipe are large.

When the working of said inner surface is a combination of a diameter-increasing process not attendant with removal of material and a machining process attendant with removal of material, the step reduction is further reliably secured. The resultant metal-pipe bonded body may be radially expanded at a larger pipe expansion rate.

As described above, the metal-pipe bonding method of the invention provides a metal-pipe bonded body excellent in strength, fatigue characteristic and corrosion resistance at reduced cost. If the metal-pipe bonded body is applied to the oil well drilling work and pipe lying work, remarkable cost reduction and reliable work are secured, and hence it is believed that the present invention greatly contributes to the industry in this and related fields.

What is claimed is:

1. An expandable metal-pipe bonded body consisting essentially of a plurality of metal pipes having opposing open ends bonded to each other at said ends, wherein each pipe includes a longitudinal axis, a central tube portion and a pair of elongated portions extending parallel to said axis, each of said elongated portions defining a region leading to a respective one of said opposing ends and having a constant, inside diameter that is greater than an inside diameter of the central tube portion of each of said metal pipes, said elongated portions being formed along said metal pipes prior to said plurality metal pipes bonding to one another.

2. The metal-pipe bonded body according to claim 1 wherein the metal pipes are diffusion bonded.

3. The metal-pipe bonded body according to claim 1 wherein the metal pipes are bonded by welding.

* * * * *